US007134773B2

(12) United States Patent
Tufte

(10) Patent No.: US 7,134,773 B2
(45) Date of Patent: Nov. 14, 2006

(54) LIGHTING APPARATUS

(75) Inventor: Brian N. Tufte, Eden Prairie, MN (US)

(73) Assignee: I3 Ventures, LLC, Eden Prairie, MN (US)

(*) Notice: Subject to any disclaimer, the term of this patent is extended or adjusted under 35 U.S.C. 154(b) by 242 days.

(21) Appl. No.: 10/811,602

(22) Filed: Mar. 29, 2004

(65) Prior Publication Data

US 2005/0213342 A1 Sep. 29, 2005

(51) Int. Cl.
*B60Q 1/00* (2006.01)

(52) U.S. Cl. ...................................... 362/505; 362/551

(58) Field of Classification Search ................ 362/505, 362/509, 511, 555, 540, 190–191
See application file for complete search history.

(56) References Cited

U.S. PATENT DOCUMENTS

| | | | |
|---|---|---|---|
| 1,647,014 | A | 10/1927 | Pattison |
| 1,729,274 | A | 9/1929 | Miller |
| 1,729,284 | A | 9/1929 | Millar |
| 1,779,180 | A | 10/1930 | Macrae et al. |
| 1,972,283 | A | 9/1934 | Zimmers |
| 2,277,433 | A | 3/1942 | Guth |
| 2,300,067 | A | 10/1942 | Schwab |
| 2,339,085 | A | 1/1944 | Luckiesh |
| 2,525,001 | A | 10/1950 | Sherwood |
| 2,561,756 | A | 7/1951 | Shock |
| 2,587,807 | A | 3/1952 | Arenberg et al. |
| 2,930,885 | A | 3/1960 | Ehrenfreund |
| 2,959,146 | A | 11/1960 | Erkert |
| 3,028,208 | A | 4/1962 | Sharpe |
| 3,140,111 | A | 7/1964 | Dabroski |
| 3,196,265 | A | 7/1965 | Schneider |
| 3,197,189 | A | 7/1965 | Pemper et al. |
| 3,317,722 | A | 5/1967 | Whitney |
| 3,359,030 | A | 12/1967 | Newman |
| 3,473,836 | A | 10/1969 | Halter |
| 3,551,723 | A | 12/1970 | Van Groningen |
| 3,612,848 | A | 10/1971 | Koch et al. |
| 3,639,748 | A | 2/1972 | Pearson et al. |

(Continued)

FOREIGN PATENT DOCUMENTS

FR 2727498 11/1994

(Continued)

OTHER PUBLICATIONS

"2004 Marine Product Catalog," Taco Metals, 128 pages, 2004.

(Continued)

*Primary Examiner*—Ali Alavi
(74) *Attorney, Agent, or Firm*—Brian N. Tufte

(57) ABSTRACT

A lighting apparatus is disclosed for providing illumination to an object or surface. In one illustrative embodiment, the light apparatus is used to help improve the visibility of a vehicle by providing illumination to at least part of the vehicle. In other illustrative embodiments, the light apparatus may be used to provide illumination for other objects or equipment including, for example, docks, retail and/or store shelving and/or equipment, bars, desks, counters, walls, railings, steps, and/or any other object or surface, as desired. In some embodiments, the lighting apparatus includes a bumper. When so provided, the lighting apparatus may help provide a level of protection to objects and/or surfaces that are subject to bumping, sliding or other abuse. In other illustrative embodiments, the lighting apparatus may be used to increase the visual appeal of an object or surface, such as a wall, a toy, an appliance or any other object, as desired.

51 Claims, 51 Drawing Sheets

U.S. PATENT DOCUMENTS

| | | | |
|---|---|---|---|
| 3,675,527 | A | 7/1972 | Reeder, Jr. |
| 3,722,876 | A | 3/1973 | Schwenk |
| 3,865,358 | A | 2/1975 | Butters |
| 3,885,144 | A | 5/1975 | Lewis et al. |
| 4,107,767 | A | 8/1978 | Anquetin |
| 4,213,644 | A | 7/1980 | Scrivo et al. |
| 4,245,281 | A | 1/1981 | Ziaylek, Jr. |
| 4,270,787 | A | 6/1981 | Savell |
| 4,360,859 | A | 11/1982 | Ziaylek, Jr. |
| 4,376,966 | A | 3/1983 | Tieszen |
| 4,418,378 | A | 11/1983 | Johnson |
| 4,445,163 | A | 4/1984 | Ziaylek, Jr. |
| 4,625,266 | A | 11/1986 | Winter |
| 4,740,870 | A | 4/1988 | Moore et al. |
| 4,947,293 | A | 8/1990 | Johnson et al. |
| 4,954,932 | A | 9/1990 | Isenga |
| 4,955,044 | A | 9/1990 | Amstutz et al. |
| 4,964,760 | A | 10/1990 | Hartman |
| 4,979,081 | A | 12/1990 | Leach et al. |
| 4,996,634 | A | 2/1991 | Haneda et al. |
| 5,021,931 | A | 6/1991 | Matsui et al. |
| 5,023,762 | A | 6/1991 | Tieszen |
| 5,096,753 | A | 3/1992 | McCue et al. |
| 5,122,933 | A | 6/1992 | Johnson |
| 5,180,223 | A | 1/1993 | McNamee |
| 5,268,824 | A | 12/1993 | Czipri |
| 5,304,993 | A | 4/1994 | Handsaker |
| 5,337,225 | A | 8/1994 | Brookman |
| 5,383,100 | A | 1/1995 | Kikos |
| 5,410,458 | A | 4/1995 | Bell |
| 5,430,627 | A | 7/1995 | Nagano |
| 5,434,013 | A | 7/1995 | Fernandez |
| 5,469,342 | A | 11/1995 | Chien |
| 5,475,574 | A | 12/1995 | Chien |
| 5,485,355 | A | 1/1996 | Voskoboinik et al. |
| 5,495,401 | A | 2/1996 | Evans |
| 5,499,170 | A | 3/1996 | Gagne |
| 5,523,923 | A | 6/1996 | Stowe, Jr. |
| 5,566,384 | A | 10/1996 | Chien |
| 5,570,945 | A | 11/1996 | Chien et al. |
| 5,579,429 | A | 11/1996 | Naum |
| 5,611,621 | A | 3/1997 | Chien |
| 5,613,750 | A | 3/1997 | Roe |
| 5,636,916 | A | 6/1997 | Sokolowski |
| 5,678,914 | A | 10/1997 | Dealey et al. |
| 5,680,496 | A | 10/1997 | Burkitt et al. |
| 5,711,592 | A | 1/1998 | Hotta |
| 5,730,079 | A | 3/1998 | Totty et al. |
| 5,737,472 | A | 4/1998 | Bernasson et al. |
| 5,746,501 | A | 5/1998 | Chien |
| 5,753,381 | A | 5/1998 | Feldman et al. |
| 5,775,016 | A | 7/1998 | Chien |
| 5,869,930 | A | 2/1999 | Baumberg et al. |
| 5,871,269 | A | 2/1999 | Chien |
| 5,873,646 | A | 2/1999 | Fjaestad et al. |
| 5,902,034 | A | 5/1999 | Santosuosso et al. |
| 5,903,695 | A | 5/1999 | Zarian et al. |
| 5,915,830 | A | 6/1999 | Dickson et al. |
| 5,917,288 | A | 6/1999 | Feldman et al. |
| 6,019,476 | A | 2/2000 | Kirschner |
| 6,033,085 | A | 3/2000 | Bowker |
| 6,050,211 | A | 4/2000 | Yamaguchi |
| 6,065,852 | A | 5/2000 | Crumley |
| 6,074,071 | A | 6/2000 | Baumberg et al. |
| 6,082,867 | A | 7/2000 | Chien |
| 6,113,246 | A | 9/2000 | Rub |
| 6,120,160 | A | 9/2000 | Nakagawa |
| 6,129,442 | A | 10/2000 | Hoefling et al. |
| 6,152,586 | A | 11/2000 | Dealey et al. |
| 6,179,431 | B1 | 1/2001 | Chien |
| 6,186,649 | B1 | 2/2001 | Zou et al. |
| RE37,113 | E | 3/2001 | Shimada |
| 6,231,217 | B1 | 5/2001 | Krippelz, Sr. |
| 6,270,229 | B1 | 8/2001 | Chien |
| 6,278,827 | B1 | 8/2001 | Sugiyama et al. |
| 6,364,293 | B1 | 4/2002 | Beckett |
| 6,371,634 | B1 | 4/2002 | Tufte |
| 6,450,678 | B1 | 9/2002 | Bayersdorfer |
| 6,461,028 | B1 | 10/2002 | Huang |
| 6,474,851 | B1 | 11/2002 | Baley |
| 6,511,204 | B1 | 1/2003 | Emmel et al. |
| 6,523,986 | B1 | 2/2003 | Hoffmann |
| 6,526,200 | B1 | 2/2003 | Davie |
| 6,592,245 | B1 | 7/2003 | Tribelsky et al. |
| 6,655,824 | B1 | 12/2003 | Tufte |
| 6,733,161 | B1 | 5/2004 | Tufte |
| 6,742,916 | B1 | 6/2004 | Dunn |
| 2003/0209183 | A1 | 11/2003 | Tufte |
| 2004/0179358 | A1 | 9/2004 | Tufte |
| 2005/0213342 | A1 | 9/2005 | Tufte |

FOREIGN PATENT DOCUMENTS

| | | |
|---|---|---|
| WO | WO 96/13687 | 5/1996 |
| WO | WO 00/42456 | 7/2000 |

OTHER PUBLICATIONS

"2006 Marine Products Catalog," Taco Metals, 122 pages, 2006.

Light Tech LLC., "Decorative Cable Lights," brochure, copyright 1998.

Flex Glo Wire, Inc., "Flex Glo Wire Specifications," Oct. 15, 1998.

*Selected pages from* http://www.aqualuce.com/montkaj.html, 2 pages, downloaded Jun. 3, 2000.

"Eagle Mouldings Specialty Trim & Extrusions," brochure, 6 pages, prior to Aug. 11, 1999.

Lumenyte International Corporation, "Cove Lighting Applications," 1 page, copyright, Mar. 19, 1998.

Lumenyte International Corporation, "Sta-Flex LEF ™ 510M Linear Emitting Fiber," 2 pages, copyright Mar. 6, 2001.

Lumenyte International Corporation, "Sta-Flex LEF ™ 310 Linear Emitting Fiber," 2 pages, copyright Mar. 19, 1998.

Lumenyte International Corporation, "Sta-Flex LEF ™ 510 Linear Fiber," 2 pages, copyright Mar. 19, 1998.

Lumenyte International Corporation, "Sta-Flex LEF ™ 410M Linear Emitting Fiber," 2 pages, copyright Mar. 6, 2001.

3M Marine Products, http://www.3m.com/US/auto_marine_aero/marine/catalog/index.jhtml, 1 page, downloaded Feb. 11, 2002.

3M Automotive, Marine and Aerospace, http://products.3m.com/usenglish/auto_marine _aero/marine.jhtml, 1 page, downloaded Feb. 11, 2002.

3M United States, http://www.3m.com/about3M/technologies/lightfiber, 30 pages, downloaded Feb. 11, 2002.

http://www.elam.co.il, 24 pages, downloaded Feb. 11, 2002.

U.S. Appl. No. 10/074,162, filed Feb. 12, 2002, entitled, "Lighting Apparatus."

U.S. Appl. No. 10/074,364, filed Feb. 12, 2002, entitled, "Lighting Apparatus."

U.S. Appl. No. 10/074,356, filed Feb. 12, 2002, entitled, "Lighting Apparatus."

U.S. Appl. No. 10/075,488, filed Feb. 12, 2002, entitled, "Lighting Apparatus."

U.S. Appl. No. 10/075,489, filed Feb. 12, 2002, entitled, "Lighting Apparatus."

U.S. Appl. No. 10/147,097, filed May 13, 2002, entitled, "Lighting Apparatus."

LIGHTING APPARATUS

BACKGROUND OF THE INVENTION

This invention relates to lights, and more particularly, to lights for illuminating, protecting and/or increasing the visual appeal of an object or surface.

SUMMARY OF THE INVENTION

The present invention provides a lighting apparatus that may be used to provide illumination for an object or surface. In one illustrative embodiment, the light apparatus is used to help improve the visibility of a vehicle by providing illumination to at least part of the vehicle. In other illustrative embodiments, the light apparatus may be used to provide illumination for other objects or equipment including, for example, docks, retail and/or store shelving and/or equipment, bars, desks, counters, walls, railings, steps, and/or any other object or surface, as desired. In some embodiments, the lighting apparatus includes a bumper. When so provided, the lighting apparatus may help provide a level of protection to objects and/or surfaces that are subject to bumping, sliding or other abuse. In other illustrative embodiments, the lighting apparatus may be used to increase the visual appeal of an object or surface, such as a wall, a toy, an appliance or any other object, as desired.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
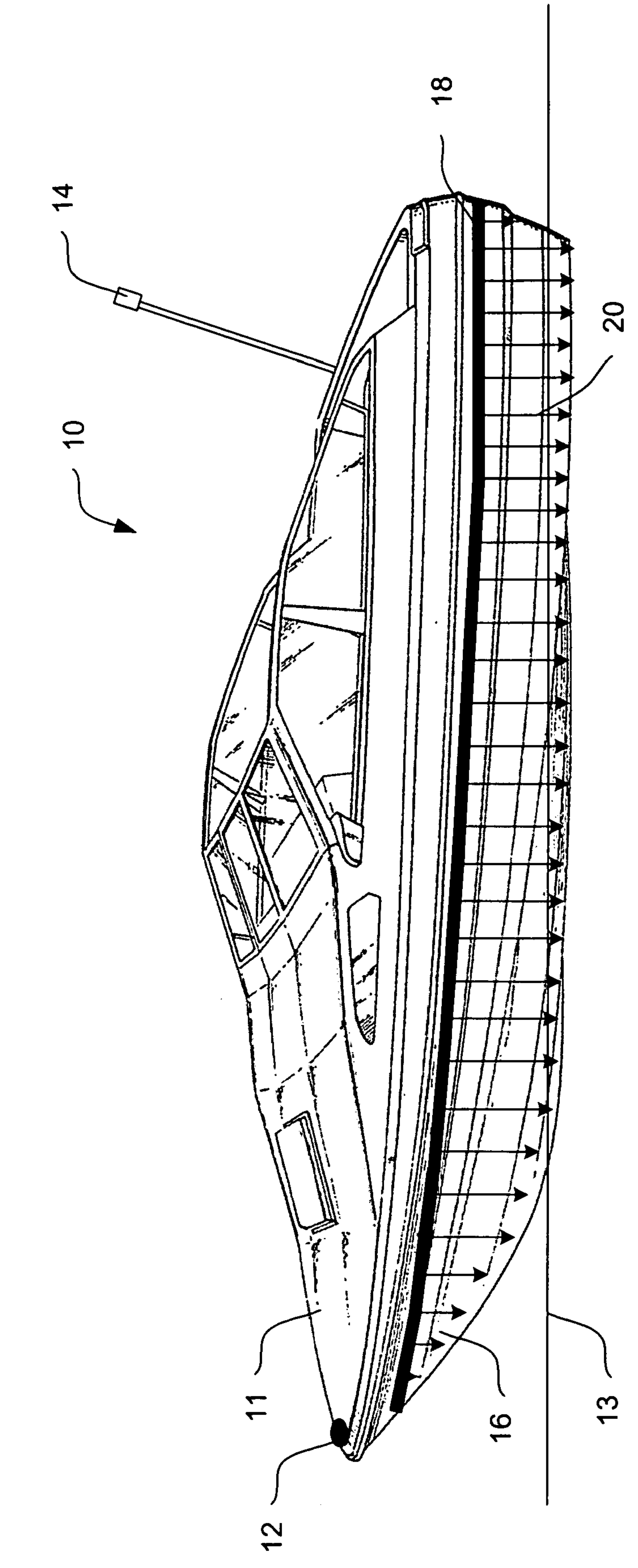
FIG. 1 is a perspective view of a boat having a first illustrative boat lighting apparatus.

FIG. 1 is a perspective view of a boat 10 having a first illustrative boat lighting apparatus in accordance with the present invention. The boat is generally shown at 10, and includes an upper deck 11 extending over a hull 16. The hull 16 extends generally down from the upper deck 11 toward an expected water line 13. The hull 16 may also extend generally inward, as shown.

Prior art navigation lights typically include forward running lights 12 and a rear masthead light 14. The forward running lights 12 typically include a red port light and a green starboard light. In many cases, the forward running lights 12 are provided in a relatively small housing mounted to the front of the boat. The rear masthead light 14 is shown mounted higher than the forward running lights 12, and is visible from the front of the boat.

This lighting configuration may be adequate for experienced boaters traveling in relatively low traffic waterways under good weather conditions. However, under other conditions, they are less desirable. Many of today's waterways are extremely crowded, often occupied with high powered boats driven by inexperienced and inattentive boaters. Safely operating a boat at night under these conditions can be a challenge. Depth perception is limited, and lights along the shoreline can cast misleading reflections on the water. In many instances, simply identifying boats via the forward running lights 12 and the masthead light 14 can be difficult, let along determining the size, direction, speed, and other factors needed to safely travel the waterways.

To augment the basic running lights 12 and 14 shown in FIG. 1, the present invention contemplates providing a boat lighting apparatus that improves the visibility of a boat by illuminating one or more side surfaces of the hull 16 of the boat 10. The hull 16 of the boat provides a relatively large area that, when illuminated, can significantly increase the visibility of a boat 10. In addition, the size, direction, and speed of a boat 10 can more readily be determined, even by novice or inattentive boaters. It is believed that by providing such visibility, boat safety can be significantly improved.

In the illustrative embodiment shown in FIG. 1, a boat lighting apparatus 18 is provided along the length of the hull 16 of the boat 10. The boat lighting apparatus 18 includes one or more light sources for producing light rays 20. The boat lighting apparatus 18 may be mounted to the boat and configured such that at least a portion of the light rays 20 illuminate a portion of the hull 16. In the embodiment shown, the boat lighting apparatus 18 provides light rays 20 that illuminate a substantial portion of the outer surface of the hull 16. Although not shown, the boat lighting apparatus 18 may continue around the perimeter of the boat hull 16, and illuminate both side surfaces of the hull and the back surface of the hull. The boat lighting apparatus 18 may provide a different color light for each side of the boat, such as a red light on the port side, a green light on the starboard side and a while light on the back side.

It is contemplated that the boat lighting apparatus 18 may or may not include a redirector (see below) for redirecting at least a portion of the light rays 20 to the side surface of the hull 16. The redirector may also prevent at least a portion of the light rays from traveling horizontally away and/or upward from the hull 16 of the boat 10.

A method of the present invention includes the steps of providing one or more light sources, and mounting the one or more light sources to the boat such that when energized, the one or more light sources illuminate a side surface of the hull 16.

Figure 2:
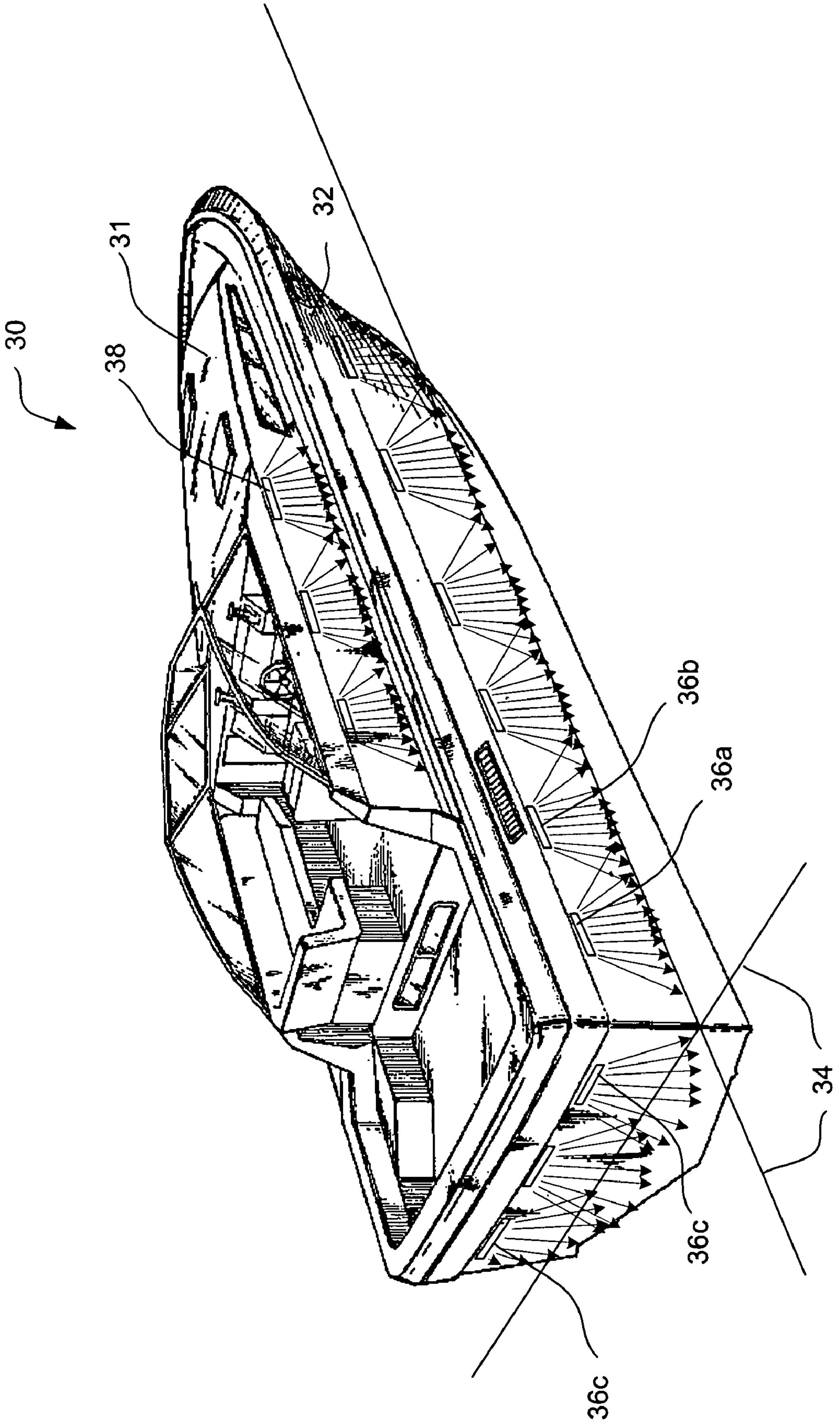
FIG. 2 is a perspective view of a boat having another illustrative boat lighting apparatus.

FIG. 2 is a perspective view of a boat having another illustrative boat lighting apparatus. The boat is generally shown at 30, and includes an upper deck 31 extending over a hull 32. The hull 32 extends generally down from the upper deck 31 toward an expected water line 34. The hull 32 may also extends generally inward, as shown. In this embodiment, a number of boat lights 36*a*, 36*b*, 36*c* and 36*d* are mounted to the hull 32 of the boat 30. Boat lights 36*a* and 36*b* are mounted to the starboard side of the hull 32, and boat lights 36*c* and 36*d* are mounted to the back of the hull 32.

Figure 3:
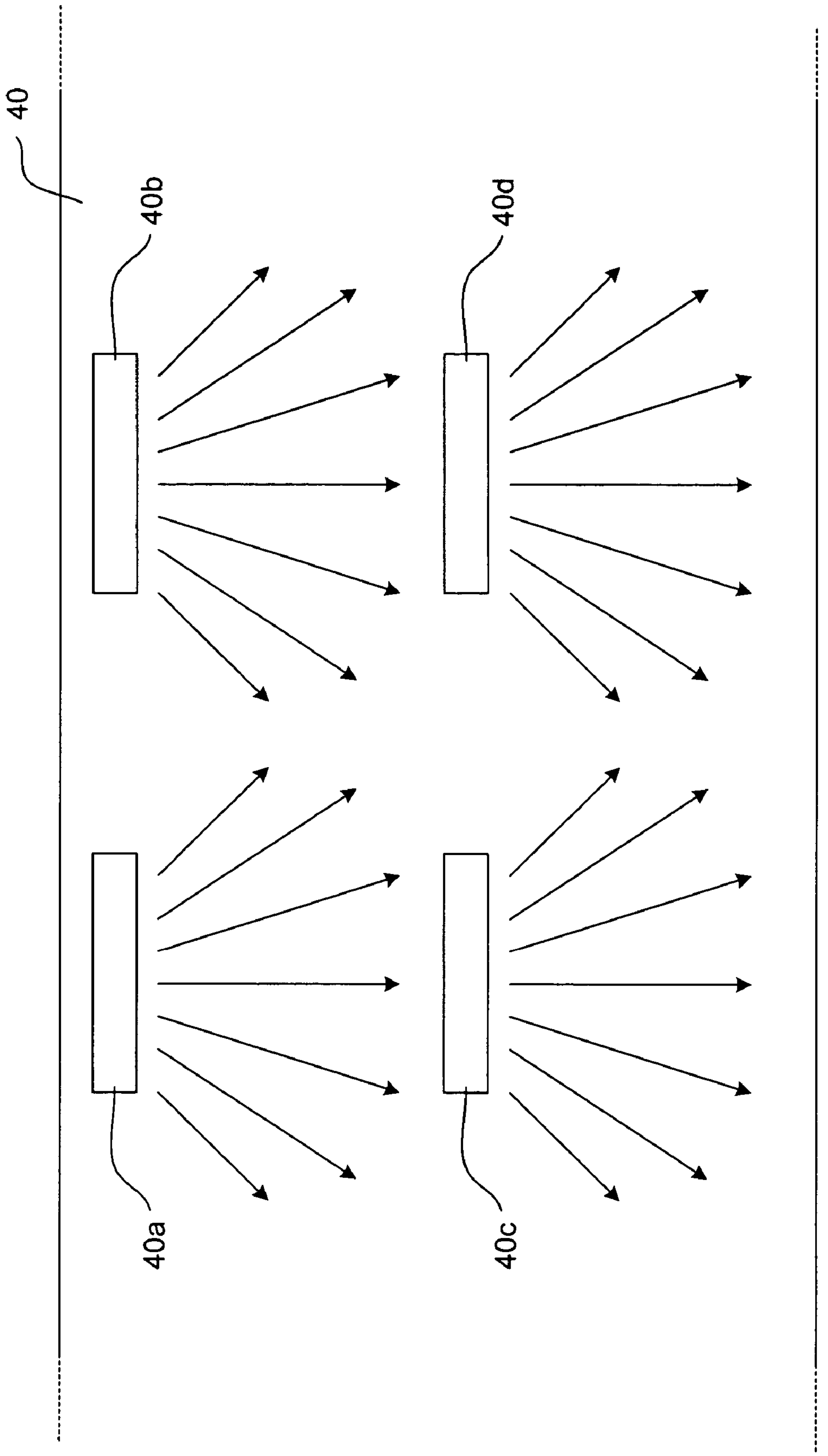
FIG. 3 is a schematic view of a boat hull having a number of boat lights, each directing light rays in a downward direction.
Figure 4:
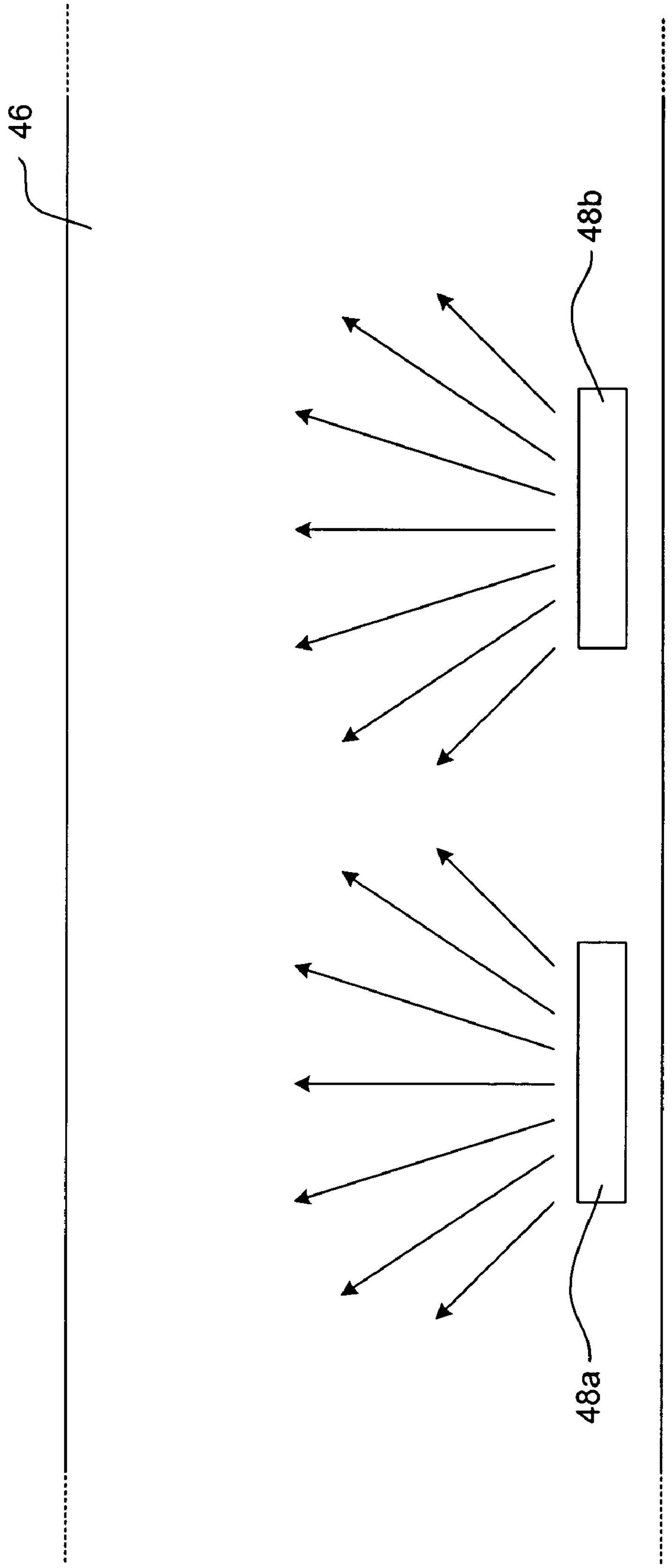
FIG. 4 is a schematic view of a boat hull having a number of boat lights, each directing light rays in an upward direction.
Figure 5:
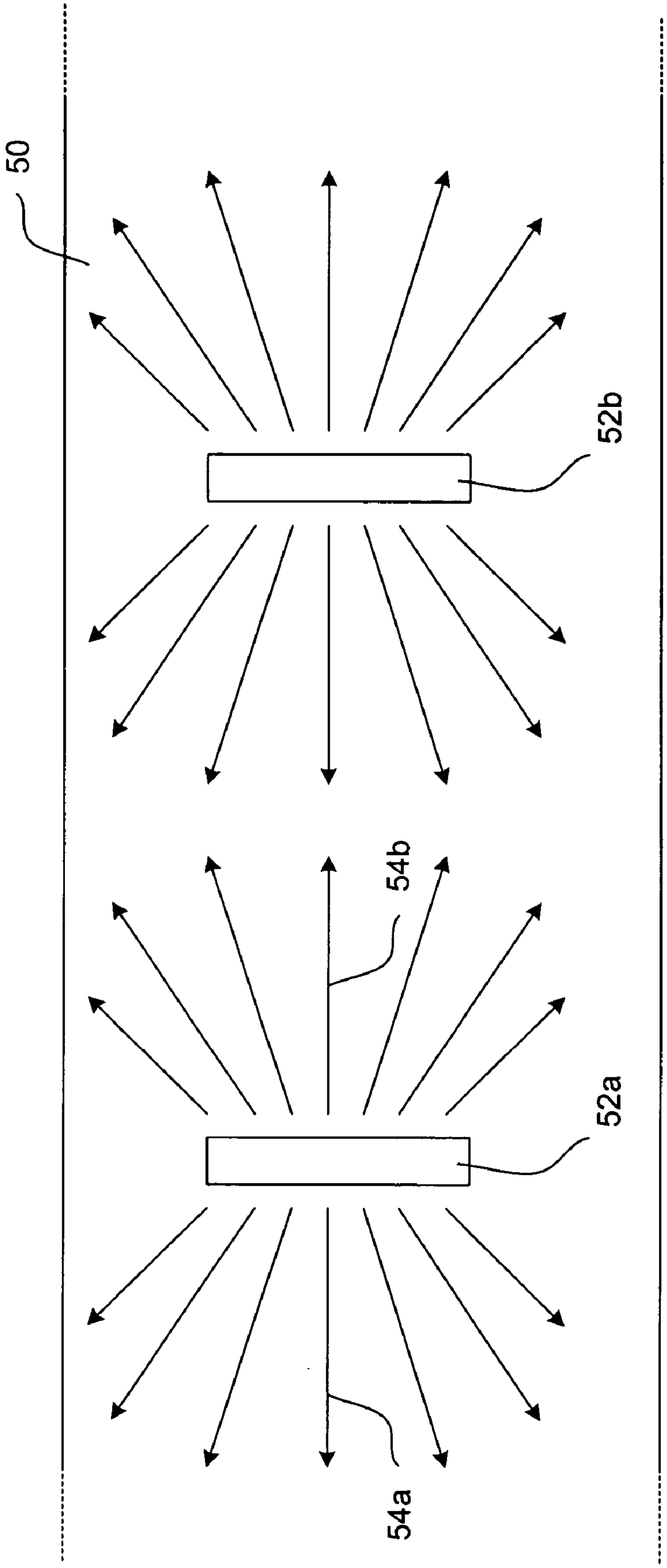
FIG. 5 is a schematic view of a boat hull having a number of boat lights, each directing light rays in forward and backward direction.

In the illustrative embodiment, each of the boat lights 36*a*, 36*b*, 36*c* and 36*d* includes at least one light source for producing a number of light rays and an elongated carrier for carrying the at least one light sources. The elongated carrier is preferably adapted for directing the light rays down to the boat hull 32 along a longitudinally extending axis, wherein the longitudinally extending axis has a length that is substantially longer than the width of the carrier, as shown. FIGS. 3–5 below show a number of illustrative placements for the lights of, for example, FIGS. 2, 6–12, 18–31, and 35–48.

It is also contemplated that when the upper deck 31 includes one or more relatively vertically extending surfaces, additional boat lights 38 may be provided to illuminate these side surfaces as well. This may even further increase the visibility of the boat 30.

FIG. 3 is a schematic view of a boat hull having a number of boat lights, each directing light rays in a downward direction. While rectangular shaped boat lights are shown, it is contemplated that the boat lights may assume any desired shape. A hull is illustrated at 40 with a number of boat lights 40*a*, 40*b*, 40*c* and 40*d* mounted thereto. Boat lights 40*a* and 40*b* are shown mounted near the top of hull 40 and provide light rays in a generally downward direction. Boat lights 40*c* and 40*d* are shown mounted in an intermediate location on hull 40, and also provide light rays in a generally downward direction.

It is recognized that only the upper row of boat lights 40*a* and 40*b* may be necessary to illuminate the boat hull 40 down to the expected water line. Some hull designs may curve significantly inward toward the expected water line. For these boat hulls, it has been found that water at the water line of the boat may reflect some of the light provided by the upper row of boat lights 40*a* and 40*b* toward the hull of the boat. In some embodiments, one or more lower rows of boat lights, such as boat lights 40*c* and 40*d*, may be provided to help illuminate the lower portion of the boat hull 40, if desired.

FIG. 4 is a schematic view of a boat hull having a number of boat lights, each directing light rays in an upward direction. A hull is illustrated at 46 with a number of boat lights 48*a* and 48*b* mounted thereto. Boat lights 48*a* and 48*b* are shown mounted on a lower portion of hull 46, and provide light rays in a generally upward direction.

FIG. 5 is a schematic view of a boat hull having a number of boat lights, each directing light rays in forward and backward direction. A hull is illustrated at 50 with a number of boat lights 52*a* and 52*b* mounted thereto. Boat lights 52*a* and 52*b* are shown mounted on the hull 50, and may provide light rays in either a forward direction, a backward direction, or both. For example, boat light 52*a* may provide light rays 54*a* in a generally backward direction, light rays 54*b* in a generally forward direction, or both.

Figure 6:
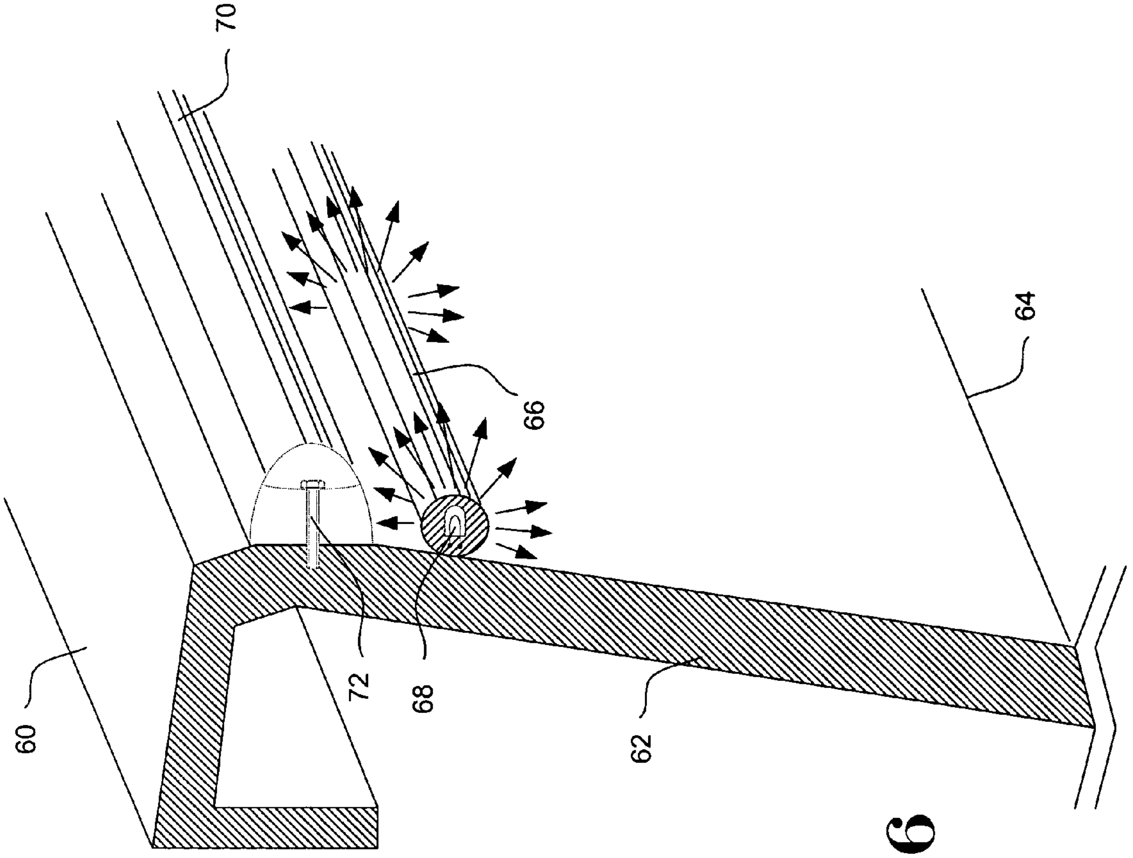
FIG. 6 is a partial cross-sectional perspective view of a boat hull having an illustrative elongated light apparatus.

FIG. 6 is a partial cross-sectional perspective view of a boat hull 60 having an illustrative elongated boat lighting apparatus 66. The boat hull 60 includes a generally downward extending portion 62 that extends to an expected water line 64. The boat hull 60 may also include a bumper assembly 70 for protecting the boat hull 60 from docks or the like. The bumper assembly 70 is shown mounted on a top portion of the downward extending portion 62 of the boat hull 60 via mounting bolt 72.

The elongated boat lighting apparatus 66 is shown mounted to the downward extending portion 62 just below the bumper assembly 70. The elongated boat lighting apparatus 66 includes at least one light source for producing a number of light rays as shown, and an elongated carrier for carrying the at least one light source. The elongated carrier is preferably at least partially transparent to allow the light rays produced by the one or more light source to exit the carrier. In the embodiment shown, the light rays exit the carrier in various directions including down to the downward extending portion 62 of the boat hull 60, horizontally away from the boat hull 60, and upward toward the bumper assembly 70. However, in some embodiments, a redirector (not shown) may be positioned adjacent the top and outer side of the carrier to redirect substantially all of the light rays to the downward extending portion 62 of the boat hull 60. The redirector may include, for example, a separate shield placed around the top and outer side of the carrier, a reflective coating positioned on the top and outer side surface of the carrier, or portions of the carrier may be made non-transparent. Alternatively, or in addition, the elongated boat lighting apparatus 66 may be incorporated into the bumper assembly 70, similar to that shown in FIG. 9.

It is contemplated that the one or more light sources 88 (as well as the other light sources referenced throughout the drawings) may be any type of light source including, but not limited to, an incandescent light source, a fluorescent light source, a light emitting diode (LED), any type of laser including one or more vertical cavity surface emitting lasers (VCSEL), electroluminescent light sources including electroluminescent wire and electroluminescent strips, a phosphor material, a glow in the dark material, or any other type of light source, either active or passive, that is capable of producing visible light.

In some embodiments, the one or more light sources may include an elongated light source, such as an electro-luminescent wire. One such electro-luminescent wire is commercially available from Solution Industries, located in Cypress, Tex., under the Trademark Flex Wire®. Another such electro-luminescent wire is commercially available from ELAM Electro-luminescent Industries Ltd., located in Jerusalem, Israel, under the Trademark LyTec™. Another suitable electro-luminescent light source is an electroluminescent strip, such as that commercially available from E-Light Technologies Inc. of Stafford, Conn. The electroluminescent light strips are long flat narrow substrates that include an electro-luminescent material along the flat side. Yet another suitable light source may include a string of light sources, such as a string of incandescent or LED light sources. One such string of light sources is available from Light Tech, Inc., located in Grand Rapids, Mich.

It is also contemplated the one or more light sources may include a light guide, such as a solid or multi-strand fiber optic cable or any other type of light transmitting medium that can transmit light rays. When so provided, the actual source of light may be located remotely, if desired, and coupled to the fiber optic cable or other type of light transmitting medium that can deliver the light rays to the desired location. One particularly suitable fiber optic cable is a linear emitting fiber, which emits light out of the side of the fiber. One such linear emitting fiber is available from Lumenyte International Corporation, Irvine, Calif., under the Trademark STA-FLEX® LEF™ Linear Emitting Fiber. More information on Linear Emitting Fibers can be found in, for example, U.S. Pat. Nos. 6,289,150, 6,282,355, 6,251,311, 5,987,199, 5,937,127, 5,903,695, RE36,157, all of which are incorporated herein by reference. Traditional fiber optical cable may also be used, if desired.

It is contemplated that in some embodiments, the light source may include a UV stabilizer, UV absorber and/or UV filter. For example, some commercially available electro-luminescent wires include a polymer coating or sleeve over the electro-luminescent material. It is contemplated that the polymer coating or sleeve may include a UV stabilizer, UV absorber and/or UV filter to help limit the deterioration of the polymer coating and/or electro-luminescent material. A preferred UV absorber is Sanduvor PR-25, available from Clariant Corp., Charlotte, N.C., which operates using photoreactive chemistry. However, other UV stabilizers, UV absorbers, and UV filters may be used, as desired.

Figure 7:
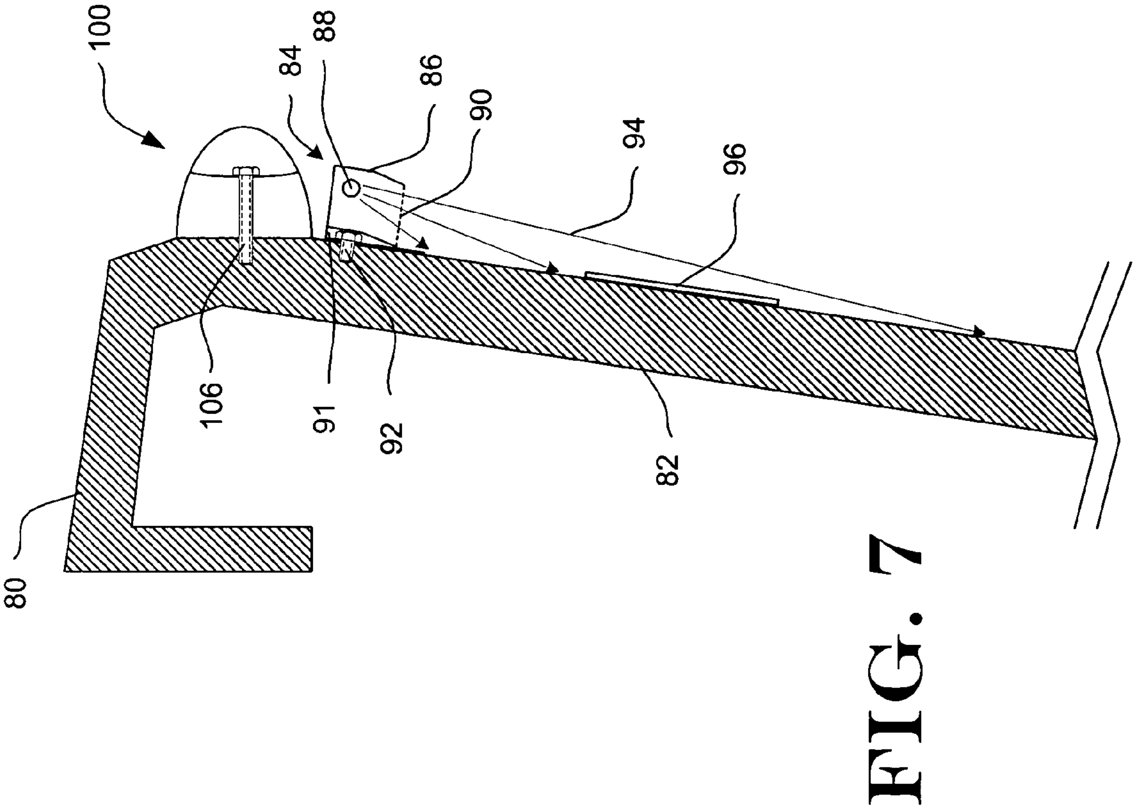
FIG. 7 is a partial cross-sectional side view of a boat hull having another illustrative boat lighting apparatus.

FIG. 7 is a partial cross-sectional side view of a boat hull having another illustrative boat lighting apparatus. The boat hull 80 includes a generally downward extending portion 82 that extends to an expected water line. The boat hull 80 may also include a bumper assembly 100 for protecting the boat hull 80 from docks or the like. The bumper assembly 100 is shown mounted on a top portion of the downward extending portion 82 of the boat hull 80 via mounting bolt 106.

In the illustrative embodiment, boat lighting apparatus 84 is mounted to the downward extending portion 82, just below the bumper assembly 100. The boat lighting apparatus 84 includes one or more light sources 88 for providing light rays, a housing 86 for carrying the light source 88, and a mount 91 for mounting the housing 86 to the boat. The mount 91 is shown bolted to the side of the downward extending portion 82 of the hull via a bolt or screw 92. It is contemplated, however, that any number of means may be used to attach the mount to the boat including an adhesive or the like.

The housing 86 preferably has at least one opening 90 for directing the light rays 94 to at least a portion of the hull of the boat. In the illustrative embodiment shown, the housing 86 includes a wall that extends around three sides of the light source 88, leaving the one opening 90 on the fourth downward side. Such a configuration not only helps direct the light rays 94 toward the hull of the boat, but also helps prevent at least a portion of the light rays from traveling laterally away from the hull of the boat. The inside surface of the housing 86 may be reflective, and may be shaped to help redirect the light rays 94 in a downward direction toward the hull of the boat. The housing 86 may also include a bracket (not shown) for carrying the one or more light sources 88.

A transparent or semi-transparent plate may be positioned across the opening 90. The transparent or semi-transparent plate may be constructed as a lens or the like to help redirect and/or focus the light on the hull of the boat. It is also contemplated that the transparent or semi-transparent plate may include a pattern provided thereon or therein to cause an image to be projected onto the hull of the boat. Finally, the transparent or semi-transparent plate may help protect the one or more light sources 88 from water or other undesirable environmental conditions.

In some embodiments, the transparent or semi-transparent plate may include a UV stabilizer, UV absorber and/or UV filter. The remainder of the housing 86 may also include a UV stabilizer, UV absorber and/or UV filter. This may help prevent deterioration of the transparent or semi-transparent plate and/or housing 86, and may limit the amount of UV radiation that engages the one or more light sources. This may help extend the life of the light assembly, especially when exposed to sun light. It is contemplated that UV stabilizers, UV absorbers and/or UV filters may be applied to the carriers, housings, light sources, and other parts of the various embodiments disclosed herein, as desired.

To enhance the illumination of the hull of the boat, it is contemplated that a reflective medium 96 may be provided in or on the outer surface of the boat as shown. The reflective medium preferably helps reflect the light rays 94 laterally outward and away from the hull of the boat to enhance the visibility of the boat. It is contemplated that the reflective medium may be patterned to form an image. The image may be, for example, the name of the boat, advertising logos or any other desired image.

Figure 8:
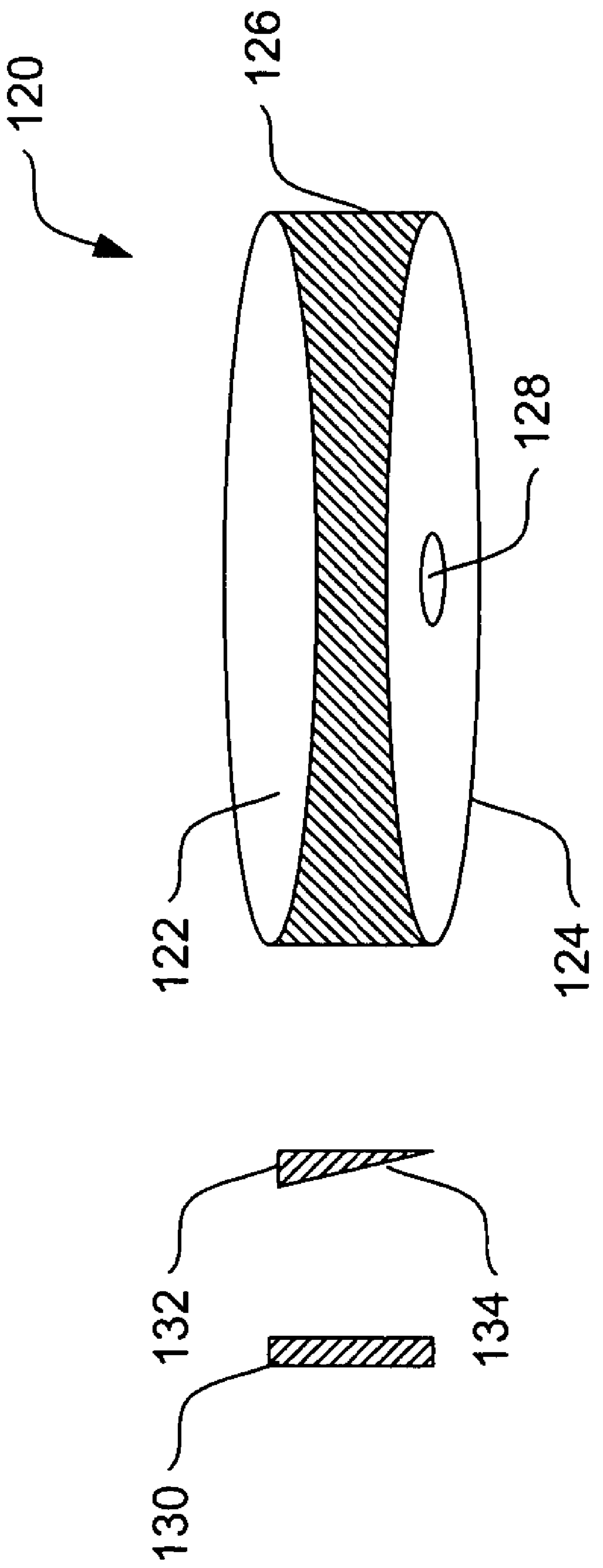
FIG. 8 is a perspective view of another illustrative boat lighting apparatus in accordance with the present invention.

FIG. 8 is a perspective view of another illustrative boat lighting apparatus in accordance with the present invention. This illustrative boat lighting apparatus includes a round housing 120 that has an outer plate 122 and an inner plate 124. The inner plate 124 is preferably positioned adjacent the boat hull when installed, and includes a hole 128 for receiving wires or the like to power a local light source. While a round housing is shown, it is contemplated that the housing 120 may be any shape.

A side plate 126 extends around part of the perimeter of the outer plate 122 and the inner plate 124. In the embodiment shown, the side plate 126 extends around the perimeter of about the upper half of the outer plate 122 and inner plate 124, leaving the perimeter around the lower half open. A light source (not shown) is preferably provided in the space between the outer plate 122 and the inner plate 124. In this configuration, the outer plate 122, inner plate 124 and side plate 126 help redirect the light rays provided by the light source downward through the opening toward the hull of the boat.

A transparent or semi-transparent plate 130 may extends around the lower perimeter of the outer plate 122 and the inner plate 124. The transparent or semi-transparent plate 130 helps protect the light source from water and other undesirable environmental conditions. It is contemplated that the transparent or semi-transparent plate may be configured as a lens or the like to help focus or redirect the light rays to the hull of the boat. One such transparent or semi-transparent plate is illustrated at 132, and has an outer surface 134 that tapers inward toward the boat. Because the lens is thicker away from the boat, the light rays traveling parallel to the hull of the boat are refracted more than those light rays that are already traveling toward the hull of the boat. This may help increase the illumination of the hull of the boat.

Figure 9:
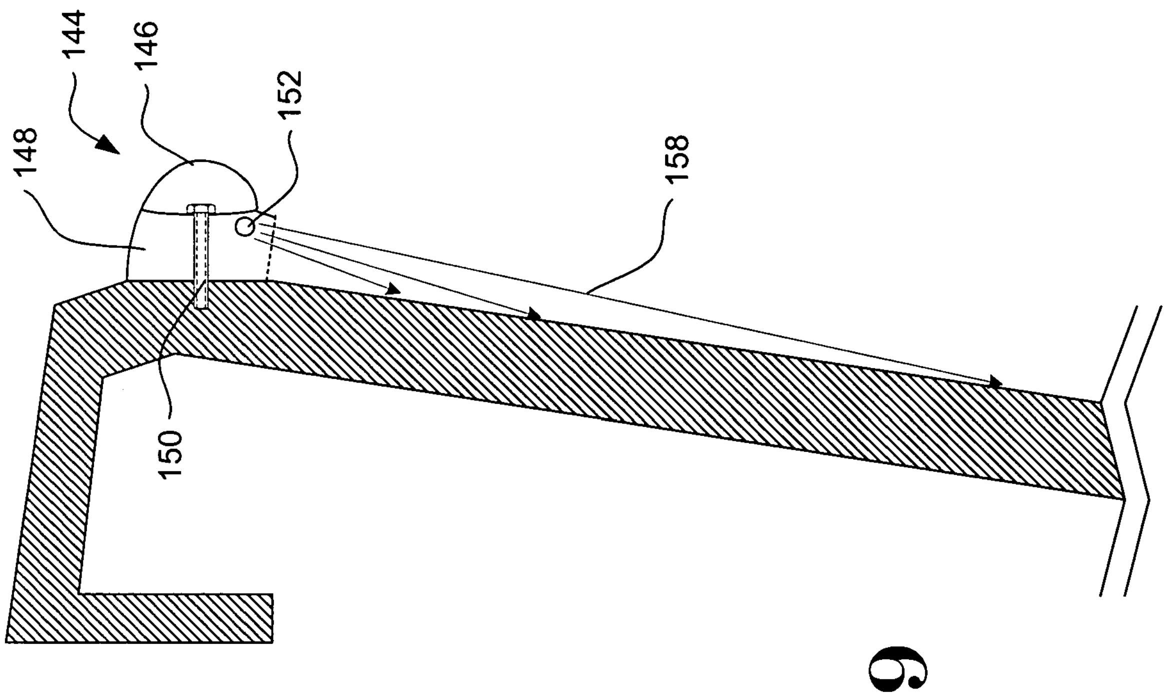
FIG. 9 is a partial cross-sectional side view of a boat hull having a boat lighting apparatus incorporated into a side bumper assembly.

FIG. 9 is a partial cross-sectional side view of a boat hull with yet another boat lighting apparatus. This embodiment is similar to that shown in FIG. 7, but has the boat lighting apparatus integrated or incorporated into the bumper assembly 144. The bumper assembly 144 includes a flexible bumper guard 146 attached to an elongated housing 148. The elongated housing 148 is attached to the hull of the boat via a bolt or screw 150. The elongated housing 148 preferably has a cavity therein for receiving one or more light sources 152. The cavity is preferably open along the lower surface thereof to allow the light rays 158 to illuminate the hull of the boat.

Figure 10:
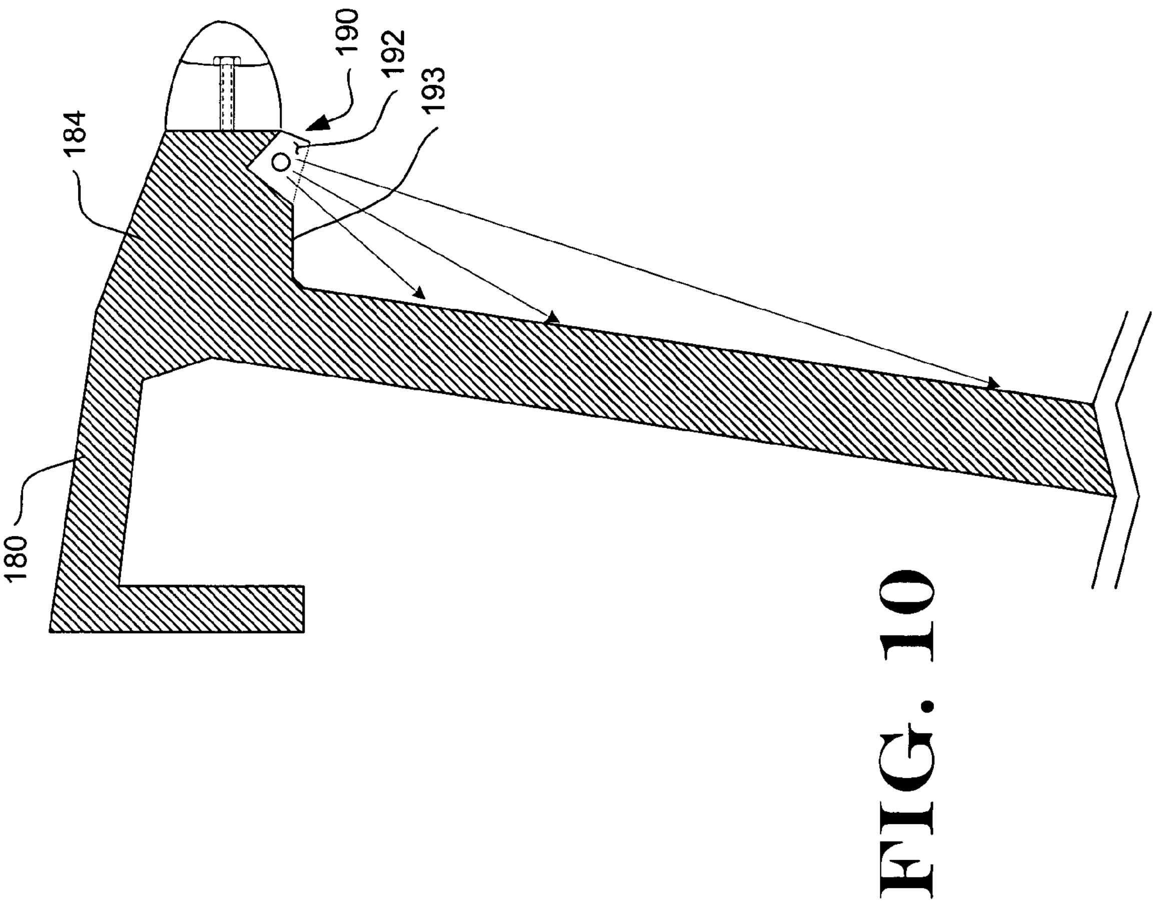
FIG. 10 is a partial cross-sectional side view of a boat hull having a boat lighting apparatus incorporated into an outward extending hull portion.

FIG. 10 is a partial cross-sectional side view of a boat hull having a boat lighting apparatus incorporated into an outward extending hull portion. In this embodiment, the boat hull 180 includes an outward extending hull portion 184. The boat lighting apparatus 190 may then be provided in a cavity 192 provided in the lower surface of the outward extending hull portion 184. Alternatively, a boat lighting apparatus similar to that shown in FIG. 7, for example, may be mounted to a lower surface 193 of the outward extending hull portion 184 to illuminate the hull of the boat.

Figure 11:
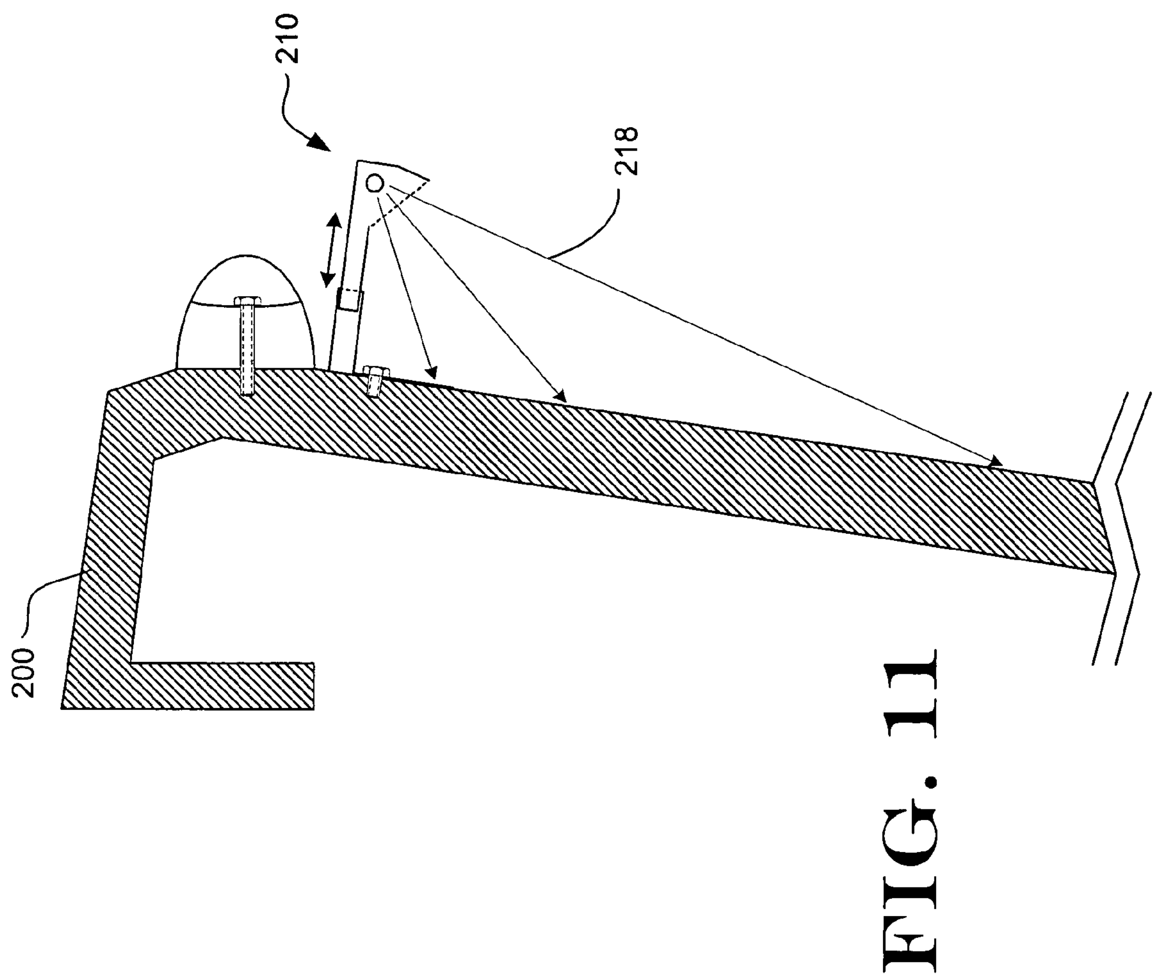
FIG. 11 is a partial cross-sectional side view of a boat hull having a telescoping boat lighting apparatus.

FIG. 11 is a partial cross-sectional side view of a boat hull having a telescoping boat lighting apparatus. In this embodiment, the boat lighting apparatus 210 has a housing that includes a telescoping lever for allowing the light source to be selectively pulled laterally away from the boat. When extended, the light source is further away from the boat hull, thereby increasing the angle of incidence of the light rays 218 at the hull of the boat. By increasing the angle of incidence, the amount of light that is reflected laterally away from the boat may be increased, thereby increasing the visibility of the hull. When contracted, the boat lighting apparatus 210 is preferably safely out of the way to reduce the chance that the boat lighting apparatus 210 will become damaged by other boats, docks or the like.

Figure 12:
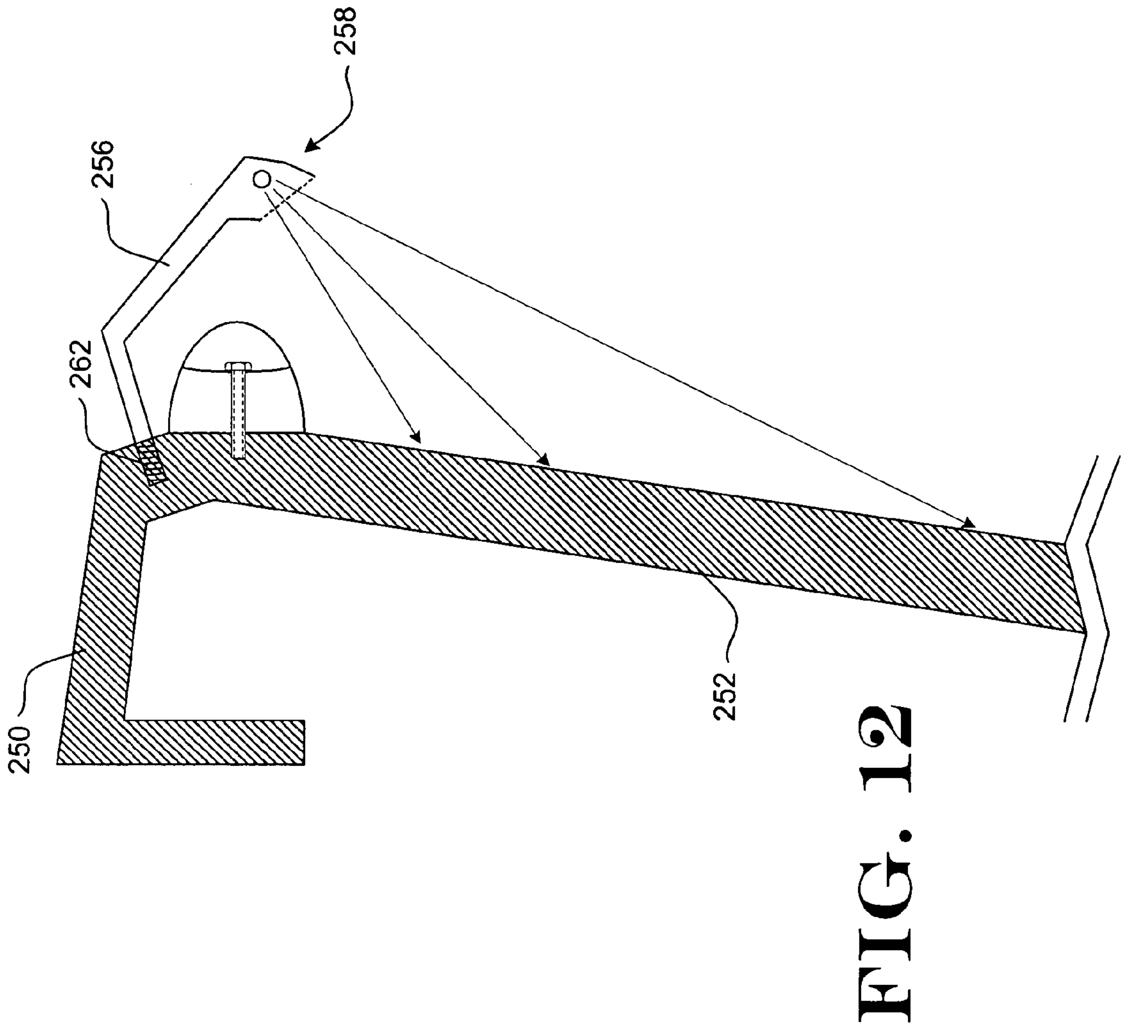
FIG. 12 is a partial cross-sectional side view of a boat hull having a threaded boat lighting apparatus.

FIG. 12 is a partial cross-sectional side view of a boat hull having a threaded boat lighting apparatus. In this embodiment, the boat lighting apparatus 258 includes a threaded end 262. The threaded end 262 preferably is adapted to engage a threaded hole in the hull of the boat. This allows the boat lighting apparatus 258 to be easily removed from the hull of the boat during, for example, daylight hours. In the illustrative embodiment, the boat lighting apparatus 258 is mounted near the top of the hull 250 so that boater inside the boat can easily remove the lights. In this configuration, a laterally extending portion 256 may be provided to extend the light source a sufficient distance away from the boat hull to adequately illuminate the hull of the boat. While the boat lighting apparatus 258 is shown mounted near the top of the hull 250, it is contemplated that the boat lighting apparatus 258 may be mounted anywhere on the boat, including further down on the downward extending portion 252.

Figure 13:
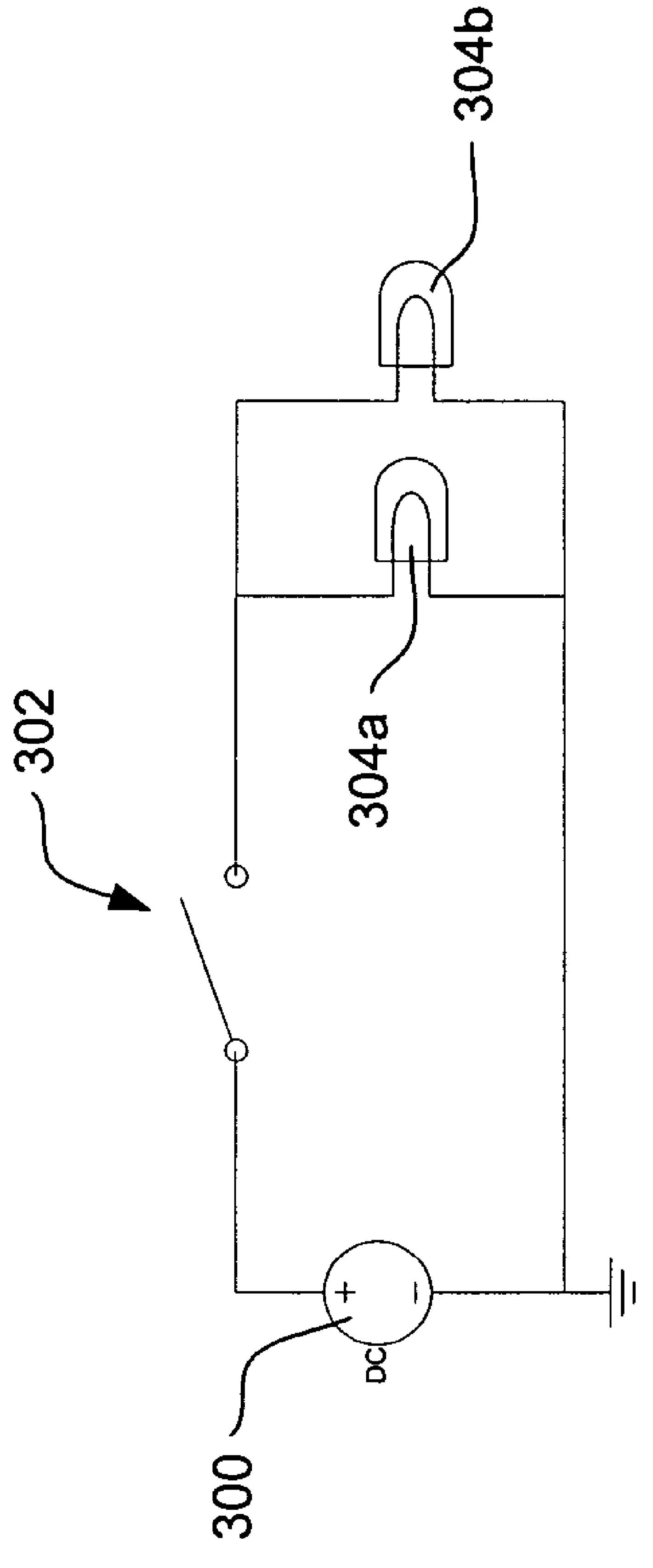
FIG. 13 is a schematic view of an illustrative circuit for powering the one or more light sources of the present invention.

FIG. 13 is a schematic view of an illustrative circuit for powering the one or more light sources of the present invention. In the embodiment shown, a power source 300 is coupled to one or more light sources 304*a* and 304*b* via switch 302. The one or more light sources 304*a* and 304*b* are preferably coupled in a parallel configuration with power source 300, as shown. This allows each light source 304*a* and 304*b* to continue to operate even when one or more of the remaining light sources burns out or otherwise becomes damaged. The power source 300 may be any type of power source, but preferably is the boat battery, the boat alternator, or any other type of power source that is capable of properly driving the one or more light sources 304*a* and 304*b*.

Figure 14:
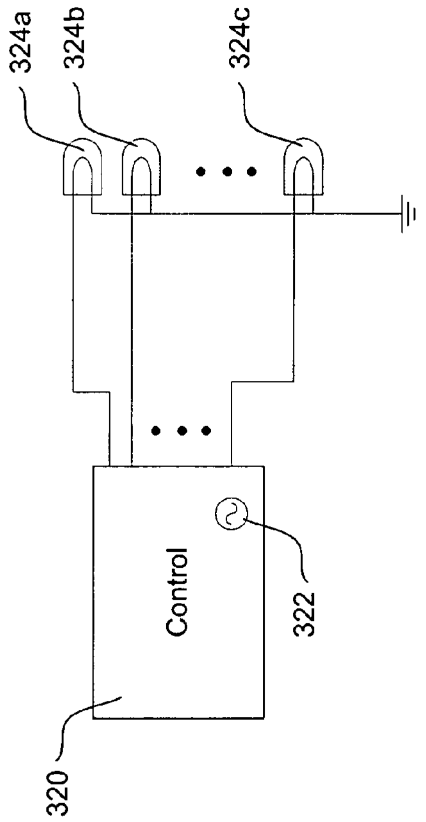
FIG. 14 is a schematic view of another illustrative circuit for powering the one or more light sources of the present invention.

FIG. 14 is a schematic view of another illustrative circuit for powering the one or more light sources of the present invention. In this embodiment, an electronic control circuit 320 provides power to each of a number of light sources 324*a*, 324*b* and 324*c*. The electronic control circuit receives power from a power source 322, and may be any type of control circuit that provides the desired functionality. Preferably, the control circuit is a simple state machine, a microprocessor, or any other type of control circuit.

Figure 15:
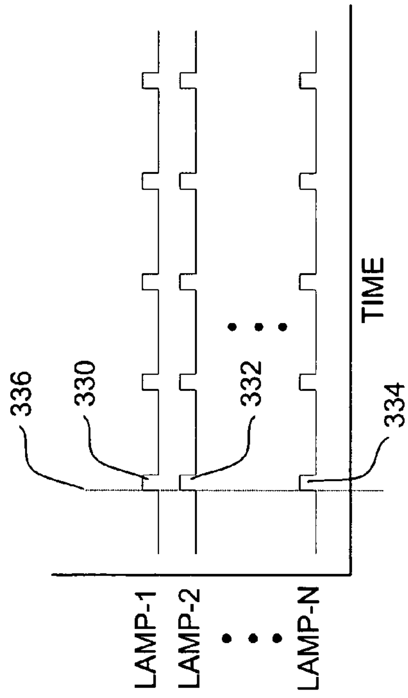
FIG. 15 is a timing diagram showing one illustrative energizing scheme provided by the control block of FIG. 14.

FIG. 15 is a timing diagram showing one illustrative energizing scheme that can be provided by the control circuit 320 of FIG. 14. In this illustrative embodiment, the control circuit 320 simultaneously provides energizing pulses 330, 332 and 334 to light sources 324*a*, 324*b* and 324*c*, respectively, for example at time 336. Each of the energizing pulses 330, 332 and 334 has the same duration. Accordingly, this causes each of the light sources 324*a*, 324*b* and 324*c* to blink "on" during the corresponding energizing pulse, and "off" after the energizing pulse terminates. After a time period, all of the light sources 324*a*, 324*b* and 324*c* are again energized. This causes each of the light sources 324*a*, 324*b* and 324*c* to simultaneously blink "on" and "off". It is believed that a blinking light may increase the visibility of the hull, especially for inattentive boaters.

Figure 16:
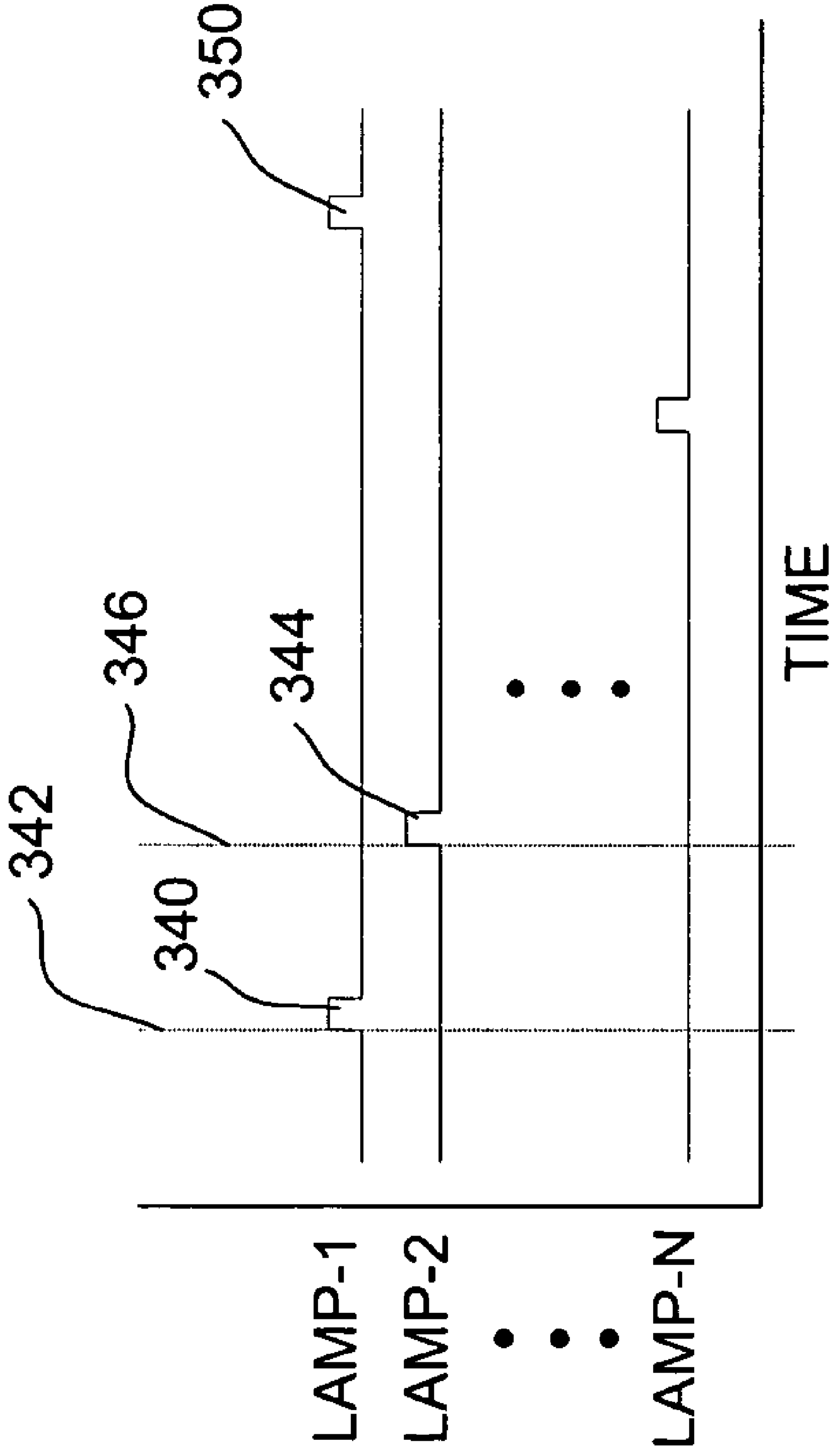
FIG. 16 is a timing diagram showing another illustrative energizing scheme provided by the control block of FIG. 14.

FIG. 16 is a timing diagram showing another illustrative energizing scheme that can be provided by the control circuit 320 of FIG. 14. In this illustrative embodiment, each of the light sources is energized in a sequential manner. For example, light source 324*a* is energized by energizing pulse 340 at time 342. Later, light source 324*b* is energized by energizing pulse 344 at time 346. Finally, light source 324*c* is energized. This sequence may be repeated. In a preferred embodiment, the light sources 324*a*, 324*b* and 324*c* are spaced longitudinally along the length of the boat. By illuminating the light sources in sequence, a moving or sweeping pattern may be generated across the hull of the boat. This may further increase the visibility of the hull of the boat. It is recognized that the embodiments shown in FIGS. 14–16 are only illustrative, and that numerous other lighting sequences can be used.

Figure 17:
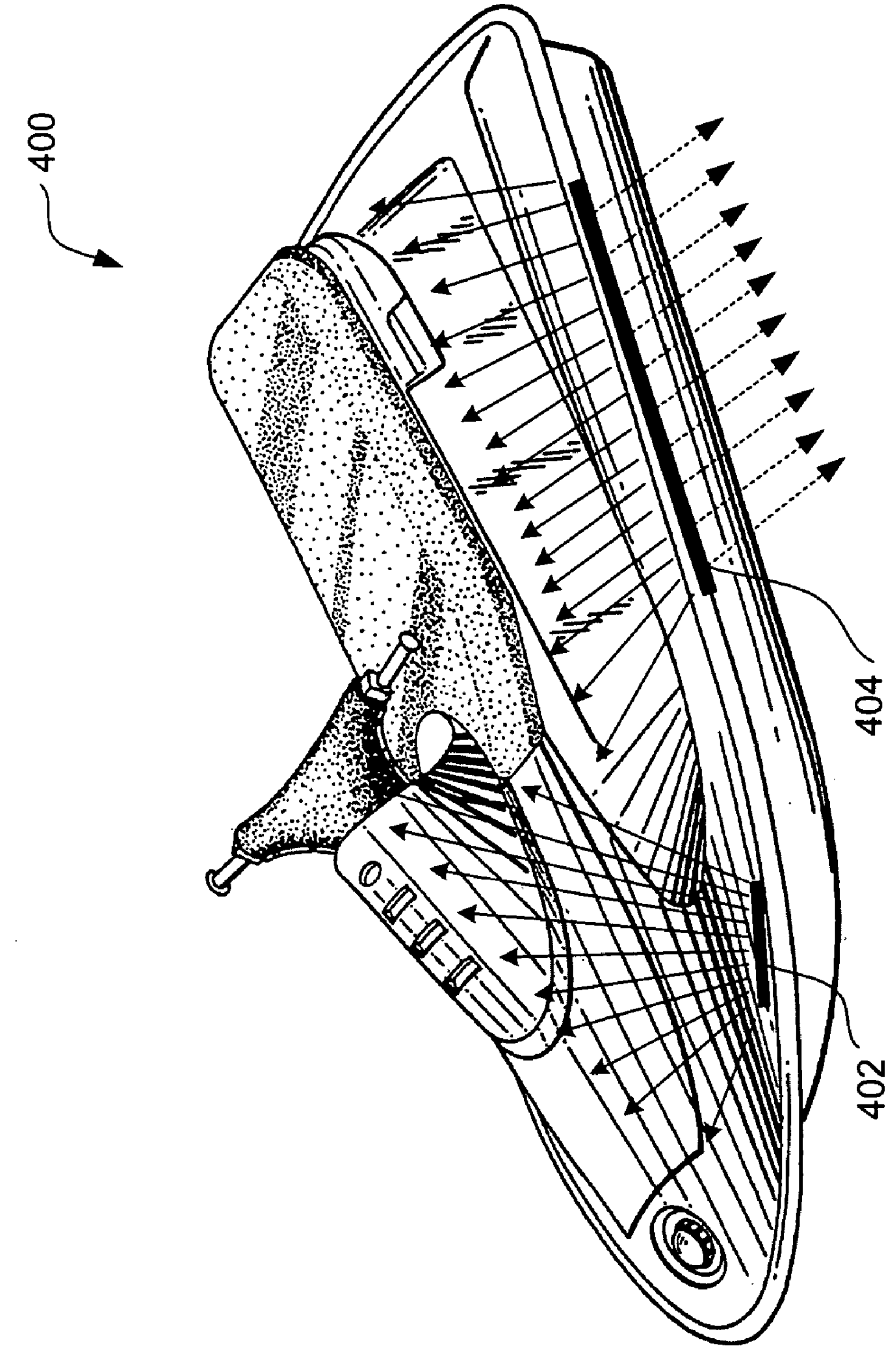
FIG. 17 is a perspective view of a personal watercraft having a boat lighting apparatus mounted thereto.

FIG. 17 is a perspective view of a personal watercraft having one or more boat lights 402 and 404 mounted thereto. Boat lights 402 and 404 are preferably similar to that described herein and preferably illuminate at least a portion of the side surfaces of the personal watercraft. While a personal watercraft is shown in FIG. 17, it is contemplated that the boat lighting apparatus of the present invention may be used to light the side surfaces of airplanes, snowmobiles, automobiles, all terrain vehicles, or any other type of "vehicle" as that term is used in the most general sense, to increase their visibility to outside observers.

Figure 18:
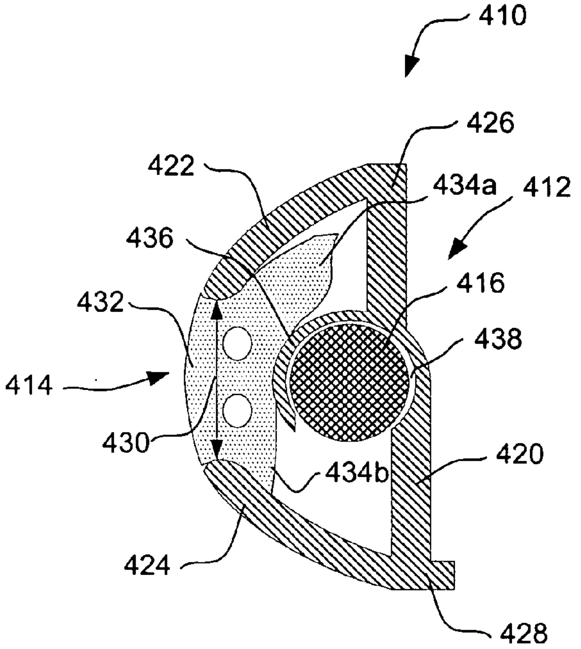
FIG. 18 is a cross-sectional side view of an illustrative lighting apparatus that includes a bumper member.

FIG. 18 is a cross-sectional side view of another illustrative lighting apparatus of the present invention. The illustrative lighting apparatus is generally shown at 410, and includes a carrier 412, a bumper member 414, and a light source 416. The carrier 412 includes a back support 420, a top support 422 and a bottom support 424, as shown. The terms "back", "bottom" and "top" are only used herein as relative terms to help describe the Figures. They are not intended to imply that the bottom support 420 must be below the top support 422 when the carrier 412 is actually mounted to an object. The top support 422 and bottom support 424 are shown extending from the top 426 and bottom 428 ends, respectively, of the back support 420 in a leftward direction. The top support 422 and bottom support 424 terminate to define a gap or slot 430 therebetween.

The bumper member 414 is shown positioned in the gap or slot 430. The bumper member 414 preferably has an outer facing portion 432 that is sized to fit into the slot 430, and one or more inner facing legs 434*a* and 434*b* that extend into the cavity formed by the top support 422 and bottom support 424 of the carrier 412. The one or more legs 434*a* and 434*b* preferably have a dimension that exceeds the lateral dimension of the slot 430, which helps secure the bumper member 414 to the carrier 412. In some embodiments, the bumper member 414 and/or carrier 412 are at least somewhat deformable, so that the bumper member 414 and/or the elongated carrier 412 can or must be elastically deformed (e.g. bent or otherwise deformed) to allow the one or more legs 434*a* and 434*b* of the bumper member 414 to slip through the slot 430. The bumper member 414 may also have one or more holes or lumens 440*a* and 440*b*. These holes or lumens 440*a* and 440*b* may decrease the rigidness of the bumper member 414, as desired.

In one illustrative embodiment, the back support 420, top support 422 and bottom support 424 of the carrier 412 are integrally formed by extrusion, although this is not required. In some embodiments, the back support 420, top support 422 and bottom support 424 of the carrier 412 are made from a relatively rigid material, such as Vinyl, PVC, aluminum, or any other suitable material.

The bumper member 414 may also be formed by extruding a material such as Vinyl, PVC, rubber, or any other suitable material. However, like above, this is not required. Preferably, the bumper member 414 is formed from a softer material than the carrier 412, but this is also not required.

In the illustrative embodiment shown in FIG. 18, the carrier 412 has an inner support member 436 that is curved to form a light receiving opening or cavity 438. In the illustrative embodiment, the inner support member 436 is adapted to receive and secure an elongated light source 416. In a preferred embodiment, the elongated light source 416 is an electro-luminescent wire or a Linear emitting fiber, as detailed above. However, it is contemplated that the elongated light source 416 may be any type of light source, including those discussed above.

The inner support member 436 may be at least partially transparent or non-transparent. When the inner support member 436 is non-transparent, the light emitted by the light source is directed in a downward direction toward the bottom support 424 of the carrier 412. When so provided, at least a portion of the bottom support 424 is preferably at least partially transparent. This may be accomplished by, for example, forming the bottom support 424 or a portion thereof from a material that is at least semi-transparent. Alternatively, holes or slots may be provided in the bottom support 424 to allow the light to pass through the bottom support 424. In some embodiments, the holes or slots may be spaced holes or slots that are spaced along the length of the bottom support 424. Such spaced holes or slots may be formed by, for example, periodically interrupting the extrusion material along the bottom support 424. Other methods may also be used, such as cutting, drilling or otherwise forming spaced holes or slots. Spaced holes or slots may be used in other embodiments described herein, if desired.

In some embodiments, the back support 420, top support 422 and bottom support 424 may be formed from a transparent or semi-transparent material. In other embodiments, only selected portions may be formed from a transparent or semi-transparent material. For example, the bottom support 424, or portion thereof, may be formed from a transparent or semi-transparent material. In this latter case, the back support 420, top support 422 and bottom support 424 may be co-extruded using a non-transparent and transparent or semi-transparent material, with the transparent or semi-transparent material corresponding to the portion that is to transmit light. Alternatively, the bottom support 424, or the portion thereof that is to pass light, may be separately formed and subsequently attached, if desired.

In another illustrative embodiment, the inner support member 436 or a portion thereof may be made from a transparent or semi-transparent material to pass light toward the bumper member 414. In this illustrative embodiment, the bumper member 414, or a portion thereof, may also be formed from a transparent or semi-transparent material. When so provided, the light from the light source 416 may pass through the inner support member 436, through the bumper member 414, and away from the carrier 412. In use, the back support 420 is preferably positioned adjacent a mounting surface and mounted thereto.

It is contemplated that the bumper member 414 and/or carrier 412, or parts thereof, may be made using materials of different colors, as desired. Also, it is contemplated that the light source may be selected to produce a desired color of light.

Figure 19:
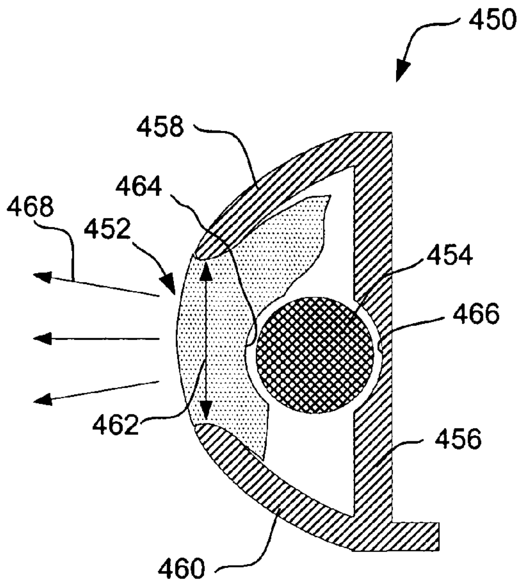
FIG. 19 is a cross-sectional side view of an illustrative lighting apparatus that includes a bumper member, wherein at least a portion of the bumper member is adapted to transmit light.

FIG. 19 is a cross-sectional side view of another illustrative lighting apparatus of the present invention. The illustrative lighting apparatus includes a carrier 450, a bumper member 452, and a light source 454. The carrier 450 includes a back support 456, a top support 458 and a bottom support 460, as shown. The top support 458 and bottom support 460 are shown extending from the top and bottom ends, respectively, of the back support 456 in a leftward direction. The top support 458 and bottom support 460 terminate to define a gap or slot 462 therebetween.

The bumper member 452 is shown positioned in the gap or slot 462, as described above. In the illustrative embodiment, the back surface 464 of the bumper member 452 and the front surface 466 of the back support 456 are shaped to form a light receiving channel, opening or cavity. In the illustrative embodiment, the light receiving channel, opening or cavity is adapted to receive and secure an elongated light source 454. It is contemplated that the elongated light source 454 may be any type of light source, including those identified herein.

The bumper member 452, or a portion thereof, is preferably formed from a transparent or semi-transparent material. When so provided, the light from the light source 454 may pass through the bumper member 452, and away from the carrier 450 as shown by lines 468.

Figure 20:
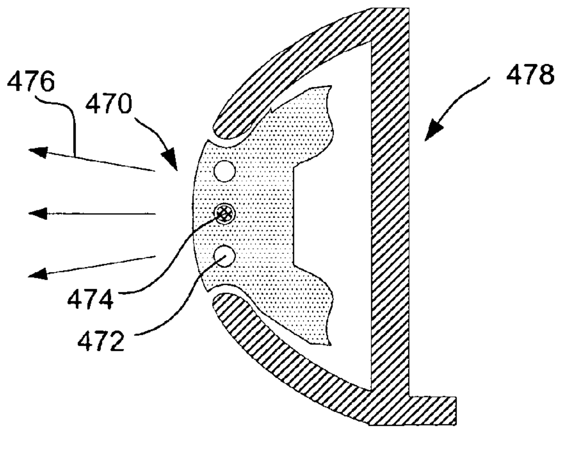
FIG. 20 is a cross-sectional side view of another illustrative lighting apparatus that includes a bumper member, wherein the bumper member is adapted to receive a light source and transmit light.

FIG. 20 is a cross-sectional side view of another illustrative lighting apparatus in accordance with the present invention. In this illustrative embodiment, the bumper member 470 includes one or more holes, slots or lumens 472. A light source 474 is then positioned in one or more of the holes, slots or lumens 472. Only one light source 474 is shown in FIG. 20. The bumper member 470, or a portion thereof, is preferably formed from a transparent or semi-transparent material. When so provided, the light from the light source 474 may pass through the transparent or semi-transparent portion of the bumper member 470 and away from the carrier 478, as shown by lines 476.

When more than one light source 474 is provided, each light source 474 may be situated in a different one of the holes or lumens 472, but this is not required. Selected light sources may be selected to produce different colors. Alternatively, or in addition, the portion of the bumper member 470 adjacent selected light sources may be formed from materials of different colors. In some embodiments, this may provide the appearance of one or more stripes of colors along the bumper member 470.

Figure 21:
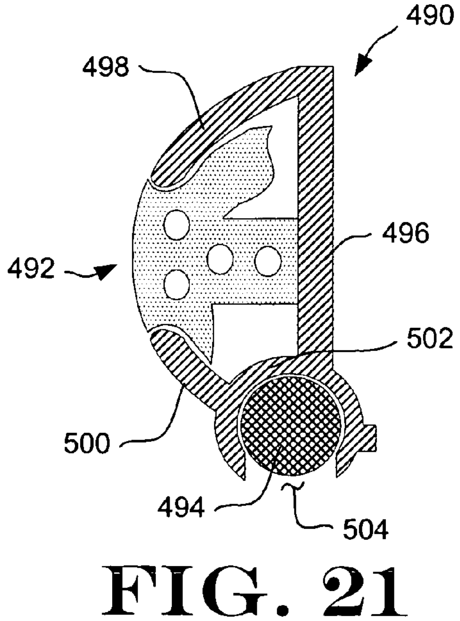
FIG. 21 is a cross-sectional side view of an illustrative lighting apparatus that includes a carrier and a bumper member, wherein the carrier is adapted to receive a light source.

FIG. 21 is a cross-sectional side view of another illustrative lighting apparatus in accordance with the present invention. In this illustrative embodiment, the lighting apparatus includes a carrier 490, a bumper member 492, and a light source 494. The carrier 490 includes a back support 496, a top support 498 and a bottom support 500, as shown. Like above, the top support 498 and bottom support 500 terminate to define a gap or slot for receiving the bumper member 492.

In some embodiments, the back support 496, top support 498 and bottom support 500 of the carrier are made from a relatively rigid material, such as Vinyl, PVC, aluminum, or any other suitable material. The bumper member 492 may also be formed by, for example, extruding a material such as Vinyl, PVC, rubber, aluminum or any other suitable material. However, like above, this is not required. Preferably, the bumper member 492 is formed from a softer material than the carrier, but this is also not required.

In the illustrative embodiment, the back support 496 and the bottom support 500 are joined together through a light carrying member 502. Although not shown in FIG. 21, it is contemplated that the back support 496 and the top support 498 may also be joined together through another light carrying member, if desired, to provide light in an upward direction. The light carrying member 502 preferably defines a channel, cavity or recess for receiving the light source 494. Preferably, the cavity or recess is sized to receive the light source and secure the light source 494 to the carrier 490. In the illustrative embodiment, the cavity or recess has a receiving slot 504 for receiving the light source 494. In a preferred embodiment, the light source 494 is an elongated light source such as an electro-luminescent wire or a Linear Emitting Fiber, as detailed above. However, it is contemplated that the light source 494 may be any type of light source, including those identified herein.

Figure 22:
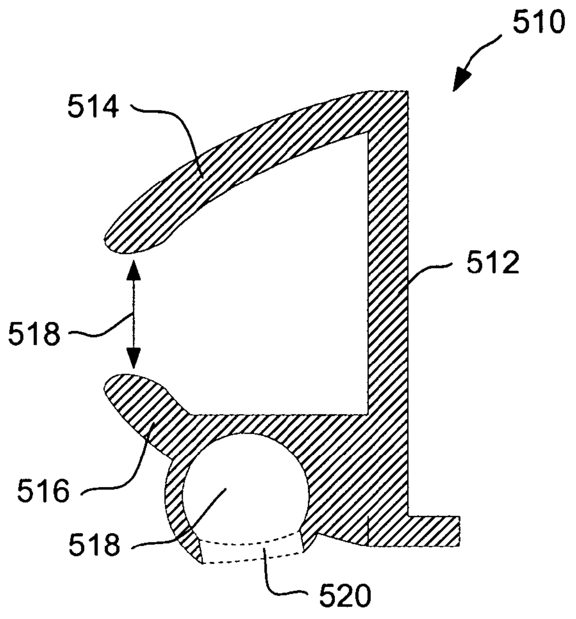
FIG. 22 is a cross-sectional side view of another illustrative lighting apparatus that includes a carrier that is adapted to receive a light source.

FIG. 22 is a cross-sectional side view of yet another illustrative lighting apparatus in accordance with the present invention. In this illustrative embodiment, the lighting apparatus includes a carrier 510. For simplicity, the bumper member and light source are not shown. The carrier 510 includes a back support 512, a top support 514 and a bottom support 516, as shown. Like above, the top support 514 and bottom support 516 terminate to define a gap or slot 518 for receiving a bumper member.

In the illustrative embodiment, the bottom support 516 is shaped to provide a light carrying channel, cavity or recess 518. The light carrying channel, cavity or recess 518 preferably is sized to receive a light source. In the illustrative embodiment, the channel, cavity or recess 518 preferably has a transparent or semi-transparent portion 520 for passing light in a downward direction. The transparent or semi-transparent portion 520 may be co-extruded with the rest of the carrier 510, which may be made from a non-transparent material, if desired. Alternatively, the transparent or semi-transparent portion 520 may be formed separately, and subsequently secured to the bottom support 516.

Figure 24:
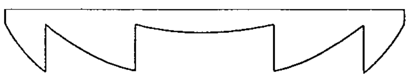
FIG. 24 is a cross-sectional side view of an illustrative Fresnel lens that may be used in accordance various embodiments of the present invention.

In either case, and in some embodiments, the transparent or semi-transparent portion 520 may be shaped to form a Fresnel lens, as shown in FIG. 24. A Fresnel lens may help collect and focus the light that is emitted by the light source. A Fresnel lens may also help minimize the amount of absorption in the lens by reducing the thickness of the lens. Other lens shapes may also be used.

Figure 23:
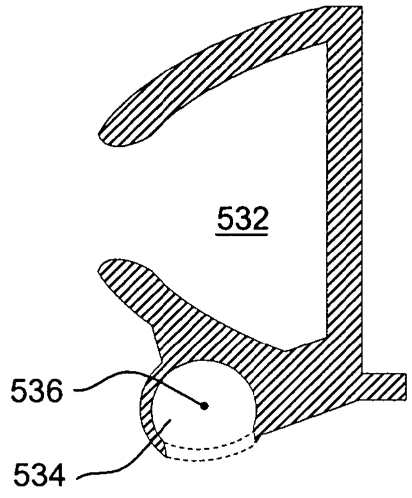
FIG. 23 is a cross-sectional side view of yet another illustrative lighting apparatus that includes a carrier that is adapted to receive a light source.

FIG. 23 is a cross-sectional side view of yet another illustrative lighting apparatus in accordance with the present invention. This illustrative embodiment is similar to the embodiment shown in FIG. 22. However, the bottom support 530 is shaped to provide a larger cavity 532 for receiving a bumper member. Further, the wall thickness of the bottom support 530 is maintained along its length. In the illustrative embodiment, this is accomplished by moving the central axis 536 of the light carrying cavity or recess 534 further down and/or away from the carrier.

Figure 25:
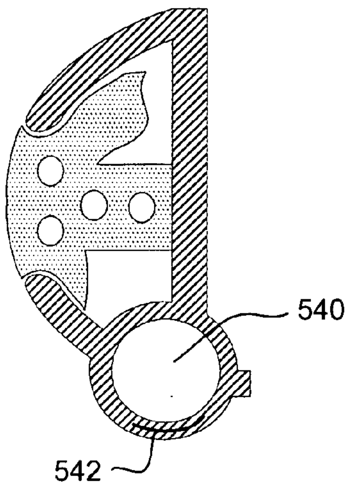
FIG. 25 is a cross-sectional side view of another illustrative lighting apparatus that includes a carrier that is adapted to receive a light source.

FIG. 25 is a cross-sectional side view of another illustrative lighting apparatus in accordance with the present invention. This illustrative embodiment is similar to the embodiment shown in FIG. 21. However, the cavity or recess 540 does not have a receiving slot for receiving the light source 494. Instead, a wall encircles the cavity or recess 540. In one embodiment, a lower portion 542 of the wall encircling the cavity or recess 540 is formed from a transparent or semi-transparent material. The remainder of the wall encircling the cavity or recess 540 may be at least partially reflective, but this is not required.

Figure 26:
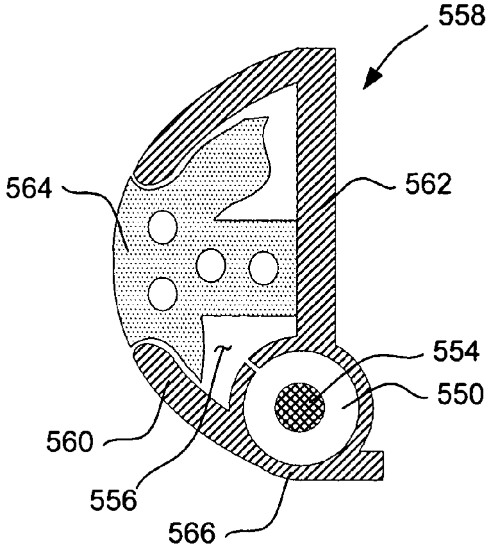
FIG. 26 is a cross-sectional side view of another illustrative lighting apparatus that includes a carrier that is adapted to receive a light source.

FIG. 26 is a cross-sectional side view of another illustrative lighting apparatus in accordance with the present invention. This illustrative embodiment is similar to that shown in FIG. 25. However, the cavity or recess 550 has a receiving slot 552 for receiving a light source 554. The receiving slot 552 is shown opening into the inner cavity 556 of the carrier 558. To install the light source 554 into the cavity or recess 550, the bottom support 560 may be pulled away from the back support 562. Preferably, the bottom support 560 and/or back support 562 temporarily elastically deform to open the receiving slot 552 and receive the light source 554. Once the light source 554 is in the cavity or recess 550, the bottom support 560 may be returned or nearly returned to its original position relative to the back support 562. The bumper member 564 is then installed, also preferably by elastic deformation of the bumper member 564 and/or carrier 558. Like the embodiment shown in FIG. 25, it is contemplated that a lower portion 566 of the wall encircling the cavity or recess 550 may be formed from a transparent or semi-transparent material. The remainder of the wall encircling the cavity or recess 550 may be at least partially reflective, but this is not required.

Figure 27:
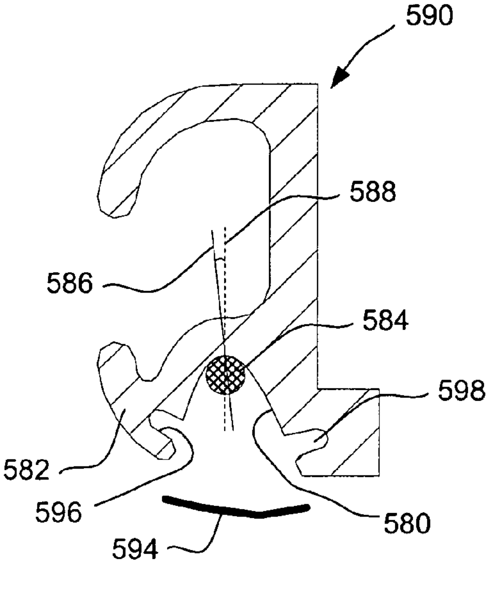
FIG. 27 is a cross-sectional side view of another illustrative lighting apparatus that includes a carrier, wherein the carrier includes a parabolic shaped recess for receiving a light source.

FIG. 27 is a cross-sectional side view of yet another illustrative lighting apparatus in accordance with the present invention. In this illustrative embodiment, a parabolic shaped recess or cavity 580 is formed in the bottom support 582. A parabolic shape may help collect and direct the light emitted by the light source 584 in a particular direction, particular if the walls of the parabolic shaped recess or cavity 580 are at least partially reflective. In some embodiments, the axis 586 of the parabolic shaped recess or cavity 580 may be offset relative to a vertical axis 588 to help direct the light rays toward an object, such as an object that the carrier 590 is mounted.

A lens or cover 594 may be provided to cover the parabolic shaped recess or cavity 580, if desired. In some illustrative embodiments, one or more receiving slots 596 and 598 may be provided for receiving the edges of the lens or cover 594. In other illustrative embodiments, the lens or cover may be co-extruded or otherwise integrally formed or securely attached to the carrier 590.

Figure 28:
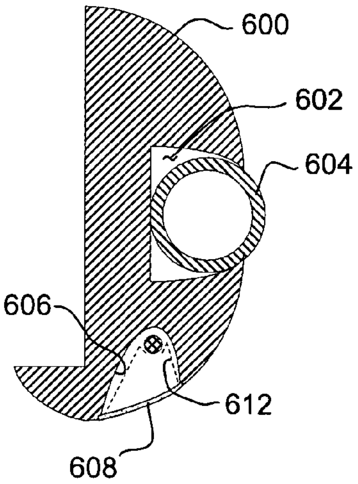
FIG. 28 is a cross-sectional side view of another illustrative lighting apparatus that includes a carrier and a bumper member, wherein the carrier includes a recess for receiving a light source.

FIG. 28 is a cross-sectional side view of another illustrative lighting apparatus in accordance with the present invention. This illustrative embodiment includes a "D" shaped carrier 600 having a bumper receiving slot 602. A bumper member 604 may be provided in the bumper receiving slot 602. The bumper member 604 may be an elongated tube that is sized to fit within the bumper receiving slot 602, as shown. Like the illustrative embodiment of FIG. 27, a parabolic shaped recess or cavity 606 is provided in a bottom portion of the "D" shaped carrier 600. A lens or cover 608 may be provided to cover the parabolic shaped recess or cavity 606, if desired. In the illustrative embodiment, the lens or cover is co-extruded or otherwise integrally formed or securely attached to the "D" shaped carrier 600, but this is not required.

A light source 610 is shown positioned in the parabolic shaped recess or cavity 606. One or more light source support members 612 may be provided to help secure the light source 610 in the parabolic shaped recess or cavity 606. In some embodiments, the one or more light source support members 612 may help secure the light source 610 at or near the focal point of the parabolic shaped recess or cavity 606.

Figure 29:
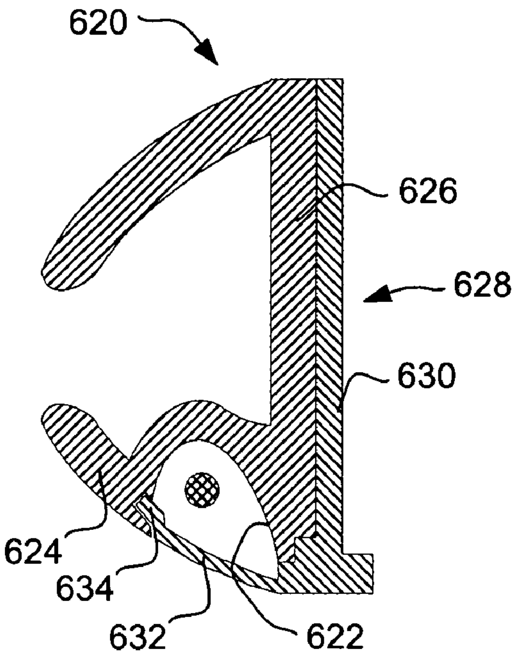
FIG. 29 is a cross-sectional side view of another illustrative lighting apparatus that includes a two piece carrier, wherein the first piece includes a recess for receiving a light source and the second piece provides a cover for the recess.

FIG. 29 is a cross-sectional side view of yet another illustrative lighting apparatus in accordance with the present invention. In this illustrative embodiment, a carrier 620 is provided with a light receiving channel, cavity or recess 622 formed in the bottom support 624. A light source 626 is positioned within the light receiving channel, cavity or recess 622. The illustrative carrier 620 has a back support 626 that is adapted to be adjacent a mounting surface.

A mating member 628 is also provided. The mating member 628 may include a back support 630 and a lens or cover portion 632. The mating member 628 preferably mates with the back support 626 of the carrier 620. The lens or cover portion 632, or a portion thereof, preferably is shaped to cover the light receiving cavity or recess 622 formed in the bottom support 624. A slot may be provided in the bottom support 624 of the carrier 620 to receive a lip 634 of the lens or cover portion 632, if desired.

In one illustrative embodiment, the carrier 620 may be made from a material that is non-transparent and at least partially reflective. The mating member 628 may be made from a material that is at least semi-transparent. Alternatively, only the lens or cover portion 632 of the mating member 628 may be made from a material that is at least semi-transparent. In other embodiments, the carrier 620 may be made from a material that is at least partially transparent, and the mating member may be made from a material that is non-transparent and at least partially reflective. In any case, it is contemplated that the mating member 628 may be made separate from the carrier 620.

Figure 30:
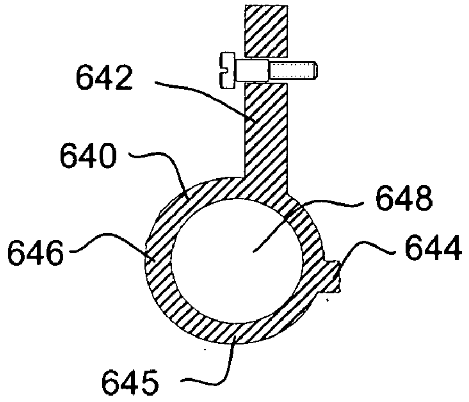
FIG. 30 is a cross-sectional side view of another illustrative lighting apparatus in accordance with the present invention.

FIG. 30 is a cross-sectional side view of another illustrative lighting apparatus in accordance with the present invention. In this illustrative embodiment, no separate bumper member is provided. Instead, an elongated tube 640 is provided with a mounting support 642 extending therefrom. A spacer support 644 may also be provided to help space the tube 640 from the mounting surface. A light source (not shown) can be positioned within the inner lumen 648 of the tube 640, as desired. At least a portion of the tube 640 is preferably at least semi-transparent to allow at least some of the light rays from the light source to exit from the tube 640. In one embodiment, portion 645, portion 646, or both, are at least semi-transparent. In some embodiments, the tube 640 is adapted to prevent light rays from traveling in a first direction away from the tube 640 while allowing light rays to travel in a second different direction away from the tube 640.

Figure 31:
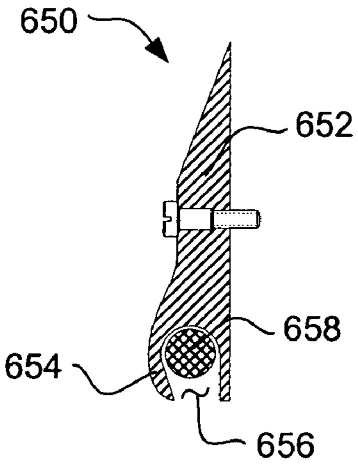
FIG. 31 is a cross-sectional side view of yet another illustrative lighting apparatus in accordance with the present invention.

FIG. 31 is a cross-sectional side view of yet another illustrative lighting apparatus in accordance with the present invention. Like the embodiment shown in FIG. 30, this illustrative embodiment also does not have a separate bumper member. Instead, an elongated member 650 is provided with a mounting region 652 and a light source receiving region 654. The light source receiving region 654 includes a light source receiving cavity or recess 656, which receives a light source 658. The elongated member 650 may be made from a non-transparent or at least semi-transparent material, as desired.

Figure 32:
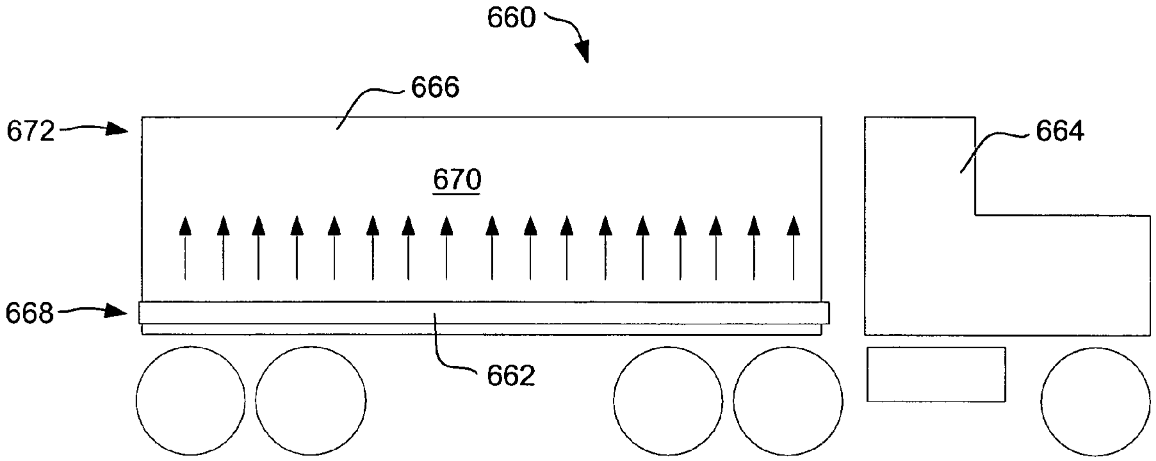
FIG. 32 is a schematic view of a truck with an illustrative lighting apparatus mounted to the side thereof.

As indicated above, it is contemplated that some embodiments of the present invention may be used to illuminate vehicles, such as boats (including barges), cars, trucks, etc., preferably by illuminating one or more side surfaces of the vehicle. The side surfaces of many vehicles provide a relatively large area that, when illuminated, can significantly increase the visibility of the vehicle, especially at night. It is believed that by providing such visibility, vehicle safety can be significantly improved. FIG. 32 is a schematic view of a truck 660 with an illustrative lighting apparatus 662 mounted to the side thereof. The illustrative truck 660 includes a cab 664 and a trailer 666, with an illustrative lighting apparatus 662 mounted along a lower edge 668 of the trailer 666. The illustrative lighting apparatus 662 may be similar to those described herein, and may distribute light in an upward direction to illuminate at least a portion of the side surface 670 of the trailer 666. The lighting apparatus 662 may extend around the perimeter of the trailer 666, if desired.

In some embodiments, the illustrative lighting apparatus 662 may include a bumper, to help provide a level of protection to the lower edge 668 of the trailer 666. Such protection may be desirable when, for example, the truck 660 is maneuvering into a loading dock or the like. While the illustrative lighting apparatus is shown mounted to a truck trailer 666, it may also be mounted to the box of a straight truck, or even to the cab 664, as desired. In addition, it is contemplated that the illustrative lighting apparatus 662 may be mounted to an upper edge 672 of the cab 664 or trailer 666, and/or at an intermediate location, as desired.

Figure 33:
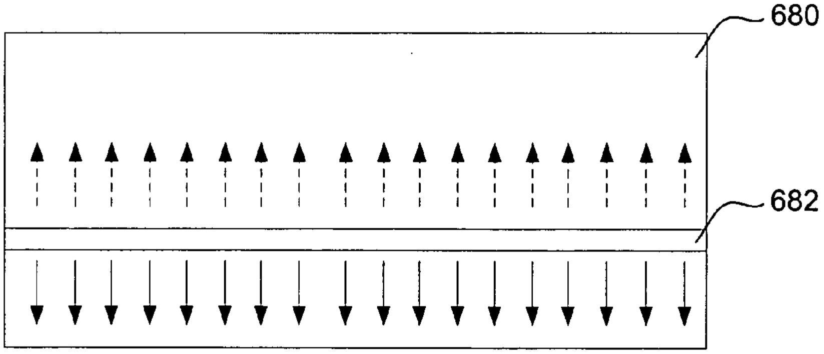
FIG. 33 is a schematic view of an object that has an illustrative lighting apparatus mounted to the side thereof.

FIG. 33 is a schematic view of an object, generally shown at 680, with an illustrative lighting apparatus 682 mounted to the side thereof. The object 680 may by any type of object. For example, the object 680 may include retail and/or store shelving and/or equipment (including grocery store shelving and/or equipment such as refrigerated shelving), bars, desks, counters, walls such as in hallways or rooms, ceilings, railings, steps, and/or any other object or surface, as desired. The illustrative lighting apparatus 682 is shown providing illumination in both an upward and downward direction, although in some embodiments, illumination may be only provided in one direction, including in an outward direction. In some embodiments, the lighting apparatus 682 may include a bumper, such as described above. When so provided, the lighting apparatus 682 may help provide a level of protection to the object 680.

Figure 34:
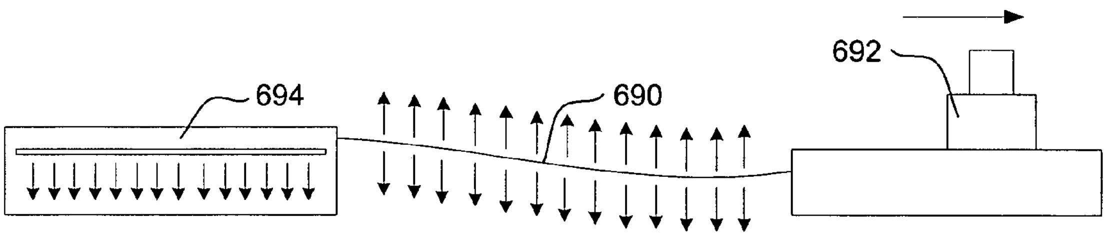
FIG. 34 is a schematic view of a tow line that includes an illustrative lighting apparatus in accordance with the present invention.

FIG. 34 is a schematic view of a tow line 690 that includes an illustrative lighting apparatus in accordance with the present invention. A tug or other boat 692 is shown pulling one or more barges 694 via tow line 690. It is contemplated that the tug boat 692, tow line 690 and/or one or more barges 694 may be illuminated using a lighting apparatus in accordance with the present invention. The tow line 690 may be illuminated by securing one or more light sources to the tow line 690. For example, an electro-luminescent wire or Linear Emitting Fiber may be secured along the length of the tow line. Other types of light sources may also be used. This may allow other boaters to more easily see the tug boat 692, the tow line 690 and/or the barges 694 at night.

It is also contemplated that one or more light sources may be provided on parked barges 694 to illuminate one or more sides surfaces of the barges 694. The one or more light sources may be incorporated into a lighting apparatus, as described herein. Barges are often fairly dark in color, and can be difficult to see at night. By illuminating one or more side surfaces of the barges 694, boaters may more easily see the parked barges at night.

Figure 35:
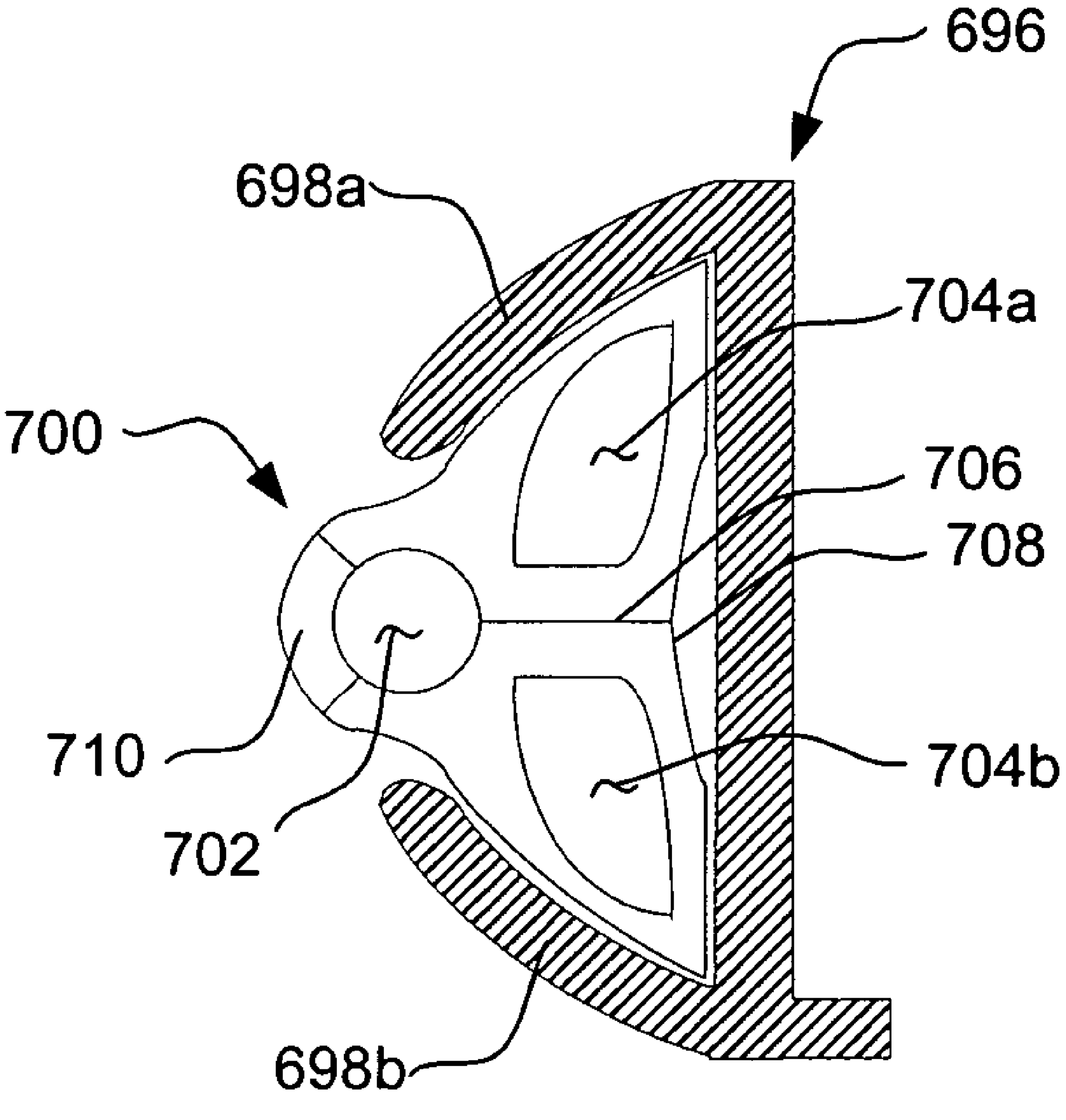
FIG. 35 is a cross-sectional side view of another illustrative lighting apparatus in accordance with the present invention.

FIG. 35 is a cross-sectional side view of another illustrative lighting apparatus in accordance with the present invention. In this illustrative embodiment, an elongated carrier 696 is provided. Like some of the embodiments above, the elongated carrier 696 includes two legs 698*a* and 698*b* that form a slot or opening for receiving an elongated bumper member or insert 700. In some embodiments, the elongated carrier 696 and/or the elongated bumper member 700 must be elastically deformed (e.g. bent or otherwise deformed) for the elongated bumper member 700 to slip into the slot. To help aid the insertion of the elongated bumper member 700 into the slot of the elongated carrier 696, the elongated bumper member 700 may include one or more relief lumens 704*a* and 704*b*, if desired.

The elongated bumper member 700 may include a cavity 702. The illustrative cavity 702 is adapted to receive an elongated light source (not shown), such as an electro-luminescent wire, a linear emitting fiber, or any other suitable elongated light source. The elongated bumper member 700, or a portion thereof, may be formed from a transparent or semi-transparent material. The transparent or semi-transparent material preferably defines at least part of the cavity 702, and extends to an outer surface of the elongated bumper member 700. In the embodiment shown, portion 710 may be formed from a transparent or semi-transparent material. When so provided, the light from the elongated light source may pass through the transparent or semi-transparent portion of the elongated bumper member 700 and away from the lighting apparatus.

To help aid with the insertion of the elongated light source into the cavity 702, a slit 706 may be provided. The slit may extend from the cavity 702 to an outer surface 708 of the elongated bumper member 700. In the embodiment shown, the slit extends from the cavity 702 to the outer surface 708 adjacent the back of the carrier 698, but this is not required.

Figure 36A:
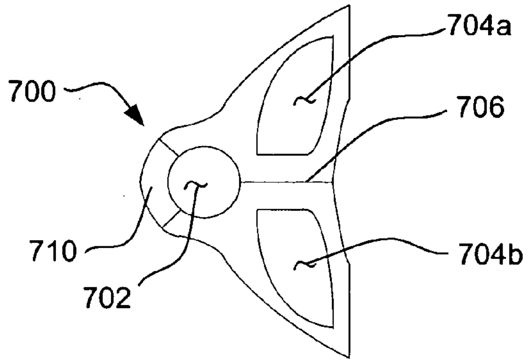
FIG. 36A is a cross-sectional side view of the elongated bumper member (or insert) 700 of FIG. 35, with the slit 706 in the closed position.

FIG. 36A is a cross-sectional side view of the elongated bumper member (or insert) 700 of FIG. 35, with the slit 706 in the closed position. In one embodiment, the slot of the elongated carrier 698 as well as the shape and size of the elongated bumper member 700 are adapted so that when the elongated bumper member 700 is inserted into the slot of the elongated carrier 698, the elongated carrier 698 provides a closing force to keep the slit 706 in, or nearly in, the closed position.

Figure 36B:
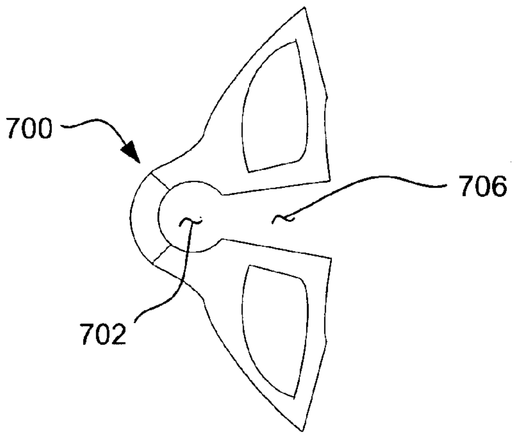
FIG. 36B is a cross-sectional side view of the elongated bumper member (or insert) of FIG. 35, with the slit in an open position.

FIG. 36B is a cross-sectional side view of the elongated bumper member (or insert) of FIG. 35, with the slit in an open position. In the illustrative embodiment, the elongated bumper member 700 is normally in the closed position, as shown in FIG. 36A. To place the elongated bumper member 700 in the open position, the elongated bumper member 700 is at least partially elastically deformed (e.g. bent or otherwise deformed) by applying an outward force. Alternatively, the elongated bumper member 700 may normally be in the open position, as shown in FIG. 36B. To place the elongated bumper member 700 in the closed position, the elongated bumper member 700 is at least partially elastically deformed (e.g. bent or otherwise deformed) by applying an inward force. In either case, the elongated bumper member 700 may more easily receive an elongated light source (not shown) through the slit 706 when in the open position.

Figure 36C:
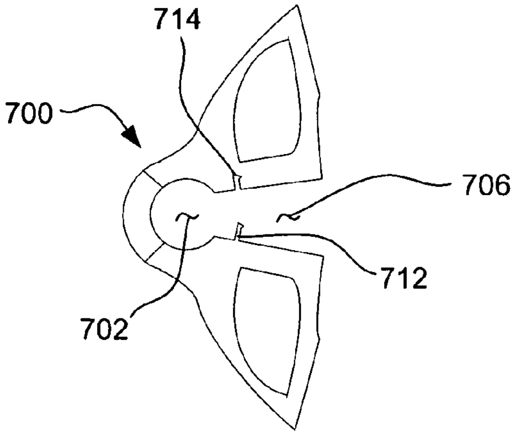
FIG. 36C is a cross-sectional side view of the insert of FIG. 35, with the slit in an open position and with a slit latching mechanism.

FIG. 36C is a cross-sectional side view of the insert of FIG. 35, with the slit in an open position and with a slit latching mechanism. In the illustrative embodiment, the slit latching mechanism includes a leg with a tooth 712, along with a matching receiving opening 714. As the elongated bumper member 700 is moved into the closed position, the leg 712 slides into the matching receiving opening 714, and the tooth 712 snaps into a corresponding opening in the receiving opening. The latching mechanism may help the elongated bumper member 700 remain in the closed position.

Figure 37:
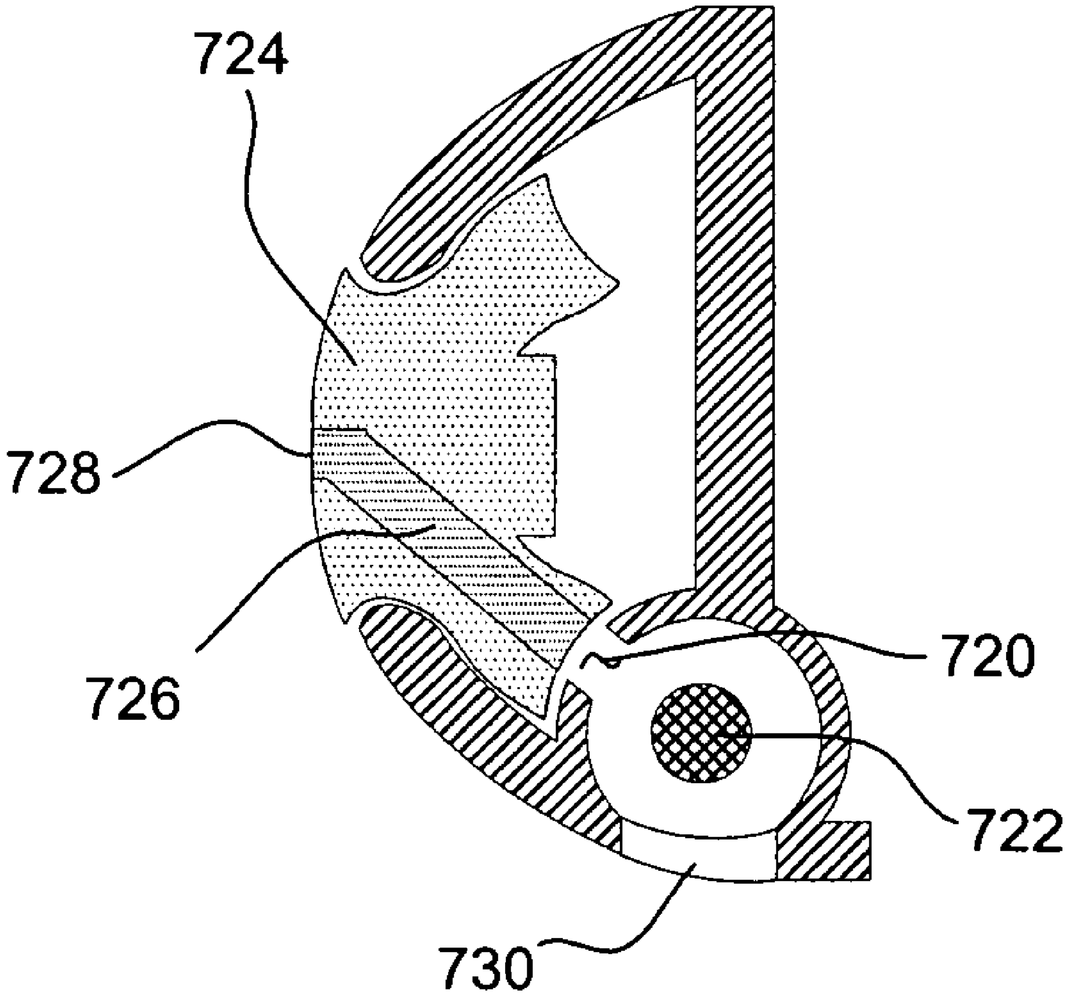
FIG. 37 is a cross-sectional side view of another illustrative lighting apparatus in accordance with the present invention.

FIG. 37 is a cross-sectional side view of another illustrative lighting apparatus in accordance with the present invention. This illustrative embodiment is similar to that shown in FIG. 26. However, the receiving slot 720 for receiving the light source 722 may be wider, and may be used to direct light from the light source 722 to the elongated bumper member 724. The elongated bumper member 724 may then include a transparent or semi-transparent portion 726 that directs the light received through the receiving slot 720 to an outer surface 728 of the elongated bumper member 724. In some embodiments, the entire elongated bumper member 724 may be made from a transparent or semi-transparent material. In other embodiments, only a portion of the elongated bumper member 724 is transparent or semi-transparent portion, as shown. In either case, the embodiment shown in FIG. 37 may allow light from the light source 722 to be directed to multiple locations, such as down through a transparent or semi-transparent window 730 as well as to the outer surface 728 of the elongated bumper member 724.

Figure 38:
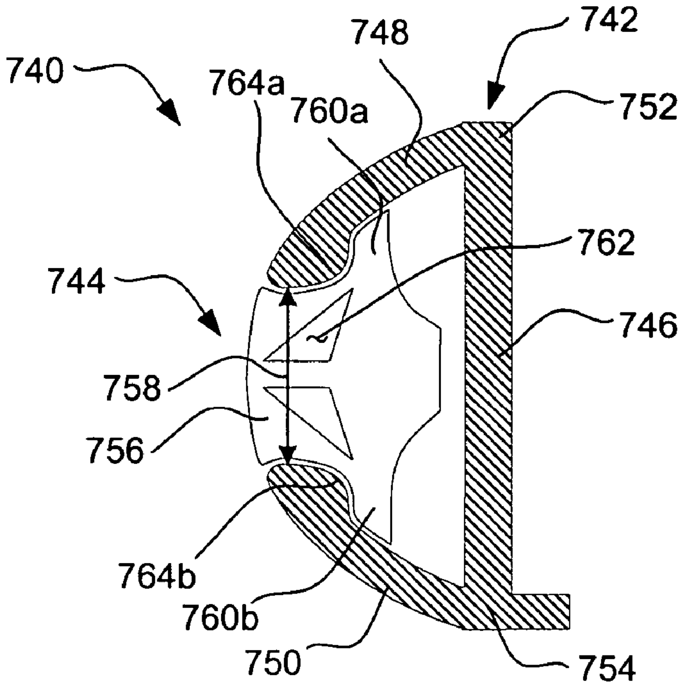
FIG. 38 is a cross-sectional side view of an illustrative rub-rail with nubs in accordance with the present invention.

FIG. 38 is a cross-sectional side view of an illustrative rub-rail with nubs in accordance with the present invention. The illustrative rub-rail is generally shown at 740, and includes a carrier 742 and an elongated bumper member 744. The carrier 740 includes a back support 746, a top support leg 748 and a bottom support leg 750. The top support leg 748 and bottom support leg 750 are shown extending from the top 752 and bottom 754 ends, respectively, of the back support 746 in a leftward direction. The top support leg 748 and bottom support leg 750 terminate to define a gap or slot 758 therebetween.

The bumper member 744 is shown positioned in the gap or slot 758. The bumper member 744 preferably has an outer portion 756 that is sized to fit into the slot 758, and one or more inner facing legs 760*a* and 760*b* that extend into the cavity formed by the top support leg 748 and bottom support leg 750 of the carrier 742. The one or more legs 760*a* and 760*b* preferably have a dimension that exceeds the lateral dimension of the slot 758, which helps secure the bumper member 744 to the carrier 742. In some embodiments, the bumper member 744 and/or carrier 742 are at least somewhat elastically deformable, so that the bumper member 744 and/or the elongated carrier 742 can or must be elastically deformed (e.g. bent or otherwise deformed) to allow the one or more legs 760*a* and 760*b* of the bumper member 744 to slip through the slot 758. The bumper member 744 may also have one or more relief holes or lumens, such as relieve hole or lumen 762. Such relief holes or lumens may decrease the rigidness of the bumper member 744, as desired.

One or both of the top support leg 748 and bottom support leg 750 of the carrier 742 may have a nub, such as nub 764*a* and/or 764*b*. These nubs preferably extend inward into the cavity formed by the carrier 742. For example, nub 764*a* of the top support leg 748 is shown extending down into the cavity of the carrier 742 toward the bottom support leg 750. Likewise, nub 764*b* of the bottom support leg 750 is shown extending up into the cavity of the carrier 742 toward the top support leg 748.

In the illustrative embodiment, the top support leg 748 has an increased thickness at nub 764*a*, and the bottom support leg 750 has an increased thickness at nub 764*b*. In other embodiments, however, the thickness may remain relatively constant along the length of the top and/or bottom support legs, with both the inner surface and outer surface of the support legs extending inwardly to form the corresponding nub. Although the nubs 764*a* and 764*b* are shown near the distal end of the corresponding support leg away from the back member 746, it is contemplated that the nubs may be placed anywhere along the top and/or bottom support legs 748 and 750, and/or along the back member 746 as desired. In addition, multiple nubs may be placed along one or more of the top support leg, bottom support leg and/or back support 746, as desired. The elongated bumper member 744 preferably is shaped to accept the one or more nubs provided on the top support leg, bottom support leg and/or back support, as shown.

Figure 39:
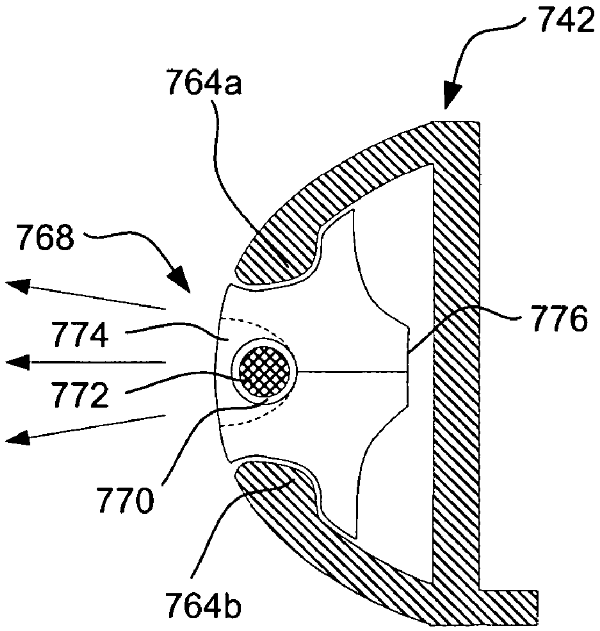
FIG. 39 is a cross-sectional side view of an illustrative lighting apparatus with nubs in accordance the present invention.

FIG. 39 is a cross-sectional side view of an illustrative lighting apparatus with nubs in accordance the present invention. This embodiment is similar to that shown in FIG. 38, but the elongated bumper member 768 includes a cavity 770 for receiving a light source 772, as shown. The elongated bumper member 768 is shaped to accept the nubs 764*a* and 764*b* provided on the top support leg 748 and bottom support leg 750, respectively. That is, the elongated support member 768 includes an outer surface that is shaped to correspond to the inner surface of the carrier 742, including nubs 764*a* and 764*b*. As indicated above, nubs 764*a* and 764*b* do not need to be positioned at or near the distal end of the top support leg 748 and/or bottom support leg 750, but rather may be positioned anywhere along the top support leg 748, bottom support leg 750 and/or back support 746, depending on the application.

In the illustrative embodiment, the elongated support member 768 may be made from a transparent or semitransparent material, or alternatively only a portion 774 (indicated by a dashed line) of the elongated support member 768 may be made from a transparent or semitransparent material, with the remainder made from a substantially non-transparent material. In addition, the illustrative elongated support member 768 includes a slit that extends from the cavity 770 to the back outer surface 776 of the elongated support member 768 to aid in the insertion of the elongated light source 772 into the cavity 770.

Figure 40:
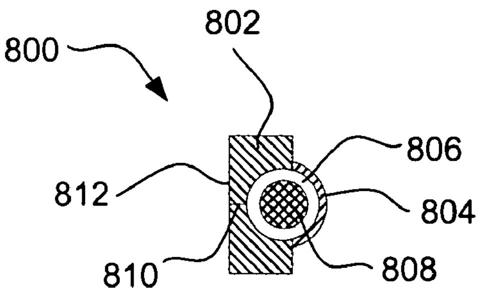
FIG. 40 is a cross-sectional side view of an illustrative lighting apparatus for receiving an elongated light source.

FIG. 40 is a cross-sectional side view of an illustrative lighting apparatus for receiving an elongated light source. The illustrative lighting apparatus is shown generally at 800, and includes a body 802. The body 802 includes a cover portion 804, which together form a cavity 806 for receiving an elongated light source 808. The body 802 may be transparent or semi-transparent, or substantially non-transparent, depending on the application. In one illustrative embodiment, the cover 804 is transparent or semi-transparent, and the remainder of the body 802 is substantially non-transparent. The cover 804 may be shaped to form a lens, but this is not required. In another illustrative embodiment, the cover 804 is substantially non-transparent and the remainder of the body 802 is transparent or semi-transparent.

It is contemplated that the cover 804 may be formed integrally with the remainder of the body 802 (such as by, for example, extrusion, co-extrusion, molding, or any other suitable method). Alternatively, the cover 804 may be formed separately from the remainder of the body 802. When formed separately from the remainder of the body 802, the cover 804 may be later secured to the remainder of the body 802 by, for example, a snapping mechanism, an adhesive, screws, or any other suitable securing method. In some embodiments, the cover 804 is secured to the remainder of the body 802 after the elongated light source is inserted into the cavity 806.

In some embodiments, the body 802 may include a slit 810 that extends from the cavity 806 to an outer surface of the body 802, such as outer surface 812. The slit 810 may be moved to an open position, by for example applying an external outward force, which may help aid in the insertion of the elongated light source 808 into the cavity 806 through the slit 810. Like other embodiments, it is contemplated that the illustrative lighting apparatus 800 may be mounted to, for example, any object including a boat, retail and/or store shelving and/or equipment (including grocery store shelving and/or equipment such as refrigerated shelving), bars, desks, counters, walls such as in hallways or rooms, ceilings, railings, steps, and/or any other object or surface, as desired. The body 802 may help provide a level of protection to the object and/or a level of protection to the elongated light source.

Figure 41:
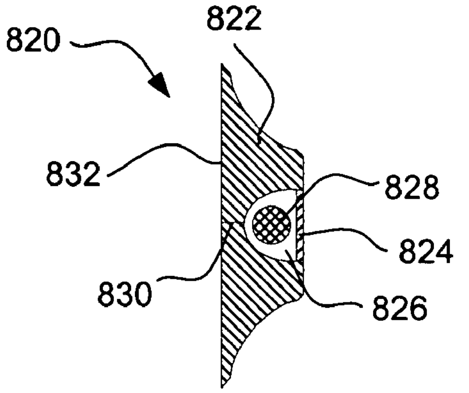
FIG. 41 is a cross-sectional side view of another illustrative lighting apparatus for receiving an elongated light source.

FIG. 41 is a cross-sectional side view of another illustrative lighting apparatus for receiving an elongated light source. The illustrative lighting apparatus is shown generally at 820, and includes a body 822. The body 820 includes a cover portion 824, which together form a cavity 826 for receiving an elongated light source 828. In the illustrative embodiment, the cavity 826 is parabolic in shape, which in some embodiments, may help focus (by reflection) the light provided by the elongated light source 828 toward the cover portion 824. The body 822 may be transparent or semi-transparent, or substantially non-transparent, depending on the application. In one illustrative embodiment, the cover 824 is transparent or semi-transparent, and the remainder of the body 822 is substantially non-transparent. The cover 824 may be flat or shaped to form a lens, as desired. In another illustrative embodiment, the cover 824 is substantially non-transparent and the remainder of the body 822 is transparent or semi-transparent.

It is contemplated that the cover 824 may be formed integrally with the remainder of the body 822 (such as by, for example, extrusion, co-extrusion, molding, or any other suitable method). Alternatively, the cover 824 may be formed separately from the remainder of the body 822. When formed separately from the remainder of the body 822, the cover 824 may be later secured to the remainder of the body 822 by, for example, a snapping mechanism, an adhesive, screws, or any other suitable securing method. In some embodiments, the cover 824 is secured to the remainder of the body 822 after the elongated light source is inserted into the cavity 826.

In some embodiments, the body 822 may include a slit 830 that extends from the cavity 826 to an outer surface of the body 822, such as outer surface 832. The slit 830 may be moved to an open position, by for example applying an external outward force, which may help aid in the insertion of the elongated light source 828 into the cavity 826 through the slit 830. It is contemplated that the illustrative lighting apparatus 820 may be mounted to, for example, any object including boats, retail and/or store shelving and/or equipment (including grocery store shelving and/or equipment such as refrigerated shelving), bars, desks, counters, walls such as in hallways or rooms, ceilings, railings, steps, and/or any other object or surface, as desired. The body 822 may help provide a level of protection to the object and/or a level of protection to the elongated light source.

Figure 42:
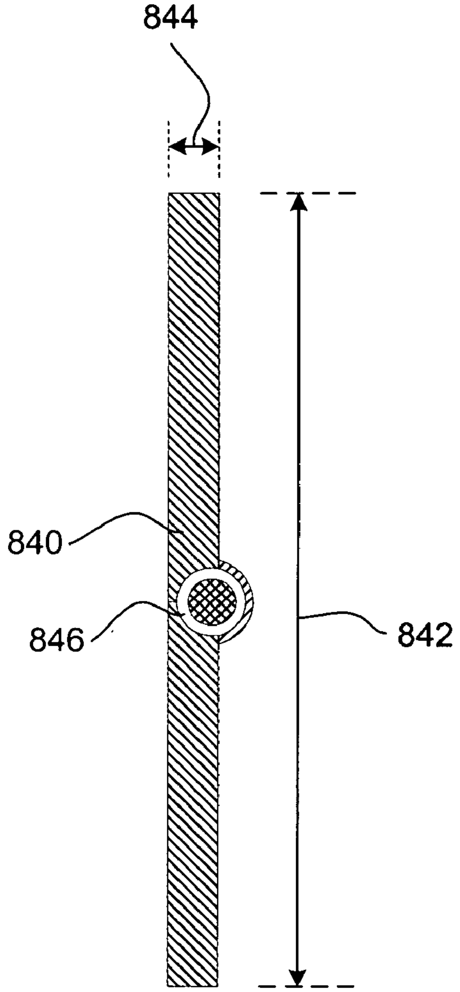
FIG. 42 is a cross-sectional side view of yet another illustrative lighting apparatus for receiving an elongated light source.

FIG. 42 is a cross-sectional side view of yet another illustrative lighting apparatus for receiving an elongated light source. This illustrative embodiment is similar to the embodiment shown in FIG. 41, but the body 840 has a height 842 that is substantially greater than the thickness 844. In addition, the body 840 extends a substantial distance beyond the cavity 846. In one example, the cavity may have a diameter on the order of 0.050 inches, and the height 842 of the body 840 may be on the order of 0.25 to 24 inches or more. In some embodiments, this may provide a relatively large protection area (represented by the height 842 of the body 840) to an object.

Figure 43:
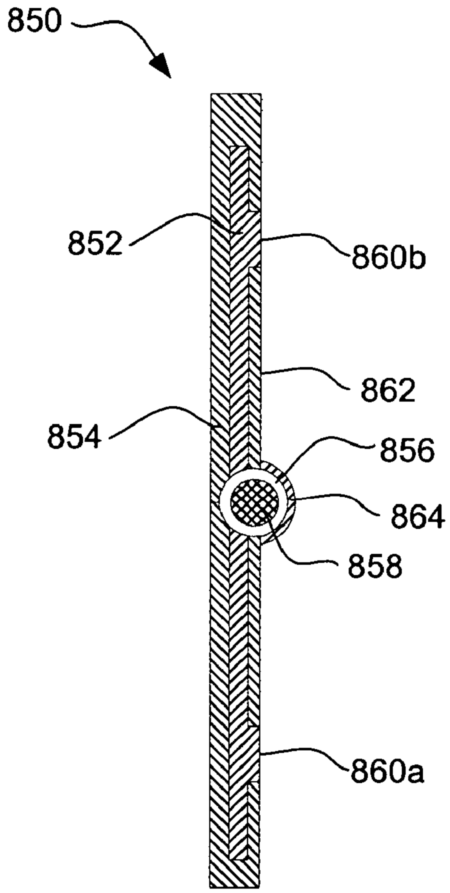
FIG. 43 is a cross-sectional side view of another illustrative lighting apparatus for receiving an elongated light source.

FIG. 43 is a cross-sectional side view of another illustrative lighting apparatus for receiving an elongated light source. This illustrative embodiment is similar to the embodiment of FIG. 42. However, the body 850 includes both a first material 852 that is at least semi-transparent and a second material 854 that is substantially non-transparent. The at least semi-transparent material 852 is shown extending from the cavity 856 that houses the elongated light source 858 to one or more outer surfaces 860*a* and 860*b* of the body 850. The at least semi-transparent material 852 thus at least partially defines the cavity 856 and accepts light therefrom. The light is then delivered down the at least semi-transparent material 852 to the illuminate the one or more outer surfaces 860*a* and 860*b*. In the illustrative embodiment, the outer surface 862 between the one or more outer surfaces 860*a* and 860*b* is substantially non-transparent, with the possible exception of cover portion 864, but this is not required.

It is contemplated that the one or more outer surfaces 860*a* and 860*b* may be flat or may be shaped to form a lens, depending on the application. In addition, it is contemplated that the at least semi-transparent material 852 may have a higher index of refraction than the substantially non-transparent material 854, but this is not required. This may promote greater total internal reflection of the light as it travels down the at least semi-transparent material 852, much like an optical fiber.

In one illustrative embodiment, the at least semi-transparent material 852 may be integrally formed with the substantially non-transparent material 854. For example, the at least semi-transparent material 852 may be co-extruded with the substantially non-transparent material 854. Alternatively, the at least semi-transparent material 852 may be separately formed from the substantially non-transparent material 854, and subsequently mechanically secured together, as desired.

Figure 44:
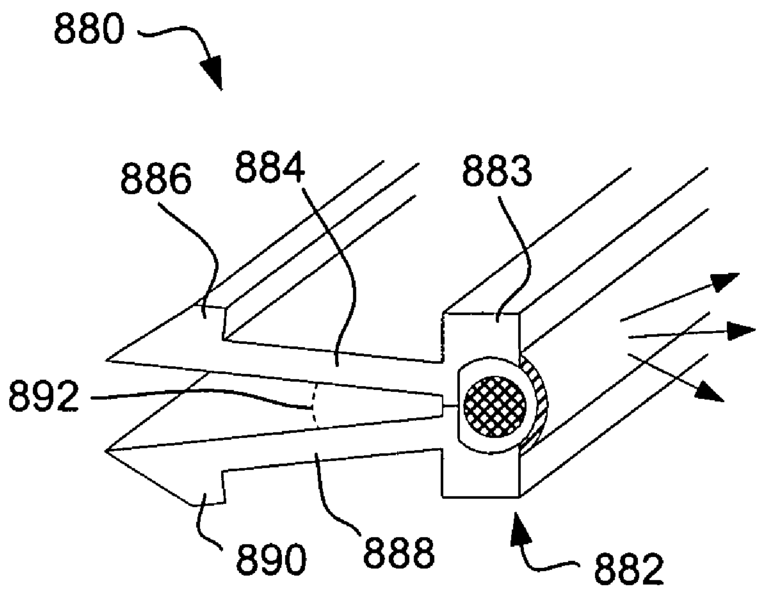
FIG. 44 is a cross-sectional side view of an illustrative lighting apparatus with one or more legs for securing the lighting apparatus to a substrate.

FIG. 44 is a cross-sectional side view of an illustrative lighting apparatus with one or more legs for securing the lighting apparatus to a substrate. The illustrative lighting apparatus is generally shown at 880 and includes a body 882. The body 882 includes a main body portion 883, a first leg 884 with a first tooth 886, and a second leg 888 with a second tooth 890. In this illustrative embodiment, the first leg 884 and second leg 888 extend continuously along the length of the main body portion 883. The first leg 884 and the second leg 888 are shown extending away from the main body portion 883 at an angle 892 that is greater than zero. However, in some embodiments, the angle 892 may be zero or even negative, depending on the application. The main body portion 883 is similar that shown in FIG. 40.

Figure 45:
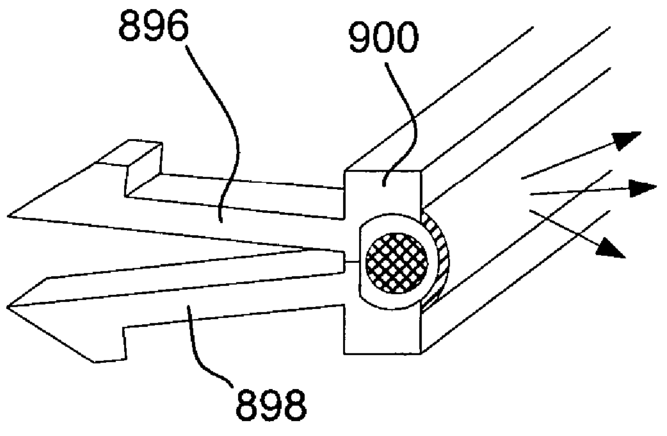
FIG. 45 is a cross-sectional side view of another illustrative lighting apparatus with one or more legs for securing the lighting apparatus to a substrate.

FIG. 45 is a cross-sectional side view of another illustrative lighting apparatus with one or more legs for securing the lighting apparatus to a substrate. This illustrative embodiment is similar to the embodiment shown in FIG. 44, except the first leg 896 and the second leg 898 do not extend continuously along the length of the main body portion 900. Rather, and in one embodiment, one or more first and second leg pairs 896, 898 are provided periodically along the length of the main body portion. Only one first and second leg pair is shown.

Figure 46:
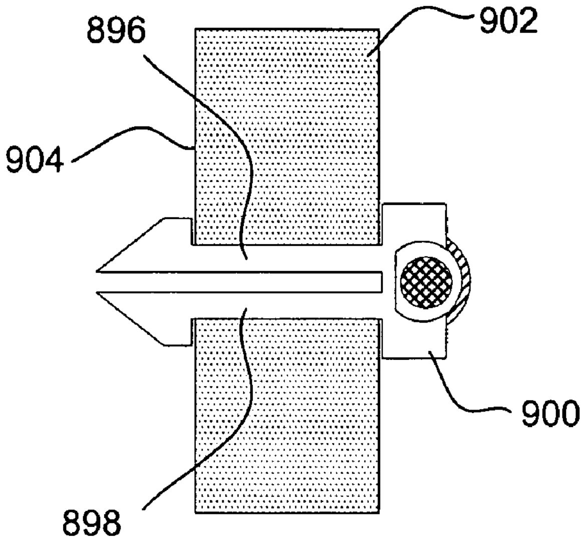
FIG. 46 is a cross-sectional side view of the illustrative lighting apparatus of FIG. 45 with the one or more legs inserted through a substrate.

FIG. 46 is a cross-sectional side view of the illustrative lighting apparatus of FIG. 45 with the first leg 896 and the second leg 898 inserted through a substrate 902. As the first leg 896 and the second leg 898 are pushed through a hole in the substrate 902, the first leg 896 and the second leg 898 are forced closer together, which may temporarily elastically deforming the first leg 896 and the second leg 898. Once the teeth reach the backside 904 of the substrate 902, the first leg 896 and the second leg 898 separate and the teeth engage the backside 904 of the substrate 902 as shown. This may help secure the illustrative lighting apparatus to the substrate 902. The substrate may be any type of substrate including, for example, wall board, plywood, cement, fiberglass, metal, or any other type of substrate, as desired.

Figure 47:
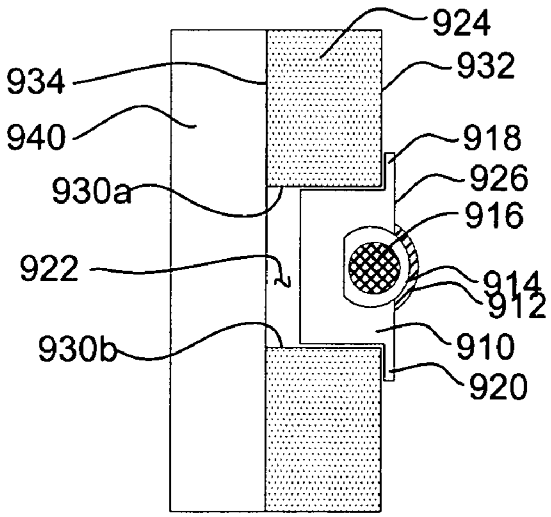
FIG. 47 is a cross-sectional side view of yet another illustrative lighting apparatus attached to a substrate.

FIG. 47 is a cross-sectional side view of yet another illustrative lighting apparatus attached to a substrate. The illustrative lighting apparatus is shown generally at 908, and includes an elongated body 910. The elongated body 910 includes a cover portion 912, which together form an elongated cavity 914 for receiving an elongated light source 916. The elongated body 910 may be transparent or semi-transparent, or substantially non-transparent, depending on the application. In one illustrative embodiment, the cover 912 is transparent or semi-transparent, and the remainder of the body 910 is substantially non-transparent. The cover 912 may be shaped to form a lens, but this is not required. In another illustrative embodiment, the cover 912 is substantially non-transparent and the remainder of the body 910 is transparent or semi-transparent.

The elongated body 910 shown in FIG. 47 includes an upper extending leg 918 that extends upward from the remainder of the body 910, and a lower extending leg 920 that extends downward from the remainder of the body 910. The upper extending leg 918 and lower extending leg 920 may be relatively thin, and may extend outward from the remainder of the body 910 along a plane formed by the front face 926 of the remainder of the body 910, but this is not required.

In one embodiment, the main body 910 is inserted into an appropriately sized recess or hole 922 in a substrate 924. The upper extending leg 918 and lower extending leg 920 preferably extend out past the upper and lower edges 930*a* and 930*b* of the elongated recess or hole 922, and engage the front face 932 of the substrate 924 as shown. In some embodiments, the upper extending leg 918 and lower extending leg 920 are secured to the substrate by, for example, an adhesive, screws, or any other suitable securing method, as desired.

In some embodiments, the body does not extend to the backside 934 of the substrate 924. When so provided, the illustrative lighting apparatus may not disturb objects behind the substrate, such as studs 940 or any other members or objects behind the substrate 924. In other embodiments, the body 910 may extend to or beyond the backside 934 of the substrate 924, as desired.

Figure 48:
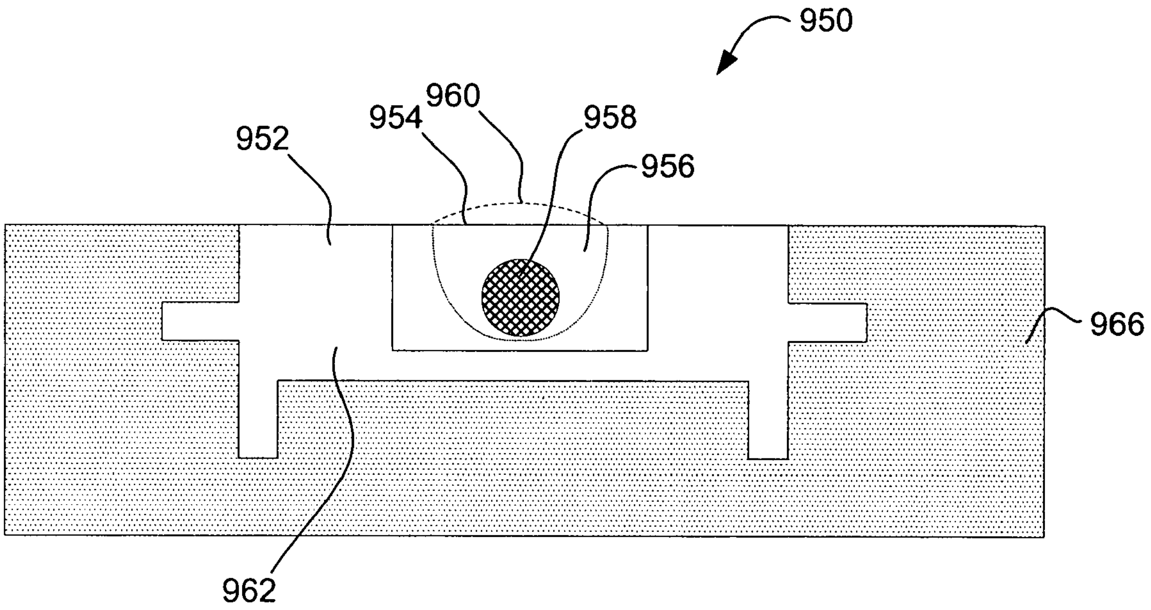
FIG. 48 is a cross-sectional side view of an illustrative lighting apparatus for securing an elongated light source to a substrate.

FIG. 48 is a cross-sectional side view of an illustrative lighting apparatus for securing an elongated light source to a substrate. This embodiment may be particularly suitable for securing an elongated light source to a substrate that can be initially provided in a liquid or semi-liquid state, and then cured or hardened to a more solid state. The illustrative lighting apparatus is shown generally at 950, and includes an elongated member or body 952. The elongated member 952 includes a cover 954, which together form a cavity 956 for receiving an elongated light source 958.

The elongated member or body 952 may be transparent or semi-transparent, or substantially non-transparent, depending on the application. In one illustrative embodiment, the cover 954 is transparent or semi-transparent, and the remainder of the elongated member or body 952 is substantially non-transparent. The cover 954 may be flat, or shaped to form a lens such as a convex lens shown by dotted line 960. In another illustrative embodiment, the cover 954 is substantially non-transparent and the remainder of the elongated member or body 952 is transparent or semi-transparent.

It is contemplated that the cover 954 may be formed integrally with the remainder of the elongated member or body 952 (such as by, for example, extrusion, co-extrusion, molding, or any other suitable method). Alternatively, the cover 954 may be formed separately from the remainder of the elongated member or body 952. When formed separately from the remainder of the elongated member or body 952, the cover 954 may be later secured to the remainder of the elongated member or body 952 by, for example, a snapping mechanism, an adhesive, screws, or any other suitable securing method. In some embodiments, the cover 954 is secured to the remainder of the elongated member or body 952 after the elongated light source 958 is inserted into the cavity 956. In the illustrative embodiment, the cavity 956 is parabolic in shape to help direct (by reflection) the light produced by the elongated light source 958 toward the cover 954, but this is not required.

In some embodiments, the elongated member or body 952 may include a removable portion 962, which may include the cavity 956, the elongated light source 958 and the cover 954. The removable portion 962 may then be selectively removed from the remainder of the elongated member or body 952, as desired. This may be particularly useful when the remainder of the elongated member or body 952 is permanently secured to a substrate, as further described below.

The elongated member or body 952 may have one or more legs, such as legs 964*a*, 964*b*, 964*c* and 964*d*, which extend away from the remainder of the elongated member or body 952. In the embodiment shown, legs 964*a*, 964*b*, 964*c* and 964*d* may help secure the elongated member or body 952 to the substrate 966.

As noted above, this illustrative embodiment may be particularly suitable for securing an elongated light source to a substrate 966, and in particular, a substrate 966 that can initially be provided in a liquid or semi-liquid state, and then cured or hardened to a more solid state. For example, the substrate 966 may be poured in a liquid or semi-liquid state, and then the elongated member or body 952 may be inserted into the substrate 966 as shown. The liquid or semi-liquid substrate may flow around the legs 964*a*, 964*b*, 964*c* and 964*d* of the elongated member or body 952. When the substrate is cured or hardened to a more solid state, the elongated member or body 952 becomes secured to the substrate 966, and in some cases, permanently secured to the substrate 966.

In some embodiments, the substrate 966 may be, for example, concrete, asphalt, plastic, fiberglass, foam, or any other material that can be initially provided in a liquid or semi-liquid state, and then cured or hardened to a more solid state. The substrate may be part of, for example, a roadway, an airport runway, a wall, a floor, a stair, a ceiling, a running track, a boat, a car, a truck, a retaining wall, a swimming pool, a guard rail, or any other suitable surface or object, as desired.

In some embodiments, the elongated member or body 952 may be formed from a relatively rigid material, such as Vinyl, PVC, rubber, plastic, aluminum, or any other suitable material. When so provided, the removable portion 962 may be formed from the same or a different material than the elongated member or body 952.

For some applications, the elongated member or body 952 may be formed from a relatively flexible or elastic material. This may be useful when, for example, there is a difference in the coefficient of thermal expansion between the substrate 966 and the elongated member or body 952. Again, the removable portion 962 may be formed from the same or a different material such as a more rigid material, depending on the application.

Figure 49:
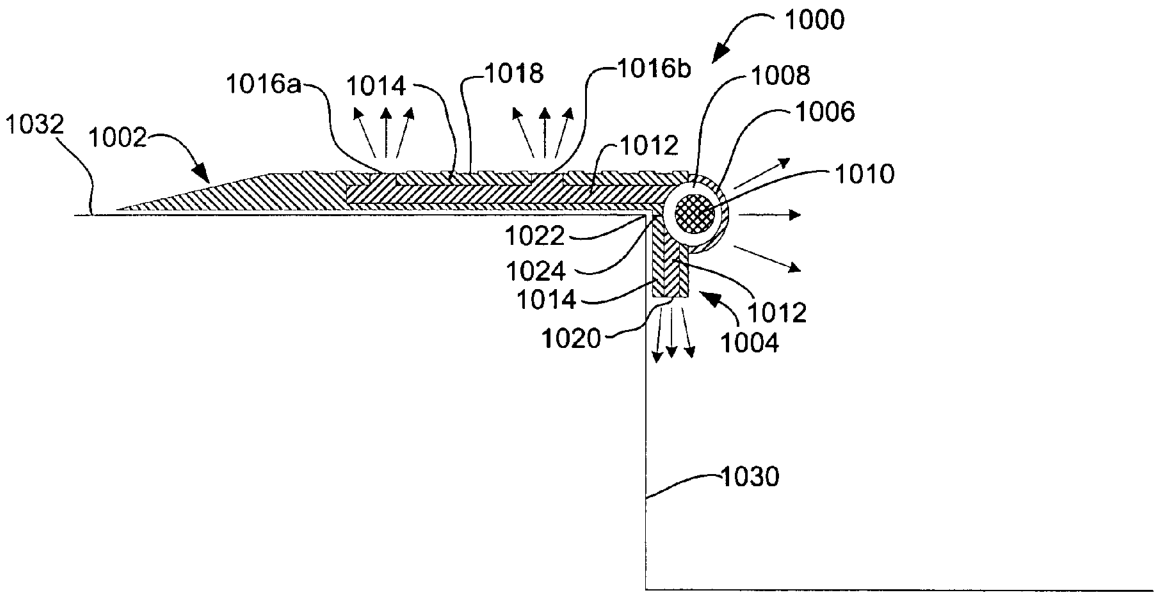
FIG. 49 is a cross-sectional side view of an illustrative lighting apparatus for use with a stair or other ledge.

FIG. 49 is a cross-sectional side view of an illustrative lighting apparatus for use with a stair or other ledge. The illustrative lighting apparatus is generally shown at 1000, and includes an elongated member or body that has a horizontally extending portion 1002 and a vertically extending portion 1004. In some embodiments, either the horizontally extending portion 1002 or the vertically extending portion 1004 may be omitted. The illustrative elongated member includes a cover portion 1006, which together form a cavity 1008 for receiving an elongated light source 1010.

In the illustrative embodiment, the horizontally extending portion 1002 of the elongated member includes both a first material 1012 that is at least semi-transparent and a second material 1014 that is substantially non-transparent. The at least semi-transparent material 1012 is shown extending from the cavity 1008 that houses the elongated light source 1010 horizontally to one or more outer surfaces 1016*a* and 1016*b* of the body. The at least semi-transparent material 1012 thus at least partially defines the cavity 1008 and accepts light therefrom. The light is delivered down the at least semi-transparent material 1012 to the illuminate the one or more outer surfaces 1016*a* and 1016*b*. In the illustrative embodiment, the outer surface 1018 between the one or more outer surfaces 1016*a* and 1016*b* is substantially non-transparent, but this is not required. It is contemplated that the one or more outer surfaces 1016*a* and 1016*b* may be flat or shaped to form a lens, depending on the application.

In addition, it is contemplated that the at least semi-transparent material 1012 may have a higher index of refraction than the substantially non-transparent material 1014 to promote greater total internal reflection of the light as it travels down the at least semi-transparent material 1012, much like an optical fiber.

The vertically extending portion 1004 of the elongated member may also include both a first material 1012 that is at least semi-transparent and a second material 1014 that is substantially non-transparent. The at least semi-transparent material 1012 is shown extending from the cavity 1008 that houses the elongated light source 1010 vertically down to an outer surface 1020 of the body. The at least semi-transparent material 1012 thus receives light from the cavity 1008, and delivers at least some of the light down to the outer surface 1020.

In some embodiments, the elongated member may include a slit 1024 that extends from the cavity 1008 to an outer surface of the body. The slit 1024 may be moved to an open position, by for example applying an external outward force, which may help aid in the insertion of the elongated light source 1010 into the cavity 1008 through the slit 1024.

In one illustrative embodiment, the at least semi-transparent material 1012 may be integrally formed with the substantially non-transparent material 1014. For example, the at least semi-transparent material 1012 may be co-extruded with the substantially non-transparent material 1014. Alternatively, the at least semi-transparent material 1012 may be separately formed from the substantially non-transparent material 1014, and subsequently mechanically secured together, as desired.

The illustrative lighting apparatus 1000 may be mounted to a stair or other ledge as shown. The cavity 1008 is shown positioned adjacent the ledge 1022 of the stair or ledge. However, it is contemplated that the cavity 1008 may be positioned anywhere along the elongated member, as desired, including adjacent the downward extending surface 1030 of the stair and/or adjacent the substantially horizontally extending surface 1032 of the stair.

Figure 50:
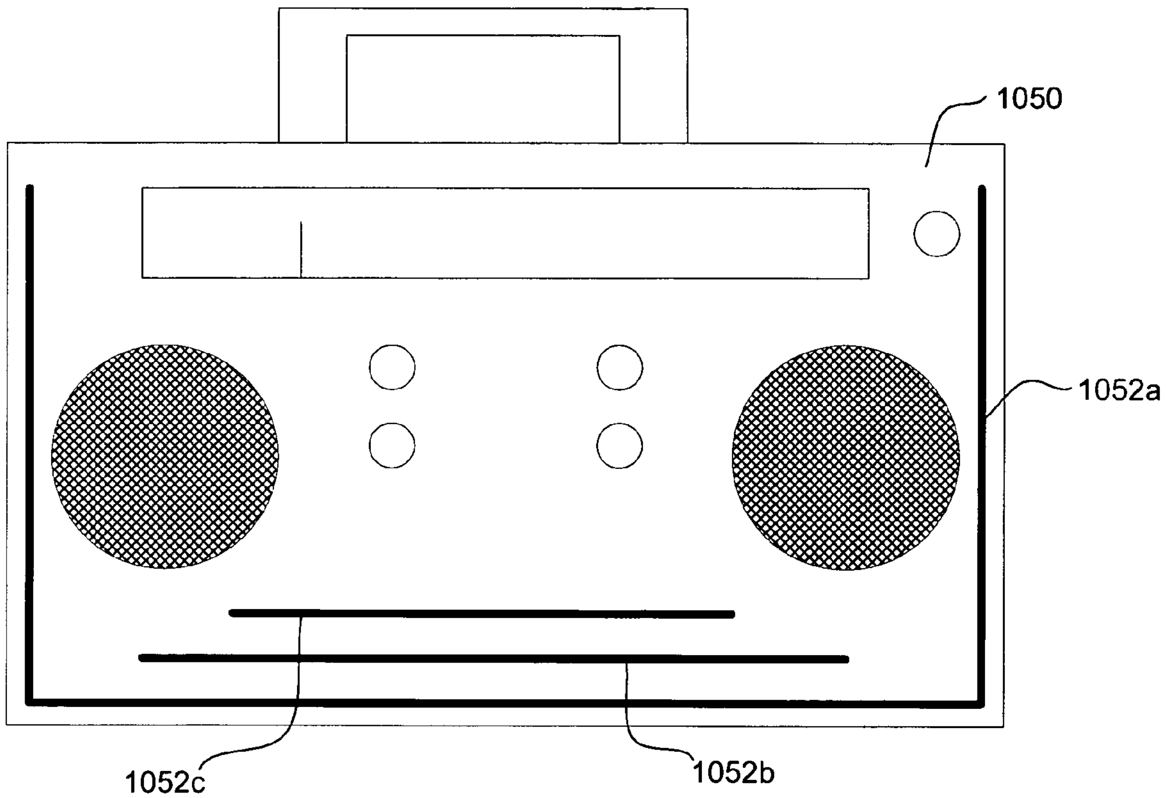
FIG. 50 is a schematic diagram of an illustrative appliance having an elongated light source positioned along the body of the appliance.
Figure 53:
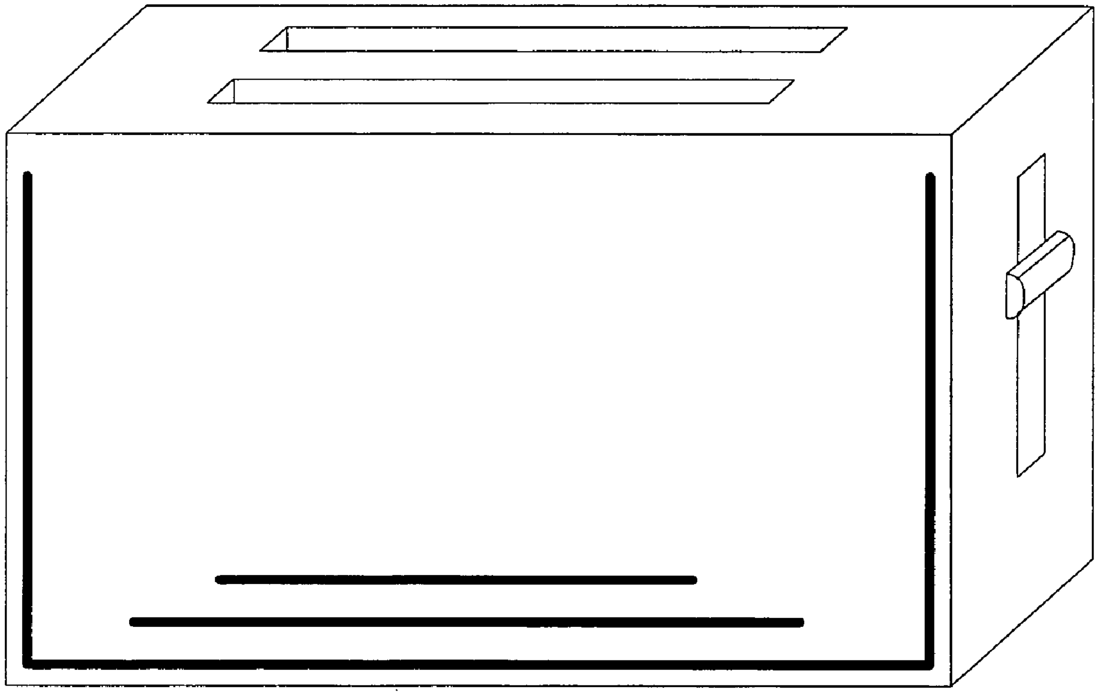
FIG. 53 is a schematic diagram of an illustrative toaster having an elongated light source positioned along the body of the toaster.

FIG. 50 is a schematic diagram of an illustrative appliance having an elongated light source positioned along the body of the appliance. In some applications, it may be desirable to include an elongated light source along the body of an appliance to increase the visual appeal of the appliance, and in some cases, provide low level lighting. Almost any appliance may benefit, including household or office devices operated by gas or electric current. Some illustrative appliances include radios, CD players, DVD players, televisions, refrigerators, stoves, toasters (see FIG. 53), phones, etc.

In one illustrative embodiment of the present invention, the outer housing of an appliance is provided with an elongated cavity. The term cavity, as used throughout, may include an open cavity or a closed cavity. An open cavity is one that is open on one or more sides, and a closed cavity is one that is closed on all sides. The elongated cavity extends along at least a portion of the outer housing, and is adapted to receive an elongated light source, such as an electro-luminescent wire. The cavity is preferably at least partially defined by a material that is at least partially transparent, and which extends to an outer surface of the housing. In some embodiments, the housing may also include a substantially non-transparent material, which in some cases, may be at least partially reflective. The substantially non-transparent material may include a surface that is shaped to reflect light toward the outer surface of the housing.

FIG. 50 shows one such appliance fitted with an elongated light source. The appliance shown in FIG. 50 is a portable music producing device. The portable music producing device includes an outer housing 1050 that has an elongated cavity formed therein. An elongated light source, such as an electro-luminescent wire, is provided in the elongated cavity as shown at 1052*a*, 1052*b* and 1052*c*. Each elongated cavity is preferably at least partially defined by a material that is at least partially transparent, and which extends to an outer surface of the housing 1050 so that the light produced by the elongated light source is visible to the user of the appliance. The elongated light source may receive power from the power source of the appliance. An inverter may be required in some applications to produce the desired power signal to drive the elongated light source.

It is contemplated that the elongated light source may be switched on or off by one or more signals of the appliance. For example, a switch may be provided on the appliance for turning the elongated light source on and off. In another example, the elongated light source may be pulsed on and off by the changes in sound intensity produced by the radio, or may just blink at a predetermined rate. In yet another example, the elongated light source may be turned on when, for example, a toaster is toasting, and turned off when toasting is complete. These are just a few examples of controlling the elongated light source with one or more signals of an appliance.

Figure 51:
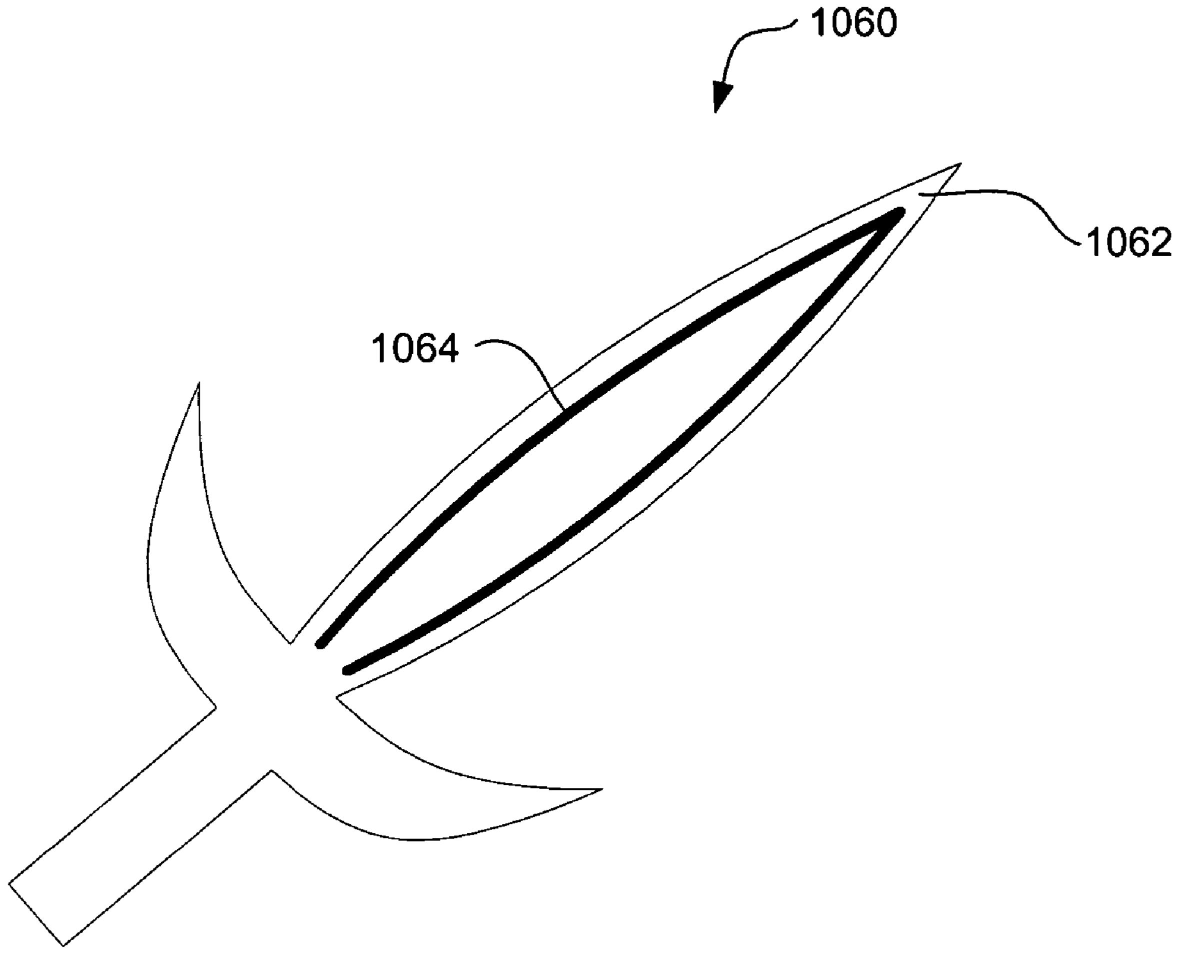
FIG. 51 is a schematic diagram of an illustrative toy having an elongated light source positioned along the body of the toy.

FIG. 51 is a schematic diagram of an illustrative toy having an elongated light source positioned along the body of the toy. In some embodiments, it may be desirable to include an elongated light source along the body of a toy to increase the visual appeal of the toy, and in some cases, provide low level lighting. Almost any toy may benefit, including toy swords, toy vehicle, board games, stuffed animals, etc.

In one illustrative embodiment, the outer shell or housing of a toy is provided with an elongated cavity. The elongated cavity extends along at least a portion of the outer shell or housing, and is adapted to receive an elongated light source, such as an electro-luminescent wire. The cavity is preferably at least partially defined by a material that is at least partially transparent, and which extends to an outer surface of the outer shell or housing. In some embodiments, the shell or housing may also include a substantially non-transparent material, which in some cases, may be at least partially reflective. The substantially non-transparent material may include a surface that is shaped to reflect light toward the outer surface of the housing.

FIG. 51 is a schematic diagram of an illustrative toy sword having an elongated light source positioned along the body of the toy. The toy sword is generally shown at 1060 and includes an outer shell or housing 1062 that has an elongated cavity formed therein. An elongated light source, such as an electro-luminescent wire, is provided in the elongated cavity as shown at 1064. The elongated cavity is preferably at least partially defined by a material that is at least partially transparent, and which extends to an outer surface of the housing 1062 so that the light produced by the elongated light source is visible to the user of the toy. The elongated light source may receive power from the toy. An inverter may be required in some applications to produce the desired power signal to drive the elongated light source.

It is contemplated that the elongated light source may be switched on or off by one or more signals of the toy. For example, a switch may be provided on the toy for turning the elongated light source on and off. In another example, the elongated light source may be pulsed on and off by movement of the toy, or may just blink at a predetermined rate. In yet another example, the elongated light source may be turned on when, for example, the toy is brought close to another similarly equipped toy. These are just a few examples of controlling the elongated light source with one or more signals of a toy.

In another illustrative embodiment, the toy may include an outer shell, and may have a power source within the outer shell. The outer shell may be a sturdy outer shell, or a more flexible outer shell such as is common for stuff animals. In some embodiments, an inverter may be provided within the outer shell and connected to an elongated light source, such as an electro-luminescent wire. At least part of the elongated light source preferably extends outside of the outer shell. For example, and in the case of a stuffed toy dog, the elongated light source may extend out of the outer shell and around the neck of the dog to produce an illuminated collar. In this embodiment, a separate cavity need not be provided in the outer shell of the toy to accommodate the elongated light source.

Figure 52:
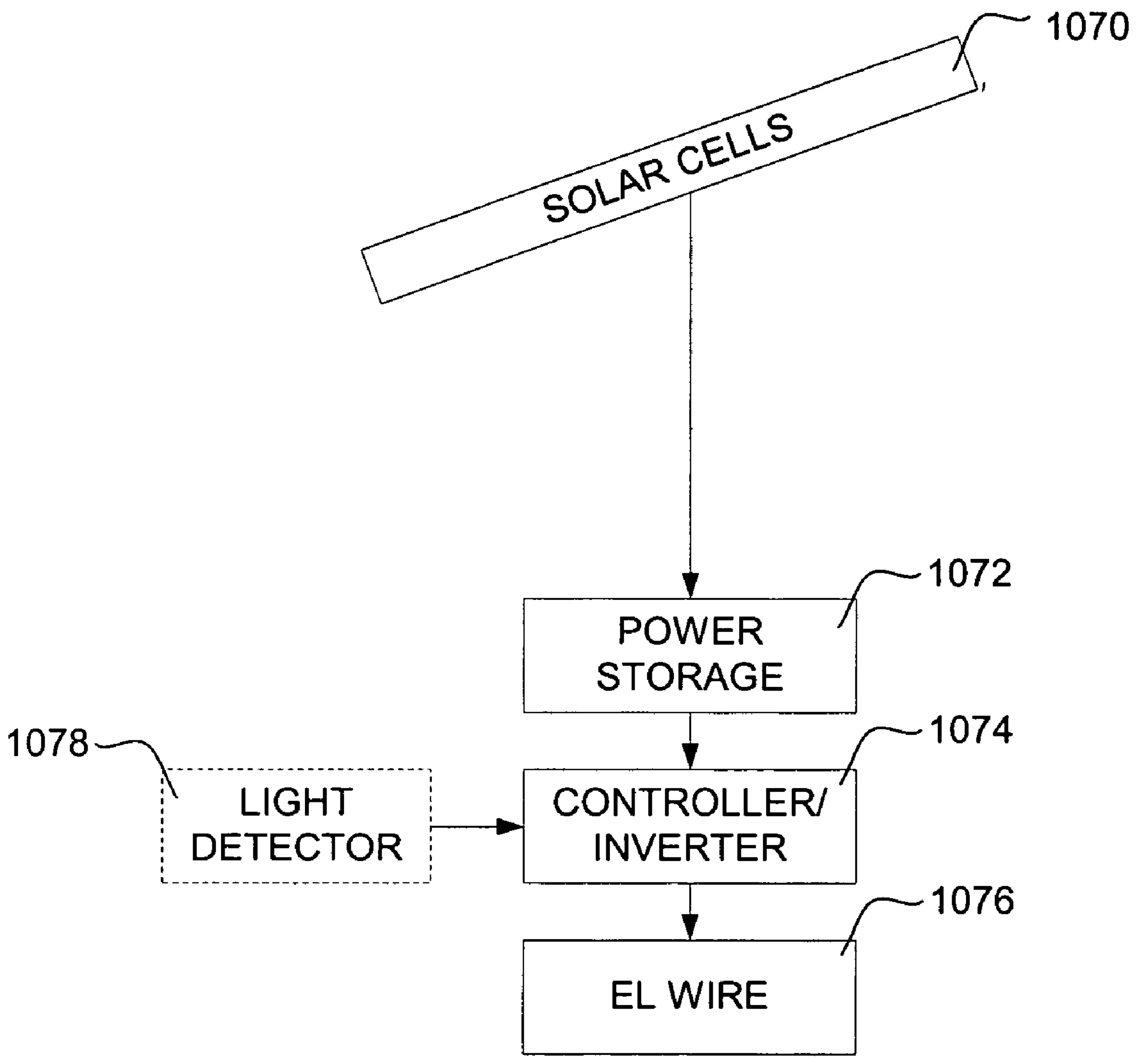
FIG. 52 is a schematic diagram of a solar powered lighting apparatus.

FIG. 52 is a schematic diagram of a solar powered lighting apparatus. In this embodiment, an elongated light source such as an electro-luminescent wire may be powered by one or more solar cells. In the illustrative embodiment shown, one or more solar cells 1070 receive light from an external source such as the sun. The electrical power generated by the one or more solar cells 1070 is provided to a power storage block 1072, which may include one or more batteries or other power storage device(s). A controller and/or inverter 1074 block may then be coupled to the power storage block 1072. The controller and/or inverter block 1074 may include an inverter to convert the power received from the power storage block 1072 to an appropriate power signal for the elongated light source 1076, such as an electro-luminescent wire.

The controller and/or inverter block 1074 may also include a controller for selectively enabling when power is delivered from the power storage block 1072 to the elongated light source 1076. For example, the controller may include a timer to prevent power from being delivered to the elongated light source during certain parts of a day, such as during day time, while allowing power to be delivered to the elongated light source at other times of the day, such as during night time. In another example, the controller may be connected to a light detector 1078. The light detector 1078 may detect the ambient lighting conditions to determine when it is day time and night time. The controller may use the output of the detector 1078 to disable power from being delivered to the elongated light source during the day time, while enabling power to be delivered to the elongated light source during the night time.

Figure 54:
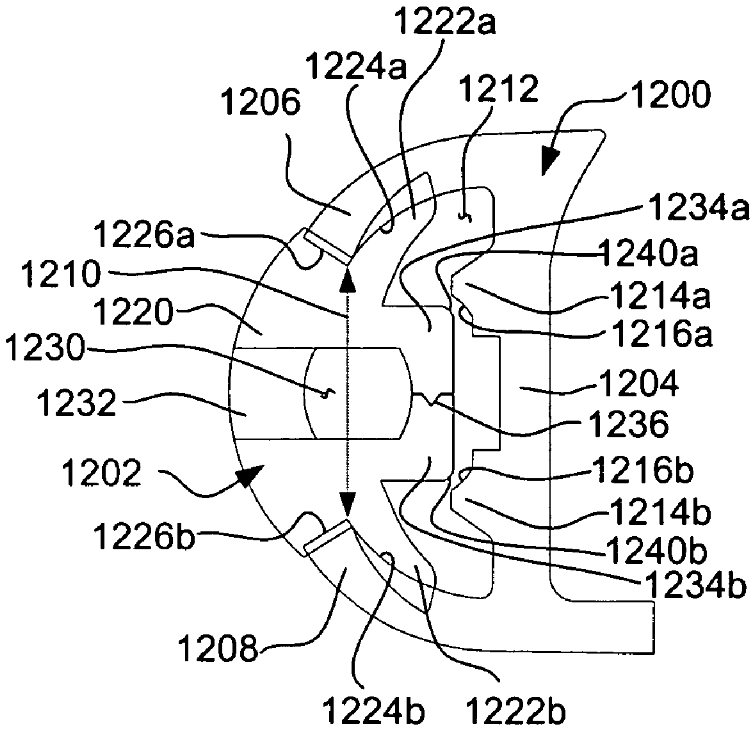
FIG. 54 is an overlapping cross-sectional side view of a carrier and in insert of another illustrative lighting apparatus.

FIG. 54 is an overlapping cross-sectional side view of a carrier and in insert of another illustrative lighting apparatus. The carrier is shown at 1200 and includes a back support 1204, an upper leg 1206 extending from the back support 1204 and a lower leg 1208 also extending from the back support 1204. In the illustrative embodiment, the upper leg 1206 and the lower leg 1208 extend in the leftward direction and turn in toward one another to form a slot 1210. The upper leg 1206, back support 1204 and the lower leg 1208 also define a cavity 1212.

In the illustrative embodiment, the back support includes a first insert stop 1214*a* and a second insert stop 1214*b*, both extending into the cavity 1212. In the illustrative embodiment, the first insert stop 1214*a* includes an angled or curved surface 1216*a*, and the second insert stop 1214*b* includes an angled or curved surface 1216*b*. The angled or curved surfaces 1216*a* and 1216*b* are further discussed below.

The carrier 1200 may be formed in any number of ways, including injection molding, extrusion or any other suitable process. In one illustrative embodiment, the carrier 1200 is extruded using a rigid, semi-rigid and/or flexible PVC, and then cut to length. When more than one material is used, a co-extrusion or other suitable process may be used. More than one material may be useful to, for example, provide additional control over the flexibility of the various regions of the carrier 1200, provide different optical characteristics, provide different colors, and/or provide any other characteristics or properties to the carrier 1200, as desired.

The insert 1202 is shown overlapping the carrier 1200 in FIG. 54 to help show the shape of the insert 1202 relative to the carrier 1200 prior to inserting the insert 1202 into the cavity 1212 of the carrier 1200 via the slot 1210. The illustrative insert 1202 includes a main body 1220, an upper support leg 1222*a* and a lower support leg 1222*b*. In the illustrative embodiment, the upper support leg 1222*a* and the lower support leg 1222*b* are shaped to conform to the inner surface 1224*a* of the upper leg 1206 and the lower leg 1208 of the carrier 1200 when the insert 1202 is inserted into the cavity 1212, as better shown in FIG. 55. However, prior to insertion of the insert 1202, the upper support leg 1222*a* and the lower support leg 1222*b* of the insert 1202 are shown to overlap and/or interfere with the upper leg 1206 and the lower leg 1208 of the carrier 1200. As such, when the insert 1202 is inserted into the cavity 1212 via the slot 1210, the upper support leg 1222*a* and the lower support leg 1222*b* deform and provide an interference fit between the insert 1202 and the carrier 1200.

In the illustrative embodiment, the main body 1220 of the insert 1202 is made slightly wider than the slot 1210 of the carrier 1200. This may cause the main body 1220 to at least slightly deform when the insert is inserted into the cavity 1212 of the carrier 1200. This may provide a further interference fit between the insert 1202 and the carrier 1200, and may help the insert 1202 remain in place during use.

In the illustrative embodiment, the end 1226*a* of the upper leg 1206 of the carrier 1200, and the end 1226*b* of the lower leg 1208 of the carrier 1200 are not parallel to one another. Rather, they are angled away from each other. The main body 1220 of the insert 1202 may have an outer shape that follows the shape of the end 1226*a* of the upper leg 1206 and the end 1226*b* of the lower leg 1208 of the carrier 1200, as shown. This may help transfer any force that is applied to the insert to the upper leg 1206 and the lower leg 1208 of the carrier 1200, and ultimately to a mounting surface (not shown). It should be recognized that this is only an illustrative embodiment, and that other configurations may be used. For example, in one alternative embodiment, the end 1226*a* of the upper leg 1206 and the end 1226*b* of the lower leg 1208 of the carrier 1200 may be rounded or assume some other shape, and the main body 1220 of the insert 1202 may follow or match the rounded or other shape, as desired.

In the illustrative embodiment, the main body 1220 includes a lumen 1230 that extends along the length of the main body 1220. The lumen 1230 may assume any shape or size, as desired. In one illustrative embodiment, the lumen 1230 is appropriately sized to accept an elongated light source (see FIG. 55). In some embodiments, the lumen may have a maximum width of less than 30 mm, less than 20 mm, less than 10 mm, or less than 5 mm across. However, other dimensions may be used.

In some cases, it may be desirable to oversize the lumen 1230 relative to the dimensions of the light source so that there is sufficient room to accommodate changes in the dimensions of the lumen 1230 that occur when the carrier 1200 and insert 1202 are bent around curves or corners along a mounting surface. In some cases, the lumen 1230 may be oversized more in one dimension than another, particularly when the carrier 1200 and insert 1202 are expected to be bent more in one direction than another. For example, in the illustrative embodiment, the lumen 1230 is oversized more in the horizontal direction than in the vertical direction because it is expected that the carrier 1200 and insert 1202 will be bent more in the left and/or right direction than in the up and/or down direction.

In some embodiments, the lumen 1230 may be oversized in at least one dimension by 5%, 10%, 20%, 30%, 40%, 50%, 100%, 200%, 300%, 500%, 1000% or more relative to the corresponding dimension of the light source, or between any of these ranges. In other embodiments, the lumen 1230 may be oversized in at least one dimension by 5%, 10%, 20%, 30%, 40%, 50%, 100%, 200%, 300%, 500%, 1000% or more relative to another dimension of the lumen 1230, or between any of these ranges.

In one illustrative embodiment, the lumen 1230 may be defined on one or more sides by a transparent or semi-transparent material, such as transparent or semi-transparent material 1232, and on the other sides by a non-transparent, or a transparent or semi-transparent material, as desired. In one illustrative embodiment, the transparent or semi-transparent material shown at 1232 allows at least some of the light that is produced by a light source situated in the lumen 1230 to escape from the lumen 1230. In some embodiments, one or more of the other sides of the lumen 1230 may be at least partially reflective, while in others, more than one of the sides are transparent or semi-transparent, as desired.

In some embodiments, one or more of the sides of the lumen 1230 may include a glow-in-the-dark material, if desired. In some cases, all of the sides of the lumen 1230 may include a glow-in-the-dark material, and/or the entire insert 1202 may include a glow-in-the-dark material. In either case, a light source that is situated in the lumen 1230 may charge the glow-in-the-dark material, which may then emit light during and even after the light source goes inactive.

In an illustrative embodiment, the lumen 1230 may be at least partially defined by two walls 1234*a* and 1234*b* that extend toward the back support 1204 of the carrier 1200. In some embodiments, a slit 1236 extends through the back wall of the lumen to separate the two walls 1234*a* and 1234*b*, but this is not required in all embodiments. In some embodiments, the insert 1202 is made from a material that is sufficiently flexible so that the slit 1236 may be opened sufficiently to insert a light source (not shown) into the lumen 1230 before the insert 1202 is inserted into the cavity 1212 of the carrier 1200. Once the insert 1202 is inserted into the cavity 1212 of the carrier 1200, the interference fit between the upper support leg 1222*a* and the lower support leg 1222*b* of the insert 1202, and the upper leg 1206 and the lower leg 1208 of the carrier 1200, may help provide a closing force to the slit 1236.

In the illustrative embodiment, the surface of the slit 1236 assumes a “V” shape, which may help keep the ends of the two walls 1234*a* and 1234*b* aligned. However, it is contemplated that the surface of the slit 1236 may have any desired shape including a flat shape, a grooved shape, a rounded shape, or any other shape, as desired.

In some embodiments, back terminal ends 1240*a* and 1240*b* of the two walls 1234*a* and 1234*b*, respectively, may be aligned with the angled or curved surfaces 1216*a* and 1216*b* of the first and second insert stops 1214*a* and 1214*b*, respectively, of the carrier 1200. In the illustrative embodiment, the first and second insert stops 1214*a* and 1214*b* may help limit the backward movement of the insert 1202 toward the back support 1204 of the carrier 1200. This may be useful when, for example, a significant force is applied to the insert 1202, such as when a boat bumps against a dock with sufficient force. The angled or curved surfaces 1216*a* and 1216*b* of the first and second insert stops 1214*a* and 1214*b* may also help keep the insert 1202 vertically aligned with the carrier 1200, and/or help provide a closing force to the slit 1236, when the back terminal ends 1240*a* and 1240*b* of the two walls 1234*a* and 1234*b*, respectively, engage the angled or curved surfaces 1216*a* and 1216*b*.

The insert 1202 may be made in any number of ways, including injection molding, extrusion or any other suitable process. In one illustrative embodiment, the insert 1202 is extruded using a rigid, a semi-rigid and/or a flexible PVC, and then cut to length. However, other materials may also be used. When the insert 1202 is made from more than one material, the various materials may be co-extruded, or any other suitable process may be used. For example, it is contemplated that more than one material may be used, for example, to help provide additional control over the flexibility of the various regions of the insert 1202. Alternatively, or in addition, it is contemplated that more than one material may be used to make part of the insert transparent or semi-transparent and another part non-transparent, or different colors, as desired. For example, in one embodiment, the lumen 1230 is defined on one side by a transparent or semi-transparent material 1232, and on the other sides by a non-transparent material. The transparent or semi-transparent material 1232 may be co-extruded with the non-transparent material, if desired.

Using more flexible material(s) for the insert 1230, such as semi-rigid or flexible PVC, may allow the insert 1202 to be more easily coiled during shipment. However, a more rigid material may be more durable. It is contemplated that the insert 1202 may be made from any suitable material or material combination, using any suitable manufacturing process, as desired.

Figure 55:
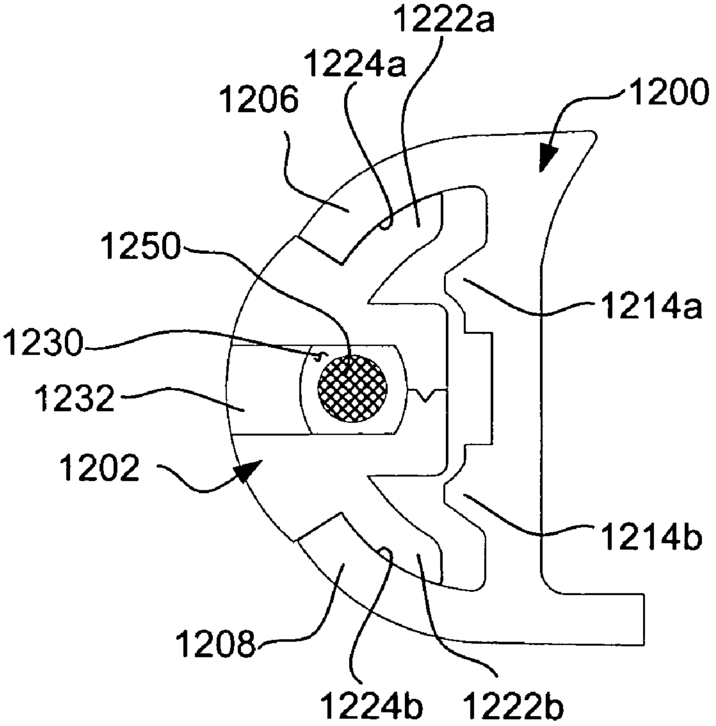
FIG. 55 is a cross-sectional side view of the illustrative lighting apparatus of FIG. 54 with the insert installed within the carrier.

FIG. 55 is a cross-sectional side view of the illustrative lighting apparatus of FIG. 54 with the insert installed in the cavity 1212 of the carrier 1200. As can be seen, and in the illustrative embodiment, the upper support leg 1222*a* and the lower support leg 1222*b* of the insert 1202 are shaped to conform to the inner surface 1224*a* of the upper leg 1206 and the lower leg 1208 of the carrier 1200 when the insert 1202 is inserted to the cavity 1212. As detailed above with respect to FIG. 54, prior to insertion of the insert 1202, the upper support leg 1222*a* and the lower support leg 1222*b* of the insert 1202 may be made to overlap and/or interfere with the upper leg 1206 and the lower leg 1208 of the carrier 1200. As such, when the insert 1202 is inserted into the cavity 1212 via the slot 1210, the upper support leg 1222*a* and the lower support leg 1222*b* of the insert 1202 deform to provide an interference fit between the insert 1202 and the carrier 1200.

FIG. 55 also shows a light source 1250 extending through the lumen 1230 of the insert 1202. In one embodiment, region 1232 may be formed from a transparent or semi-transparent material, and the other sides of the lumen 1230 may be formed from a non-transparent material. This non-transparent material may be at least partially reflective, in at least some embodiments. The transparent or semi-transparent material shown at 1232 may allow at least some of the light emitted by the light source to escape from the lumen 1230.

Figure 56:
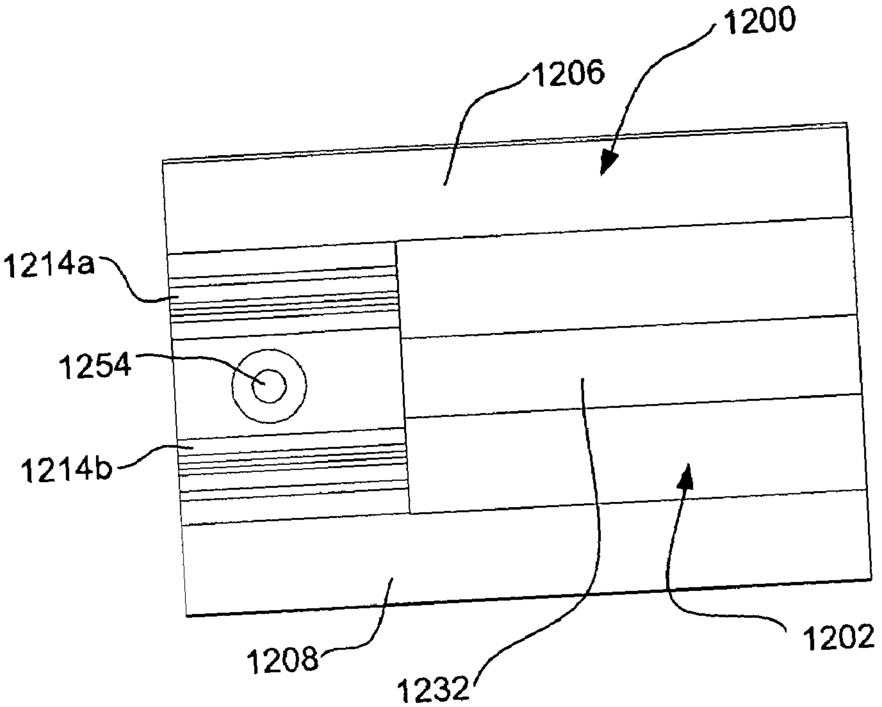
FIG. 56 is a front view of the illustrative lighting apparatus of FIG. 55, with the insert shorter than the carrier for illustrative purposes.
Figure 57:
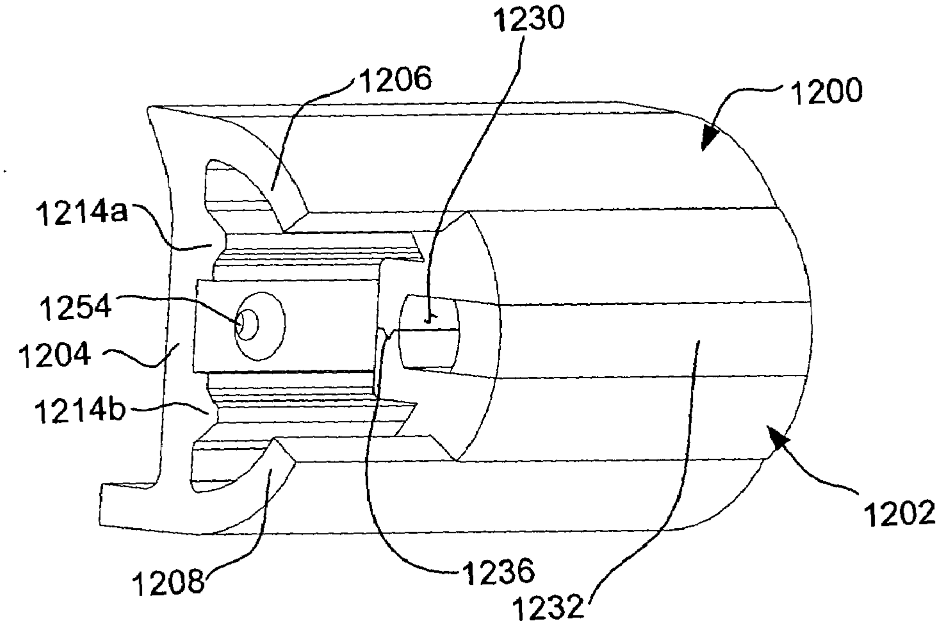
FIG. 57 is a perspective view of the illustrative lighting apparatus of FIG. 56, again the insert shorter than the carrier for illustrative purposes.

FIG. 56 is a front view of the illustrative lighting apparatus of FIG. 55, wherein the insert is shorter than the carrier for illustrative purposes. Typically, the insert 1202 and carrier 1200 are made approximately the same length, but to reveal the hole 1254 in the carrier 1200, the insert 1202 is shown having a shorter length. It is contemplated that the carrier 1200 may include a series of holes 1254 at spaced locations along the length of the carrier. In some embodiments, screws may be inserted through the holes 1254 to secure the carrier to a mounting surface (not shown) such as the side of a boat or dock. In some cases, the holes 1254 are spaced between 4 and 16 inches apart, but other spacings may be used depending on the application. FIG. 57 is a perspective view of the illustrative lighting apparatus of FIG. 56.

Figure 58:
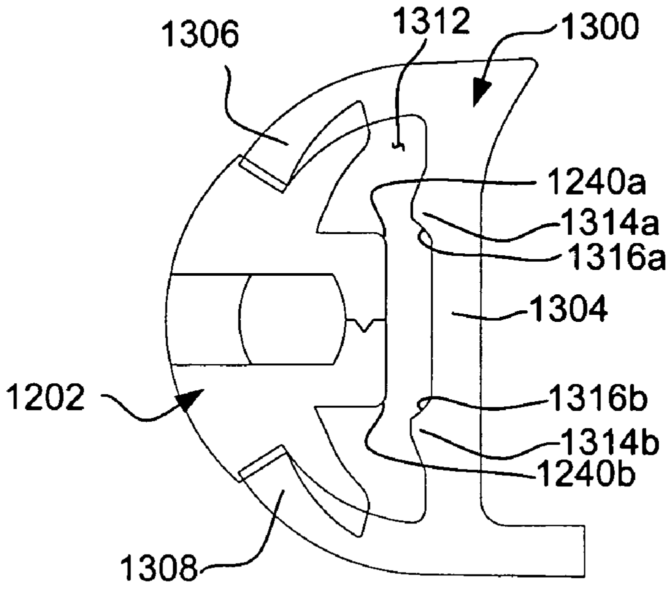
FIG. 58 is an overlapping cross-sectional side view of another illustrative lighting apparatus that includes a carrier and in insert, wherein the insert is adapted to receive a light source.

FIG. 58 is an overlapping cross-sectional side view of another illustrative carrier and insert in accordance with the present invention. The carrier is shown at 1300, and is similar to the carrier 1200 of FIG. 54. The carrier 1300 of FIG. 58 includes a back support 1304, an upper leg 1306 extending from the back support 1304 and a lower leg 1308 also extending from the back support 1304. The upper leg 1306, back support 1304 and the lower leg 1308 define a cavity 1312.

In the illustrative embodiment, and like the illustrative embodiment shown in FIG. 54, the back support 1304 includes a first insert stop 1314*a* and a second insert stop 1214*b*, both extending into the cavity 1312. However, in the illustrative embodiment of FIG. 58, the first insert stop 1314*a* and the second insert stop 1314*b* do not protrude as far into the cavity 1312 as that shown in FIG. 54. This provides more space between the back terminal ends 1240*a* and 1240*b* of the insert 1202 and the angled or curved surfaces 1316*a* and 1316*b* of the first and second insert stops 1314*a* and 1314*b* of the carrier 1300. This increased space may allow the carrier 1300 and insert 1202 to be bent around sharper corners along their length in the rightward direction without having the back terminal ends 1240*a* and 1240*b* of the insert 1202 coming into contact with the angled or curved surfaces 1316*a* and 1316*b* of the first and second insert stops 1314*a* and 1314*b* of the carrier 1300.

In some cases, if the carrier 1300 is bent in the rightward direction in FIG. 58, the upper leg 1306 and lower leg 1308 of the carrier 1300 may pull back toward the back support 1304, at least to some degree. This may then move the insert 1202 back toward the back support 1304. If the carrier 1300 is bent sufficiently far, the back terminal ends 1240*a* and 1240*b* of the insert 1202 may engage the angled or curved surfaces 1316*a* and 1316*b* of the first and second insert stops 1314*a* and 1314*b* of the carrier 1300, and in some cases, prevent the insert 1202 from seating correctly in the carrier 1300. As such, it is contemplated that the space between the back terminal ends 1240*a* and 1240*b* of the insert 1202 and the angled or curved surfaces 1316*a* and 1316*b* of the first and second insert stops 1314*a* and 1314*b* of the carrier 1300 may be tailored to accommodate the expected bend radius of the carrier 1300.

Figure 59:
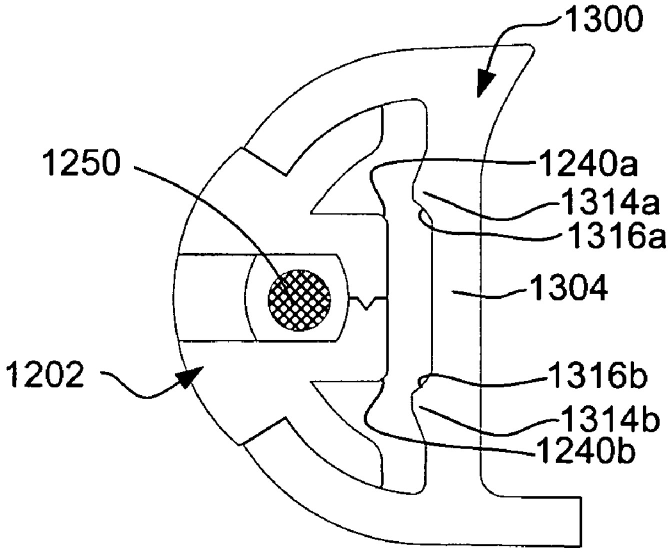
FIG. 59 is a cross-sectional side view of the illustrative lighting apparatus of FIG. 58 with the insert installed within the carrier.

FIG. 59 is a cross-sectional side view of the illustrative lighting apparatus of FIG. 58 with the insert 1202 installed within the carrier 1300. As can be seen, the space between the back terminal ends 1240*a* and 1240*b* of the insert 1202 and the angled or curved surfaces 1316*a* and 1316*b* of the first and second insert stops 1314*a* and 1314*b* of the carrier 1300 is larger than that shown in FIG. 55.

Figure 60:
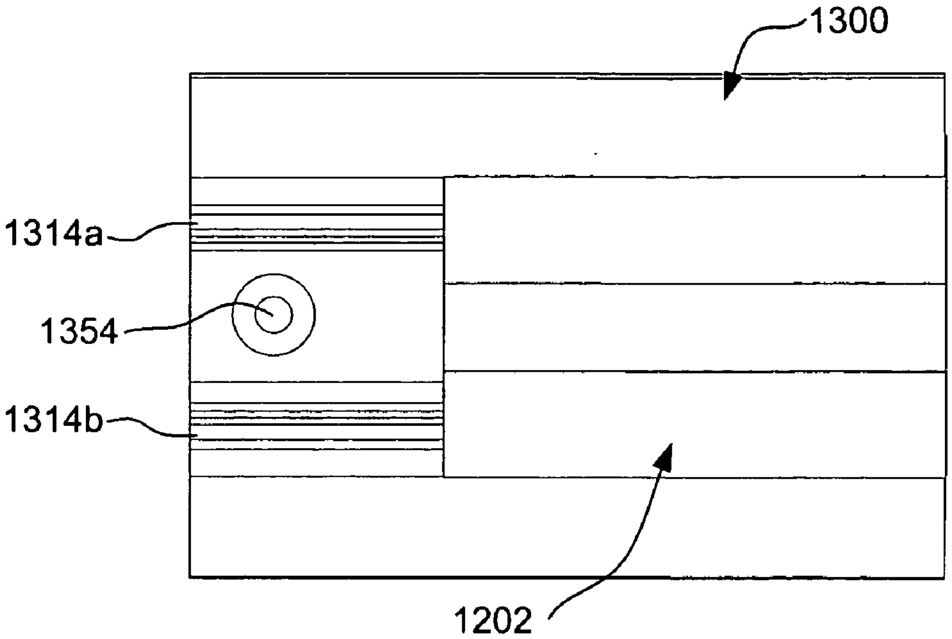
FIG. 60 is a front view of the illustrative lighting apparatus of FIG. 59, with the insert shorter than the carrier for illustrative purposes.
Figure 61:
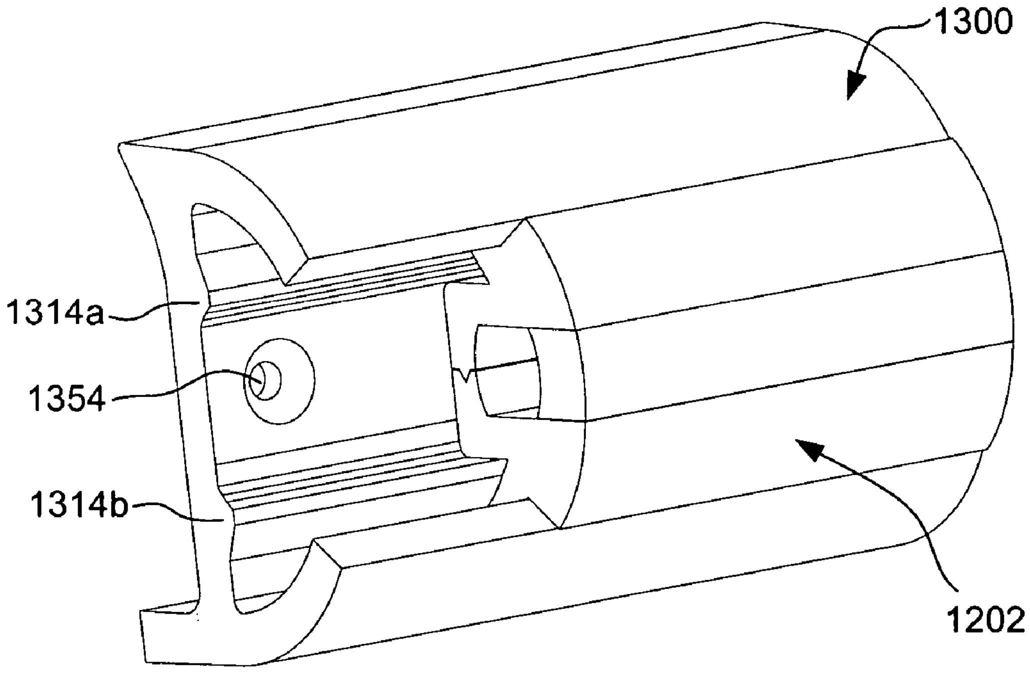
FIG. 61 is a perspective view of the illustrative lighting apparatus of FIG. 60, again the insert shorter than the carrier for illustrative purposes.

FIG. 60 is a front view of the illustrative lighting apparatus of FIG. 59, wherein the insert 1202 is shown shorter than the carrier 1300 for illustrative purposes. Typically, the insert 1202 and the carrier 1300 are made approximately the same length, but to reveal the hole 1354 in the carrier 1300, the insert 1202 is shown having a shorter length. It is contemplated that the carrier 1300 may include a series of holes 1354 at spaced locations along the length of the carrier 1300. In some embodiments, screws may be inserted through the holes 1354 to secure the carrier 1300 to a mounting surface (not shown) such as the side of a boat or dock. In some cases, the holes 1354 are spaced between 4 and 16 inches apart, but other spacings may be used, depending on the application. FIG. 61 is a perspective view of the illustrative lighting apparatus of FIG. 60.

Figure 62:
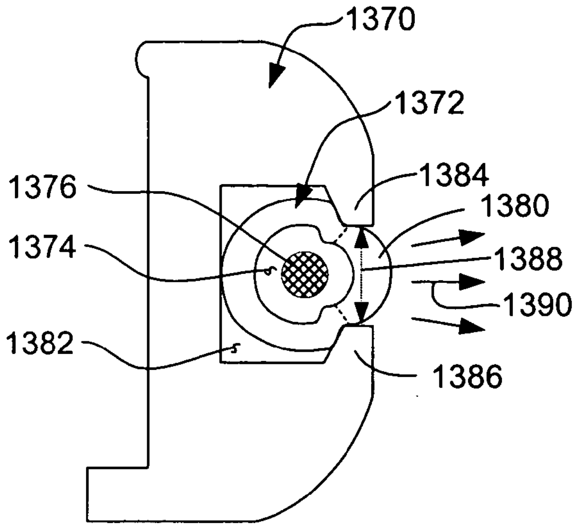
FIG. 62 is a cross-sectional side view of another illustrative lighting apparatus in accordance with the present invention.
Figure 63:
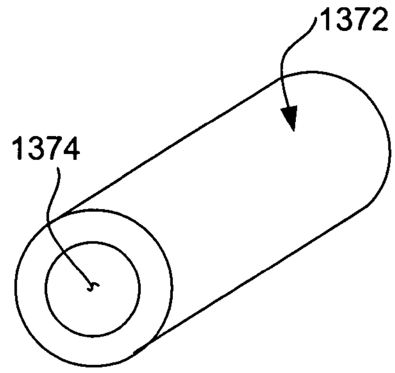
FIG. 63 is a perspective side view of an illustrative insert that may be used in conjunction with the illustrative light apparatus of FIG. 62.

FIG. 62 is a cross-sectional side view of another illustrative lighting apparatus in accordance with the present invention. This illustrative embodiment includes a carrier 1370 and an insert 1372. The carrier 1370 includes a cavity 1382 for receiving the insert 1372. An upper leg 1384 and a lower leg 1386 of the carrier define a slot 1388 into the cavity 1382. The width of the slot 1388 is shown less than the width of the cavity 1382. An illustrative insert 1372 is shown in FIG. 63. The illustrative insert 1372 may be tubular in shape, or some other shape, and may have a lumen extending therethrough.

In the illustrative embodiment, a light source 1376 is provided in the lumen 1374 of the insert 1372, and the insert 1372 is provided in the cavity 1382 of the carrier 1370 via the slot 1388, as best shown in FIG. 62. It is contemplated that the light source may be provided in the lumen 1374 of the insert 1372 either before or after the insert 1372 is provided in the cavity 1382 of the carrier 1370 via the slot 1388. As can be seen, and in some embodiments, the insert 1372 may have to be deformed to fit through the slot 1388 of the carrier 1370. Some of the insert 1372, however, may extend out of the cavity 1382 and through the slot 1388 as shown. This may allow the insert 1372, which may be made from a softer or more flexible material than the carrier 1370, to provide a softer bumper function.

At least part of the insert 1372 may be made from a transparent or semi-transparent material so that at least some of the light 1390 emitted by the light source 1376 may escape as shown. In some embodiments, the entire insert 1372 may be made from a transparent or semi-transparent material. In other cases, only part(s) of the insert 1372 may be made from a transparent or semi-transparent material. When only part(s) of the insert 1372 is/are made from a transparent or semi-transparent material, that part(s) may be in registration with the slot 1388 so that at least some of the light 1390 emitted by the light source 1376 may escape. In some cases, at least part of the carrier 1370 and/or insert 1372 may include a glow-in-the-dark material, if desired.

Figure 64:
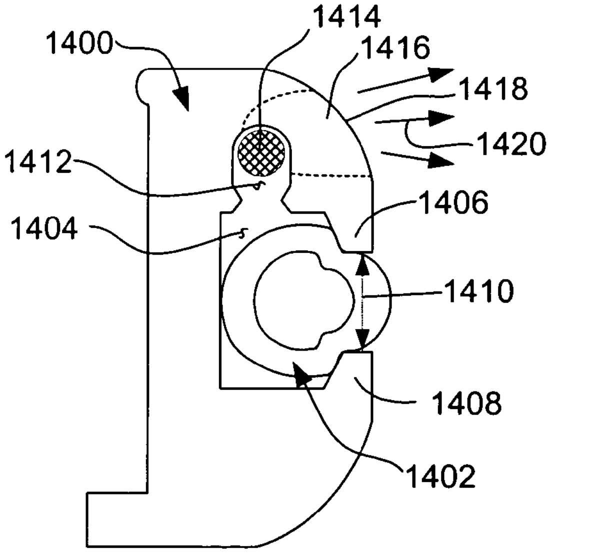
FIG. 64 is a cross-sectional side view of another illustrative lighting apparatus in accordance with the present invention, wherein the carrier includes an opening for receiving a light source.

FIG. 64 is a cross-sectional side view of another illustrative lighting apparatus in accordance with the present invention. This illustrative embodiment includes a carrier 1400 and an insert 1402. The carrier 1400 includes a main cavity 1404 for receiving the insert 1402, where an upper leg 1406 and a lower leg 1408 of the carrier 1400 define a slot 1410 into the main cavity 1404. The width of the slot 1410 is shown less than the width of the main cavity 1404. An illustrative insert 1402 is shown in FIG. 63.

In some embodiments, the insert 1402 may have to be deformed to fit through the slot 1410 of the carrier 1400. Some of the insert 1402, however, may extend out of the main cavity 1404 and through the slot 1410 as shown. This may allow the insert 1402, which may be made from a softer or more flexible material than the carrier 1402, to provide a softer bumper function.

Figure 65:
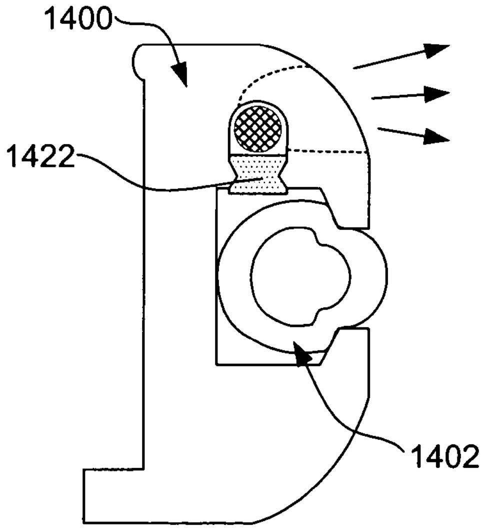
FIG. 65 is a cross-sectional side view of the illustrative lighting apparatus of FIG. 64 with a plug inserted into the opening of the carrier.

In the illustrative embodiment, the carrier 1400 may also include a light source cavity 1412, which may extend from the main cavity 1404. In the illustrative embodiment, the carrier 1400 includes inward extending teeth or legs that narrow the channel between the light source cavity 1412 and the main cavity 1404. In one illustrative embodiment, the light source 1414 is an elongated light source and is inserted through the slot 1410 and into the light source cavity 1412. Then, an elongated plug 1422 is inserted between the light source cavity 1412 and the main cavity 1404, as best shown in FIG. 65. The teeth or legs of the carrier 1400 that narrow the channel between the light source cavity 1412 and the main cavity 1404 may help retain the plug in the inserted position. While teeth or legs are shown in the illustrative embodiment, they are not required in all embodiments.

In some embodiments, the light source cavity 1412 may be oversized at least in one dimension by 5%, 10%, 20%, 30%, 40%, 50%, 100%, 200%, 300%, 500%, 1000% or more relative to the corresponding dimensions of the light source 1414, or between any of these ranges. In other embodiments, the light source cavity 1412 may be oversized in at least one dimension by 5%, 10%, 20%, 30%, 40%, 50%, 100%, 200%, 300%, 500%, 1000% or more relative to another dimension of the light source cavity 1412, or between any of these ranges. In some cases, this may help accommodate changes in the dimensions of the light source cavity 1412 when the carrier 1400 is bent when it is installed on a mounting surface (not shown).

The carrier 1400 may also include a transparent or semi-transparent region 1416 that extends from the light source cavity 1412 to an outer surface 1418 of the carrier 1400 to allow at least some of the light 1420 emitted by the light source 1414 to escape. In some cases, the entire carrier 1400 may be formed from a transparent or semi-transparent material, if desired.

In some cases, the plug 1422 may be made from a non-transparent material. However, in other cases, the plug 1422 may include a transparent or semi-transparent material, which may allow at least some of the light emitted by the light source 1414 to enter the main cavity 1404. In these cases, at least part of the insert 1402 may also include a transparent or semi-transparent material to allow at least some of the light that enters the main cavity 1404 to escape through the slot 1410.

Figure 66:
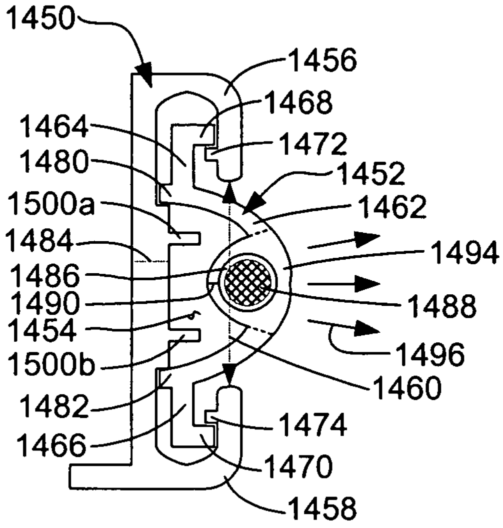
FIG. 66 is a cross-sectional side view of another illustrative lighting apparatus in accordance with the present invention.

FIG. 66 is a cross-sectional side view of another illustrative lighting apparatus in accordance with the present invention. This illustrative embodiment includes a carrier 1450 and an insert 1452. The carrier 1450 includes a main cavity 1454 for receiving the insert 1452, where an upper leg 1456 and a lower leg 1458 of the carrier 1450 define a slot 1460 into the main cavity 1454. The width of the slot 1460 is shown less than the width of the main cavity 1454.

In the illustrative embodiment, the insert 1452 includes an arched center region 1462, with an upper leg 1464 extending in an upward direction from the arched center region 1462 and a lower leg 1466 extending in a downward direction from the arched center region 1462. The upper leg 1464 includes a tooth 1468 for engaging a tooth 1472 on the upper leg 1456 of the carrier 1450. Likewise, the lower leg 1466 includes a tooth 1470 for engaging a tooth 1474 on the lower leg 1458 of the carrier 1450. The insert 1452 also includes an upper back side tooth 1480 and a lower back side tooth 1482 to engage the sides of a thickened portion 1484 of the back support of the carrier 1450, as shown.

In the illustrative embodiment, the arched center region 1462 includes a lumen 1486 for receiving a light source 1488. In some embodiments, a slit 1490 may provide access to the lumen 1486. The arched center region 1462 may include a transparent or semi-transparent region 1494, indicated by dashed lines in FIG. 66, to allow at least some of the light 1496 emitted by the light source 1488 to escape from the lumen 1486, as shown. In some embodiments, the entire insert 1452 may be formed from a transparent or semi-transparent material, if desired.

In some embodiments, the lumen 1486 may be oversized at least in one dimension by 5%, 10%, 20%, 30%, 40%, 50%, 100%, 200%, 300%, 500%, 1000% or more relative to the corresponding dimensions of the light source 1488, or between any of these ranges. In other embodiments, the lumen 1486 may be oversized in at least one dimension by 5%, 10%, 20%, 30%, 40%, 50%, 100%, 200%, 300%, 500%, 1000% or more relative to another dimension of the lumen 1486, or between any of these ranges. In some cases, this may help accommodate changes in the dimensions of the lumen 1486 when the carrier 1450 and insert 1452 are bent when installed on a mounting surface (not shown).

In some embodiments, the carrier 1450 may also include one or more insert stops, such as insert stops 1500*a* and 1500*b*. Insert stops 1500*a* and 1500*b* may limit the amount that the arched center region 1462 may move toward the carrier 1450 when a sufficiently large force is applied to the insert 1452. The illustrative insert stops 1500*a* and 1500*b* extend from the back support of the carrier 1450, and are spaced on either side of the light source 1488. The height of the insert stops 1500*a* and 1500*b* may be such that the light source 1488 may move between the insert stops 1500*a* and 1500*b* when a sufficient force is applied to the insert 1542, but the arched center region 1462 of the insert 1452 is prevented from moving too close to the back support of the carrier 1450 to cause damage the light source 1488.

Figure 67:
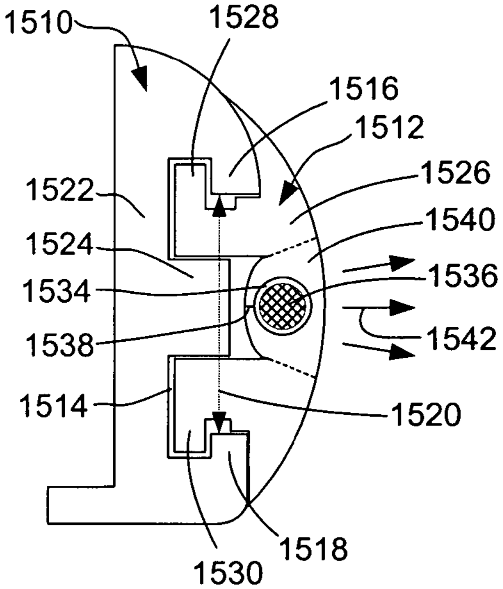
FIG. 67 is a cross-sectional side view of another illustrative lighting apparatus in accordance with the present invention.

FIG. 67 is a cross-sectional side view of another illustrative lighting apparatus in accordance with the present invention. This illustrative embodiment includes a carrier 1510 and an insert 1502. The carrier 1510 includes a main cavity 1514 for receiving the insert 1512. An upper leg 1516 and a lower leg 1518 of the carrier 1510 define a slot 1520 into the main cavity 1514. The width of the slot 1520 is shown less than the width of the main cavity 1514. The carrier 1510 further includes a back support 1522 with a thickened region 1524. The thickened region 1524 extends into the main cavity 1514.

In this embodiment, the insert 1512 includes a main body region 1526, and an upper leg 1528 that extends in an upward direction from the main body region 1526 and a lower leg 1530 that extends in a downward direction from the main body region 1526. The upper leg 1528 extends into an upper portion of the main cavity 1514, and the lower leg 1530 extends into a lower portion of the main cavity 1514. In the illustrative embodiment, the upper leg 1528 and the lower leg 1530 also engage the sides of the thickened portion 1524 of the back support 1522 of the carrier 1510, as shown.

In the illustrative embodiment, the main body region 1526 includes a lumen 1534 for receiving a light source 1536. In some embodiments, a slit 1538 may provide access to the lumen 1534. The main body region 1526 may include a transparent or semi-transparent region 1540, indicated by dashed lines in FIG. 67, to allow at least some of the light 1542 emitted by light source 1536 to escape from the lumen 1534, as shown. In some embodiments, the entire insert 1512 may be formed from a transparent or semi-transparent material, if desired.

In some embodiments, the lumen 1534 may be oversized at least in one dimension by 5%, 10%, 20%, 30%, 40%, 50%, 100%, 200%, 300%, 500%, 1000% or more relative to the corresponding dimensions of the light source 1536, or between any of these ranges. In other embodiments, the lumen 1534 may be oversized in at least one dimension by 5%, 10%, 20%, 30%, 40%, 50%, 100%, 200%, 300%, 500%, 1000% or more relative to another dimension of the lumen 1534, or between any of these ranges. In some cases, this may help accommodate changes in the dimensions of the lumen 1534 when the carrier 1510 and insert 1512 are bent when installed on a mounting surface (not shown).

Figure 68:
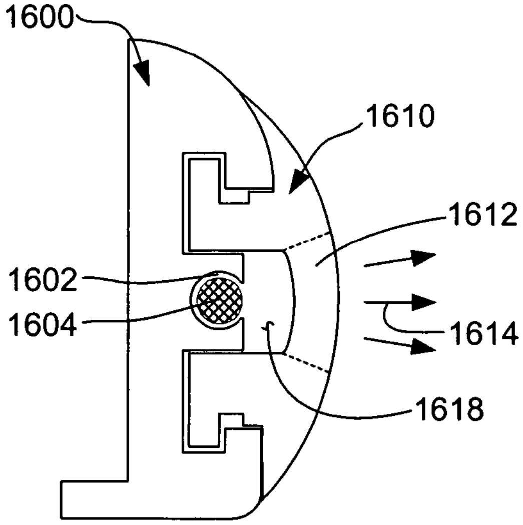
FIG. 68 is a cross-sectional side view of another illustrative lighting apparatus in accordance with the present invention.

FIG. 68 is a cross-sectional side view of another illustrative lighting apparatus in accordance with the present invention. The illustrative embodiment of FIG. 68 is similar to that shown in FIG. 67, but the carrier 1600 includes a cavity 1602 for receiving a light source 1604. To allow at least some of the light to escape, the insert 1610 may include a transparent or semi-transparent region 1612, indicated by dashed lines in FIG. 68. In some embodiments, the entire insert 1610 may be formed from a transparent or semi-transparent material, if desired. In some embodiments, a transparent or semi-transparent plug (not shown) may be installed between the main cavity 1618 of the carrier 1600 and the light source receiving cavity 1602 in a manner similar to that shown in FIG. 65.

In some cases, the cavity 1602 may be oversized at least in one dimension by 5%, 10%, 20%, 30%, 40%, 50%, 100%, 200%, 300%, 500%, 1000% or more relative to the corresponding dimensions of the light source 1604, or between any of these ranges. In other embodiments, the cavity 1602 may be oversized in at least one dimension by 5%, 10%, 20%, 30%, 40%, 50%, 100%, 200%, 300%, 500%, 1000% or more relative to another dimension of the cavity 1602, or between any of these ranges. In some cases, this may help accommodate changes in the dimensions of the cavity 1602 when the carrier 1600 is bent when installed on a mounting surface (not shown).

Figure 69:
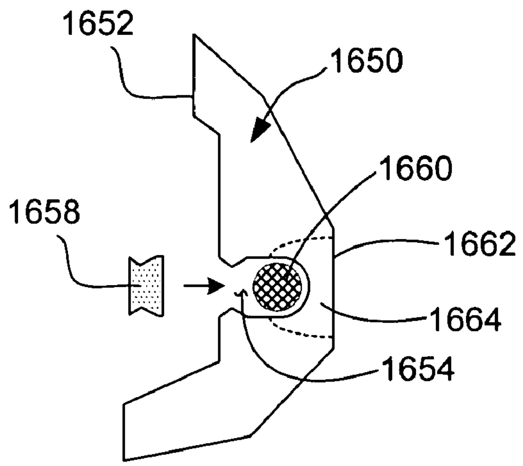
FIG. 69 is a cross-sectional side view of yet another illustrative lighting apparatus in accordance with the present invention, with an opening for receiving a light source.

FIG. 69 is a cross-sectional side view of yet another illustrative lighting apparatus in accordance with the present invention. This illustrative embodiment includes a bumper 1650 that includes a back side 1652 that faces a mounting surface (not shown). A light source cavity 1654 extends through the back side 1652 of the bumper 1650, and in the illustrative embodiment, includes inward extending teeth or legs that narrow the channel between the exterior of the bumper 1650 and the light source cavity 1412. While inward extending teeth or legs are shown in FIG. 69, they are not required.

Figure 70:
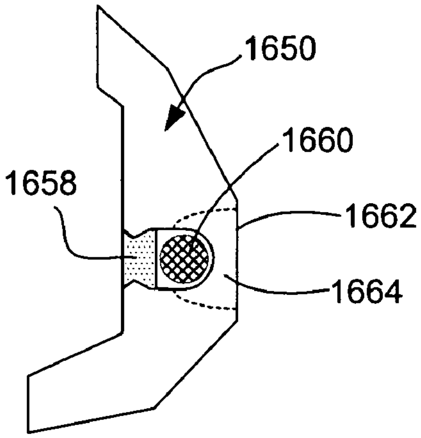
FIG. 70 is a cross-sectional side view of the illustrative lighting apparatus of FIG. 69 with a plug inserted into the opening.

In one illustrative embodiment, a light source 1660 is inserted from the back side 1652 of the bumper 1650 and into the light source cavity 1654. Then, an elongated plug 1658 may be inserted between the light source cavity 1654 and the exterior of the bumper, as best shown in FIG. 70. In some cases, the light source 1660 is an elongated light source and the plug is an elongated plug. The teeth or legs of the bumper 1650 that narrow the channel between the light source cavity 1654 and the exterior of the bumper 1650 may help retain the plug in the installed position. In some embodiments, the plug 1658 forms a water tight seal to help prevent water or other moisture from entering the light source cavity 1654.

In some embodiments, the light source cavity 1654 may be oversized at least in one dimension by 5%, 10%, 20%, 30%, 40%, 50%, 100%, 200%, 300%, 500%, 1000% or more relative to the corresponding dimensions of the light source 1660, or between any of these ranges. In other embodiments, the light source cavity 1654 may be oversized in at least one dimension by 5%, 10%, 20%, 30%, 40%, 50%, 100%, 200%, 300%, 500%, 1000% or more relative to another dimension of the light source cavity 1654, or between any of these ranges. In some cases, this may help accommodate changes in the dimensions of the light source cavity 1654 when the bumper 1650 is bent when installed on a mounting surface (not shown).

The bumper 1650 may include a transparent or semi-transparent region 1664, indicated by dashed lines, that extends from the light source cavity 1654 to an outer surface 1662 of the bumper 1650. The transparent or semi-transparent region 1664 may allow at least some of the light emitted by the light source 1664 to escape. In some embodiments, the entire bumper 1650 may be made from a transparent or semi-transparent material, if desired. Alternatively, or in addition, it is contemplated that at least part of the bumper 1650 may include a glow-in-the-dark material.

Figure 71:
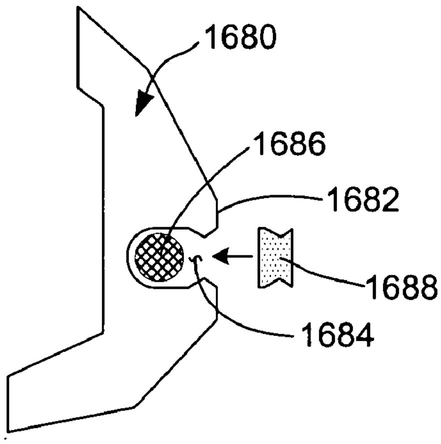
FIG. 71 is a cross-sectional side view of yet another illustrative lighting apparatus in accordance with the present invention, with an opening for receiving a light source.

FIG. 71 is a cross-sectional side view of yet another illustrative lighting apparatus in accordance with the present invention. This illustrative embodiment includes a bumper 1680 that includes a front surface 1682 that faces away from a mounting surface (not shown). A light source cavity 1684 extends through the front side 1682 of the bumper 1680, and in the illustrative embodiment, includes inward extending teeth or legs that narrow the channel between the exterior of the bumper 1680 and the light source cavity 1684. While inward extending teeth or legs are shown in FIG. 71, they are not required.

Figure 72:
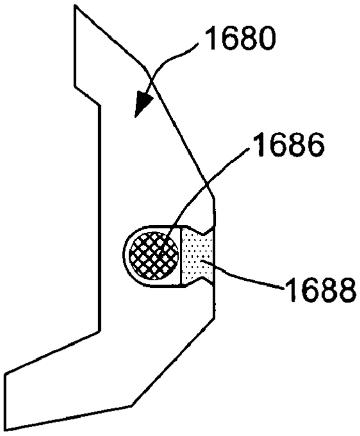
FIG. 72 is a cross-sectional side view of the illustrative lighting apparatus of FIG. 71 with a plug inserted into the opening.

In one illustrative embodiment, a light source 1686 is inserted from the front side 1682 of the bumper 1680 and into the light source cavity 1684. Then, an elongated plug 1688 may be inserted between the light source cavity 1684 and the exterior of the bumper 1680, as best shown in FIG. 72. In some cases, the light source 1686 is an elongated light source and the plug 1688 is an elongated plug. The teeth or legs of the bumper 1680 that narrow the channel between the light source cavity 1684 and the exterior of the bumper 1680 may help retain the plug in the installed position. In some embodiments, the plug 1688 forms a water tight seal to help prevent water or other moisture from entering the light source cavity 1684.

In some embodiments, the light source cavity 1684 may be oversized at least in one dimension by 5%, 10%, 20%, 30%, 40%, 50%, 100%, 200%, 300%, 500%, 1000% or more relative to the corresponding dimensions of the light source 1686, or between any of these ranges. In other embodiments, the light source cavity 1684 may be oversized in at least one dimension by 5%, 10%, 20%, 30%, 40%, 50%, 100%, 200%, 300%, 500%, 1000% or more relative to another dimension of the light source cavity 1684, or between any of these ranges. In some cases, this may help accommodate changes in the dimensions of the light source cavity 1684 when the bumper 1680 is bent when installed on a mounting surface (not shown).

In some cases, the plug 1688 may be transparent or semi-transparent to allow at least some of the light emitted by the light source 1686 to escape. Alternatively, or in addition, the bumper 1680 may include a transparent or semi-transparent region 1664 that extends from the light source cavity 1684 to an outer surface 1682 of the bumper 1680. When so provided, the plug 1688 may or may not be transparent or semi-transparent, as desired. The transparent or semi-transparent region in the bumper 1680 may allow at least some of the light emitted by the light source 1686 to escape. In some embodiments, the entire bumper 1680 may be made from a transparent or semi-transparent material, if desired. Alternatively, or in addition, it is contemplated that at least part of the bumper 1680 may include a glow-in-the-dark material. FIG. 72 is a cross-sectional side view of the illustrative lighting apparatus of FIG. 71 with the plug 1688 inserted into the opening.

Figure 73:
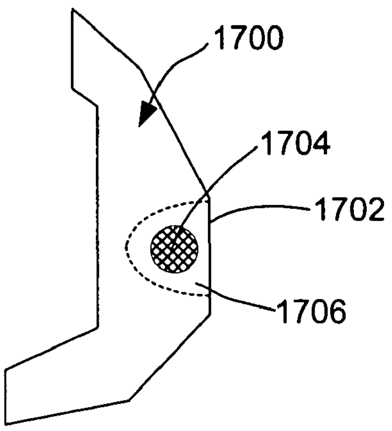
FIG. 73 is a cross-sectional side view of yet another illustrative lighting apparatus in accordance with the present invention.

FIG. 73 is a cross-sectional side view of yet another illustrative lighting apparatus in accordance with the present invention. This illustrative embodiment includes a bumper 1700 that has a front surface 1702 that faces away from a mounting surface (not shown). A light source 1704 is embedded in the bumper 1700, as shown. As noted above, the "light source" may be any type of light source including an active light source, or a passive light source such as a glow-in-the-dark light source. The illustrative embodiment of FIG. 73 may be fabricated by extruding the bumper material over the light source.

The bumper 1700 may include a transparent or semi-transparent region 1706, indicated by dashed lines, that extends from the light source 1704 to the front surface 1702 of the bumper 1700. The transparent or semi-transparent region 1706 may allow at least some of the light emitted by the light source 1704 to escape. In some embodiments, the entire bumper 1700 may be made from a transparent or semi-transparent material, if desired. Alternatively, or in addition, it is contemplated that at least part of the bumper 1700 may include a glow-in-the-dark material.

Figure 74:
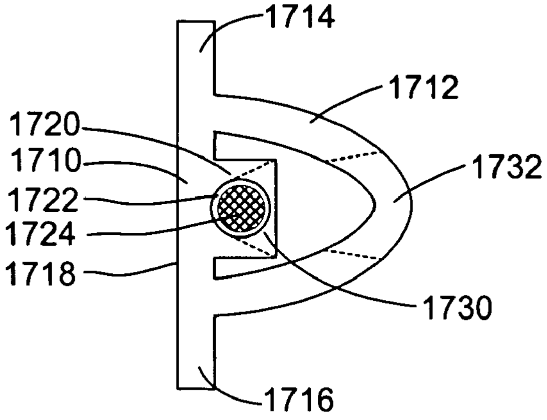
FIG. 74 is a cross-sectional side view of another illustrative lighting apparatus in accordance with the present invention.

FIG. 74 is a cross-sectional side view of another illustrative lighting apparatus in accordance with the present invention. While not limited to such uses, the illustrative embodiments shown in FIGS. 74–78 may be particularly suitable for use on sides of docks, walls or other similar mounting surfaces. The illustrative embodiment shown in FIG. 74 includes a back support 1710 and an arched bumper member 1712. The arched bumper member 1712 joins the back support 1710 as shown, and the back support member 1712 has an upper tab 1714 and a lower tab 1716 that extend above and below the arched bumper member 1712, respectively. The upper tab 1714 and the lower tab 1716 may be used to secure the illustrative lighting apparatus to the mounting substrate, such as by providing screws or nails through the tabs, or by providing an adhesive along the back surface 1718 of the back support 1710.

The back support 1710 may also have a thickened region 1720. The thickened region 1720 may have a lumen 1722 extending therethrough for receiving a light source 1724 as shown. The lumen 1722 may be oversized relative to the light source 1724 so that the light source 1724 may be inserted into the lumen 1722 from one end, if desired. In some embodiments, a slit (not shown) may be provided from, for example, the back surface 1718 of the back support 1710 into the lumen 1722. The slit may help facilitate the insertion and/or removal of the light source 1724 into/from the lumen 1722.

In the illustrative embodiment, at least a portion of the thickened region 1720 may include a transparent or semi-transparent region 1730, indicated by dashed lines, that extends from the lumen 1722 to a front surface of the thickened region 1720. The transparent or semi-transparent region 1730 may allow at least some of the light emitted by the light source 1724 to escape. In some embodiments, the entire thickened region 1720, as well as other regions, may be made from a transparent or semi-transparent material, if desired.

In some embodiments, the arched bumper member 1712 is made from a transparent or semi-transparent material, which transmits at least some of the light emitted by the light source 1724 to escape. In other embodiments, parts of the arched bumper member 1712 are made from a non-transparent material, and other parts such as region 1732 indicated by dashed lines is made from a transparent or semi-transparent material. Alternatively, or in addition, it is contemplated that at least part of the arched bumper member 1712, back support 1710 and/or thickened region 1720 may include a glow-in-the-dark material.

It is contemplated that the illumination apparatus of FIG. 74 may be made in any number of ways, including injection molding, extrusion or any other suitable process. In one illustrative embodiment, the arched bumper member 1712, back support 1710 and/or thickened region 1720 are extruded using a rigid, a semi-rigid and/or a flexible PVC, and then cut to length. However, other materials and processes may also be used. When more than one material is used, the various materials may be co-extruded, or may be fabricated using any other suitable process, as desired.

Figure 75:
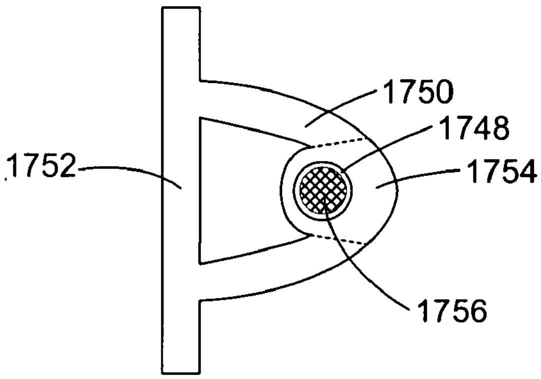
FIG. 75 is a cross-sectional side view of yet another illustrative lighting apparatus in accordance with the present invention.

FIG. 75 is a cross-sectional side view of yet another illustrative lighting apparatus in accordance with the present invention. This embodiment is similar to the embodiment shown in FIG. 74, but the light receiving lumen 1748 is provided in or along the arched bumper member 1750—rather than in a thickened region of the back support 1752 as shown in FIG. 74. In the illustrative embodiment, at least a portion of the arched bumper member 1750 may include a transparent or semi-transparent region 1754, indicated by dashed lines, that extends from the light receiving lumen 1748 to a front surface of the arched bumper member 1750. The transparent or semi-transparent region 1754 may allow at least some of the light emitted by the light source 1756 to escape. In some embodiments, the entire arched bumper member 1750, as well as other parts of the lighting apparatus, may be made from a transparent or semi-transparent material, if desired.

Figure 76:
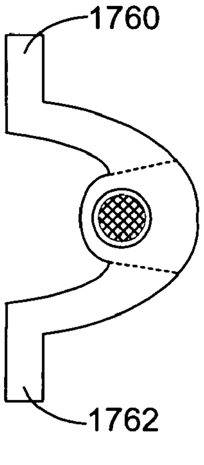
FIG. 76 is a cross-sectional side view of another illustrative lighting apparatus in accordance with the present invention.

FIG. 76 is a cross-sectional side view of another illustrative lighting apparatus in accordance with the present invention. This illustrative embodiment is similar to that shown in FIG. 75, but the back support does not extend between an upper tab 1760 and a lower tab 1762.

Figure 77:
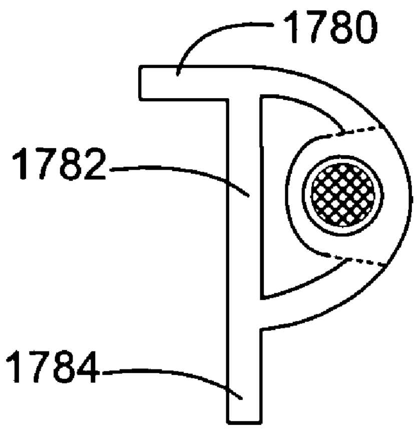
FIG. 77 is a cross-sectional side view of another illustrative lighting apparatus in accordance with the present invention.

FIG. 77 is a cross-sectional side view of another illustrative lighting apparatus in accordance with the present invention. This illustrative embodiment is similar to that shown in FIG. 75, but the upper tab 1780 extends at an angle (e.g. perpendicular) relative to the back support 1782. This embodiment may allow the upper tab 1780 to be mounted to a horizontal surface and the lower tab 1784 to a vertical surface. This embodiment may help provide additional protection to the top or bottom corner of a mounting surface such as a dock, if desired.

Figure 78:
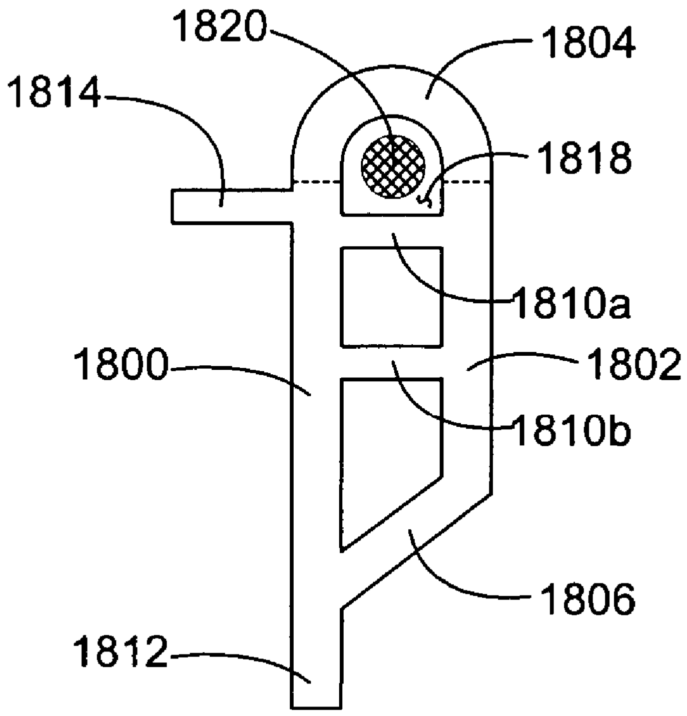
FIG. 78 is a cross-sectional side view of another illustrative lighting apparatus in accordance with the present invention.

FIG. 78 is a cross-sectional side view of another illustrative lighting apparatus in accordance with the present invention. This illustrative embodiment includes a back support 1800, a front bumper member 1802, a rounded top member 1804 and a bottom support 1806. Two intermediate supports 1810*a* and 1810*b* are also provided in the illustrative embodiment between the back support 1800 and the front bumper member 1802, as shown.

A lower tab 1812 is shown extending from the back support 1800 down past the bottom support 1806. An upper tab 1814 is shown extending from the back support 1800 in a leftward direction. The upper tab 1814 joins the back support 1800 below the rounded top member 1804. This embodiment may allow the upper tab 1814 to be mounted to a horizontal surface while the lower tab 1812 may be secured to a vertical surface. Thus, like the illustrative embodiment shown in FIG. 77, this embodiment may help provide additional protection to the top or bottom corner of a mounting surface such as a dock, if desired.

In the illustrative embodiment, the rounded top member 1804 and the upper intermediate support 1810*a* form a light receiving lumen 1818 for receiving a light source 1820. At least part of the rounded top member 1804 may be formed from a transparent or semi-transparent material, as indicated by dashed lines. This may allow at least some of the light emitted by the light source 1820 to escape. Alternatively, or in addition, a light source may be provided between the two intermediate supports 1810*a* and 1810*b*, or between the lower intermediate support 1810*b* and the bottom support 1806, if desired. In some cases, light sources may be provided at more than one of these locations, if desired.

It is contemplated that the illumination apparatus of FIG. 78 may be made in any number of ways, including injection molding, extrusion or any other suitable process. In one illustrative embodiment, the back support 1800, front bumper member 1802, rounded top member 1804, bottom support 1806, intermediate supports 1810*a* and 1810*b*, lower tab 1812 and upper tab 1814 are extruded as an single piece using a rigid, a semi-rigid and/or a flexible PVC, and then cut to length. However, other materials and processes may also be used. When more than one material is used, the various materials may be co-extruded, or formed using any other suitable process, as desired.

The light sources shown in the above embodiments may be active light sources that require electrical power to operate (e.g. electroluminescent, incandescent, LED or other active light sources) and/or passive light sources that do not require electric power (e.g. glow-in-the-dark light sources).

Figure 79:
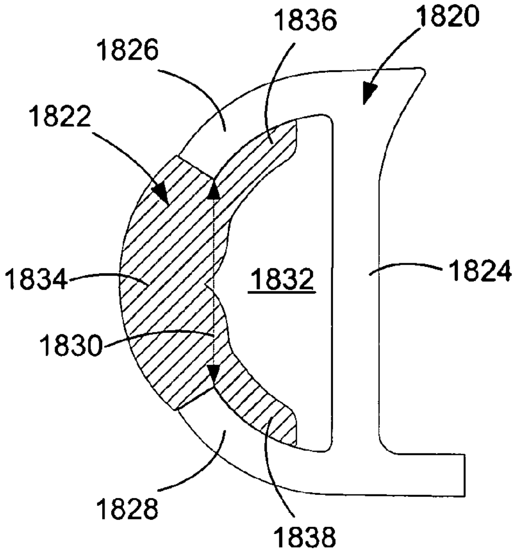
FIG. 79 is a cross-sectional side view of another illustrative lighting apparatus in accordance with the present invention, including a carrier and an insert.

FIG. 79 is a cross-sectional side view of another illustrative lighting apparatus in accordance with the present invention. The illustrative embodiments of FIGS. 79–82 explicitly show lighting apparatus assemblies that have a passive light source, such as a glow-in-the-dark material. The illustrative embodiment of FIG. 79 includes a carrier 1820 and an insert 1822. The carrier 1820 includes a back support 1824, an upper leg 1826 extending from the back support 1824 and a lower leg 1828 also extending from the back support 1824. In the illustrative embodiment, the upper leg 1826 and the lower leg 1828 extend in the leftward direction and turn in toward one another to form a slot 1830. The upper leg 1826, back support 1824 and the lower leg 1828 also define a cavity 1832.

The illustrative insert 1822 includes a main body 1834, an upper support leg 1836 and a lower support leg 1838. The upper support leg 1836 and the lower support leg 1838 are shaped to conform to the inner surface of the upper leg 1826 and the lower leg 1828 of the carrier 1820 when the insert 1822 is inserted into the cavity 1832. Instead of providing an active light source, or in addition to providing an active light source, the illustrative embodiment of FIG. 79 includes an insert 1822 that is entirely formed from a glow-in-the-dark material. Alternatively, or in addition, the carrier may be formed from a glow-in-the-dark material, if desired. The glow-in-the-dark material may be charged by daylight, and glow at night.

Figure 80:
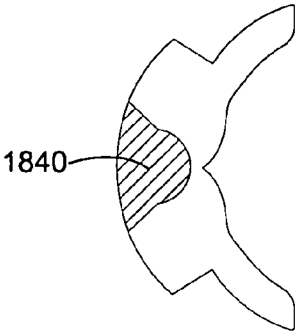
FIG. 80 is a cross-sectional side view of another illustrative insert for use with the carrier of FIG. 79.
Figure 81:
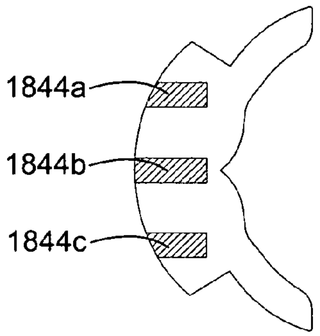
FIG. 81 is a cross-sectional side view of yet another illustrative insert for use with the carrier of FIG. 79.

FIG. 80 is a cross-sectional side view of another illustrative insert for use with the carrier of FIG. 79. In this illustrative embodiment, a central region 1840 of the insert is formed from a glow-in-the-dark material, and the remainder of the insert is not. FIG. 81 is a cross-sectional side view of yet another illustrative insert for use with the carrier of FIG. 79. In this illustrative embodiment, the three distinct regions 1844*a*, 1844*b* and 1844*c* of the insert are formed from a glow-in-the-dark material, and the remainder of the insert is not. The three distinct regions 1844*a*, 1844*b* and 1844*c* shown in FIG. 81 are arranged to appear as lines of light when viewed at night. It is contemplated that the glow-in-the-dark regions and the non-glow-in-the-dark regions may be formed as an integral part by co-extruding the glow-in-the-dark material and the non-glow-in-the-dark material, if desired.

Figure 82:
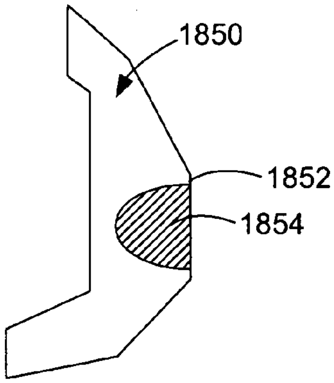
FIG. 82 is a cross-sectional side view of another illustrative lighting apparatus in accordance with the present invention.

FIG. 82 is a cross-sectional side view of another illustrative lighting apparatus in accordance with the present invention. This illustrative embodiment includes a carrier 1850 that includes a front side 1852 that faces away from a mounting surface (not shown). In this illustrative embodiment, a central region 1854 of the carrier 1850 is formed from a glow-in-the-dark material, and the remainder of the carrier is not. Again, it is contemplated that the glow-in-the-dark regions and the non-glow-in-the-dark regions may be formed as an integral part by co-extruding the glow-in-the-dark material and the non-glow-in-the-dark material, if desired.

Figure 83:
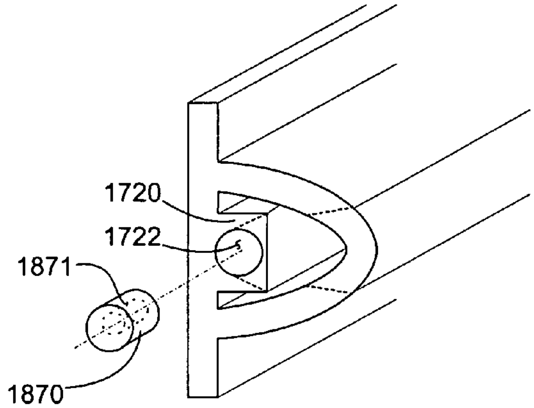
FIG. 83 is a partial perspective view of another illustrative lighting apparatus in accordance with the present invention, with lumen for receiving a light source, and a plug for plugging the lumen.

FIG. 83 is a partial perspective view of the illustrative lighting apparatus of FIG. 74, with a plug for plugging the light receiving lumen 1722. The plug 1870 may be sized to fit within the lumen 1722 and, in some cases, provide a water tight seal. In some embodiments, the plug 1870 may be pliable so it can be forced into the lumen 1722 to provide an interference fit and remain in place. In other embodiments, the plug may be more rigid, and in some cases, may be tapered so it too can be forced into the lumen 1722 to provide an interference fit and remain in place. In yet another embodiment, an adhesive or the like may be used to secure the plug in the lumen 1722. In any case, the plug 1870 may provide a water tight seal to keep water, humidity, dust and/or other elements from entering the lumen 1722.

In some embodiments, the plug 1870 may include a hole 1871 that extends partially through the plug 1870 as shown. The hole 1871 may be adapted to receive an end of a light source. In some cases, it may be desirable to secure the end the light source to the plug 1870, and when the plug is inserted into the lumen 1722, the plug 1870 may hold the end of the light source relative to the end of the lumen 1722. An interference fit, an adhesive or any other suitable method may be used to secure the end of the light source to the plug 1870, if desired. In some cases, the end of the light source may also include one or more wires. In these embodiments, the plug may also serve to insulate the ends of the one or more wires.

Figure 84:
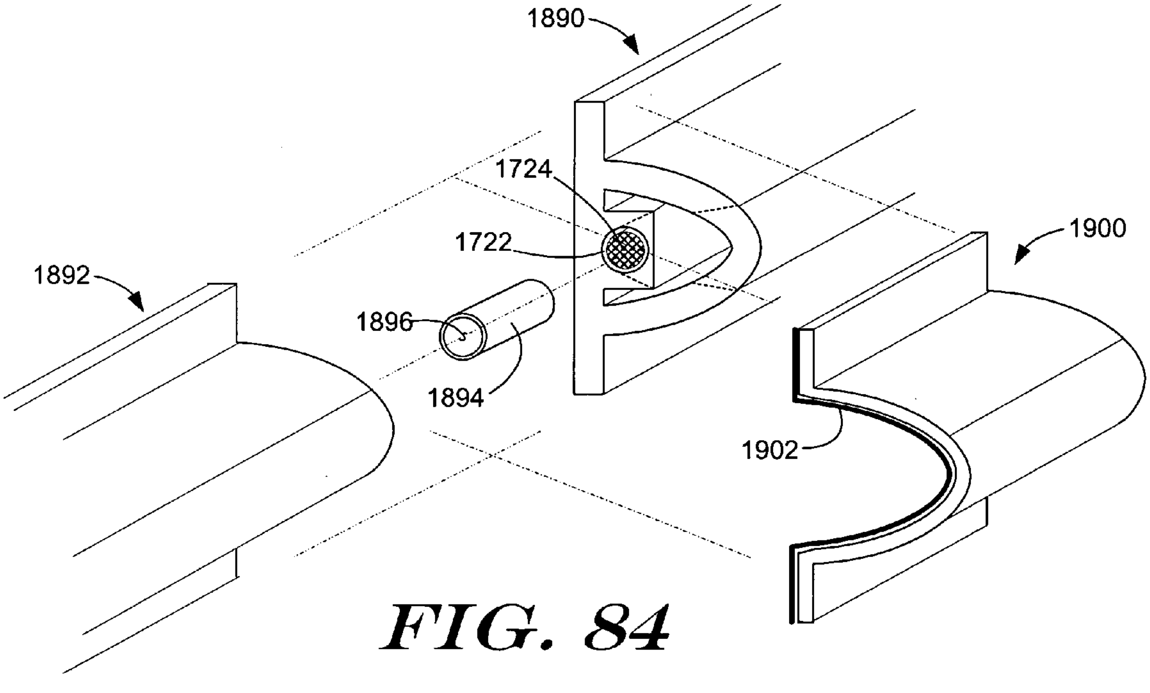
FIG. 84 is a partial perspective view of a tube and cap for use in joining two of the illustrative lighting apparatuses of FIG. 83.

FIG. 84 is a partial perspective view of a tube and cap for use in joining two of the illustrative lighting apparatuses of FIG. 74 end to end. A first lighting apparatus is shown generally at 1890 and a second lighting apparatus is shown at 1892. To help seal the lumen 1722 across the joint, a tube 1894 may be provided. The tube 1894 may extend into the lumen 1722 of the first lighting apparatus 1890, with the light source 1724 extending into and/or through the lumen 1896 of the tube 1894. The tube 1894 may be sized to provide an interference fit with the lumen 1722 of the first light apparatus 1890, and or an adhesive or the like may be used to secure the tube 1894 to the inner wall of the lumen 1722, as desired. A similar connection may be made with the lumen (not shown) of the second lighting apparatus 1892. The light source 1724 may extend out of the lumen 1722 of the first lighting apparatus 1890, through the tube 1894 and into the corresponding lumen of the second lighting apparatus 1892.

In some embodiments, the tube 1894 may provide a water tight connection between the lumen 1722 of the first lighting apparatus 1890 and corresponding lumen (not shown) of the second lighting apparatus 1892. The may help keep the light source 1724 from being exposed to the outside environmental conditions. It is contemplated that the tube 1894 may be formed from a transparent, semi-transparent or non-transparent material, as desired.

In the illustrative embodiment, a cap 1900 may be provided. An inner surface of the cap 1900 may be shaped similar to the outer surface of the first lighting apparatus 1890 and the second lighting apparatus 1892. The cap 1900 may be provided over the joint between the first lighting apparatus 1890 and the second lighting apparatus 1892, as shown. In some embodiments, the cap 1900 may include a flexible gasket 1902 in an initial liquid or sold state (shown as a dark line) to help provide a seal between the cap 1900, the first lighting apparatus 1890, and the second lighting apparatus 1892. The flexible gasket 1902 may extend over the entire inside surface of the cap 1900, around the perimeter of the inside surface of the cap 1900, or only at selected locations. In some cases, the cap 1900 may help keep the joint between the first lighting apparatus 1890 and the second lighting apparatus 1892 from being exposed to the outside environmental conditions.

Figure 85:
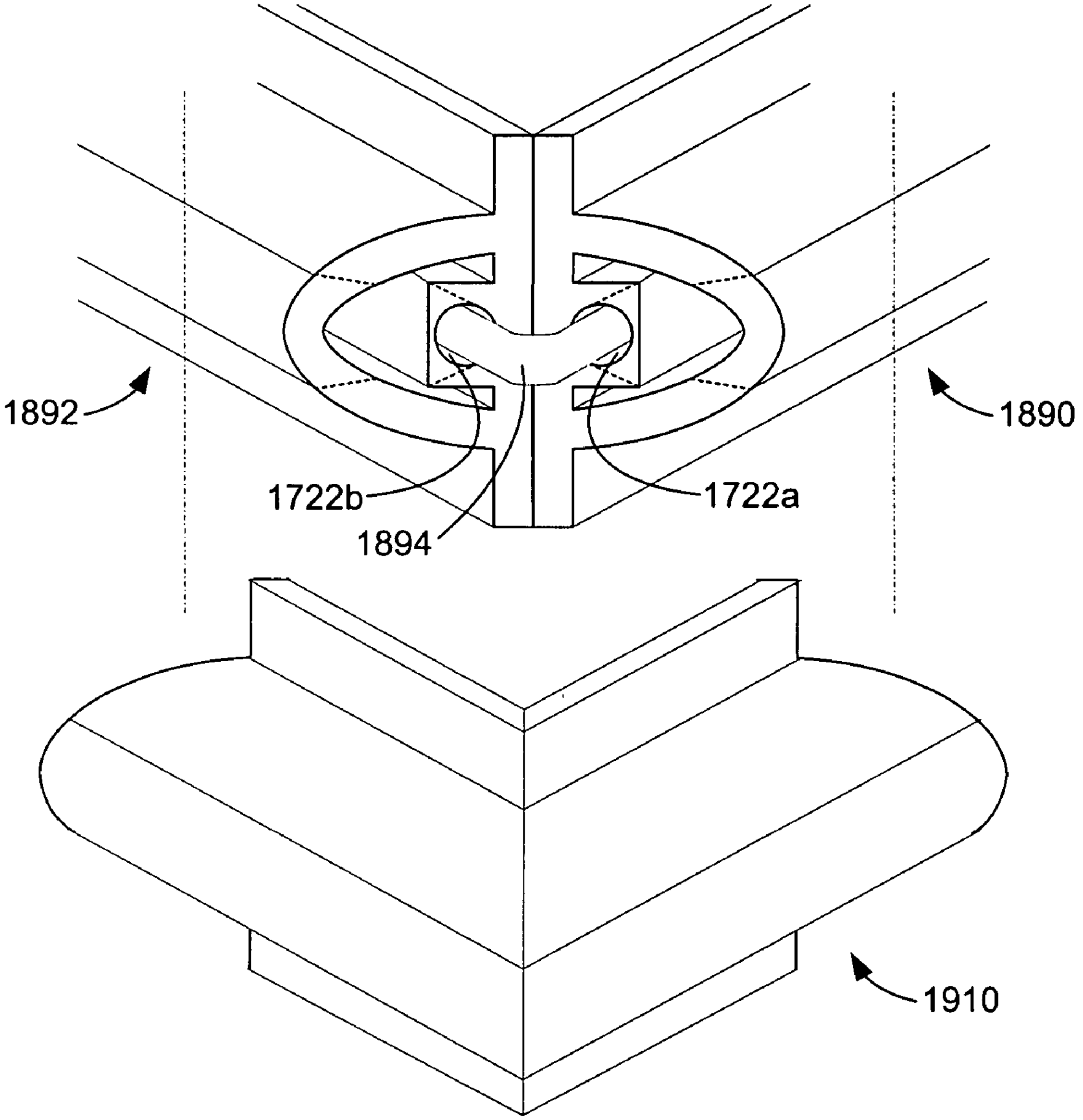
FIG. 85 is a partial perspective view of a tube and cap for use in joining two of the illustrative lighting apparatuses of FIG. 83 at a corner.

FIG. 85 is a partial perspective view of a tube and cap for use in joining two of the illustrative lighting apparatuses of FIG. 74 at a corner. This illustrative embodiment is similar to that shown in FIG. 84, but the first lighting apparatus 1890 and the second lighting apparatus 1892 are joined at an angle, such as at a corner of a boat, dock or other mounting surface. In FIG. 85, the tube 1894 extends into and is secured to the inner wall of the lumen 1722*a* of the first light apparatus 1890. The tube 1894 then extends around the corner, and is secured to the inner wall of the lumen 1722*b* of the second light apparatus 1892, as shown. The light source 1724 (see FIG. 74) may extend out of the lumen 1722*a* of the first lighting apparatus 1890, through the tube 1894 and into the corresponding lumen 1722*b* of the second lighting apparatus 1892. In some embodiments, the tube 1894 may provide a water tight connection between the lumen 1722*a* of the first lighting apparatus 1890 and lumen 1722*b* of the second lighting apparatus 1892. The may help keep the light source 1724 from being exposed to outside environmental conditions.

In the illustrative embodiment, a corner cap 1910 may be provided. An inner surface (not shown) of the cap 1910 may be shaped similar to the outer surface of the first lighting apparatus 1890 and the second lighting apparatus 1892. The cap 1910 may be provided over the joint between the first lighting apparatus 1890 and the second lighting apparatus 1892, as shown. In some embodiments, the cap 1910 may include a flexible gasket (not shown) in an initial liquid or sold state to help provide a seal between the cap 1910, the first lighting apparatus 1890, and the second lighting apparatus 1892. The flexible gasket may extend over the entire inside surface of the cap 1910, around the perimeter of the inside surface of the cap 1910, or only at selected locations. In some cases, the cap 1910 may help keep the joint between the first lighting apparatus 1890 and the second lighting apparatus 1892 from being exposed to outside environmental conditions.

Figure 86:
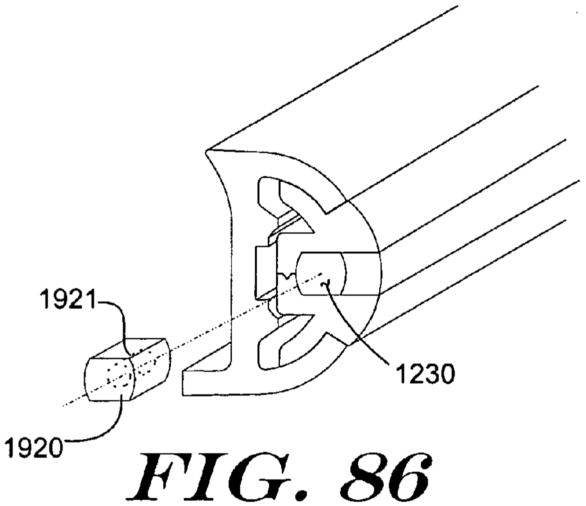
FIG. 86 is a partial perspective view of another illustrative lighting apparatus in accordance with the present invention, with an lumen for receiving a light source, and a plug for plugging the lumen.

FIG. 86 is a partial perspective view of the illustrative lighting apparatus of FIG. 55 accordance with the present invention, with a lumen 1230 for receiving a light source, and a plug 1920 for plugging the lumen 1230. The plug 1920 may be sized to fit within the lumen 1230 and, in some cases, provide a water tight seal. In some embodiments, the plug 1920 may be pliable so it can be forced into the lumen 1230 to provide an interference fit and remain in place. In other embodiments, the plug 1920 may be more rigid, and in some cases, tapered so it too can be forced into the lumen 1230 to provide an interference fit and to remain in place. In yet another embodiment, an adhesive or the like may be used to secure the plug 1920 in the lumen 1230. In any case, the plug 1920 may provide a water tight seal to keep water, humidity, dust and/or other elements from entering the lumen 1230.

In some embodiments, the plug 1920 may include a hole 1921 that extends partially through the plug 1920 as shown. The hole 1921 may be adapted to receive an end of a light source. In some cases, it may be desirable to secure the end the light source to the plug 1920, and when the plug is inserted into the lumen 1230, the plug 1920 may hold the end of the light source relative to the end of the lumen 1230. An interference fit, an adhesive or any other suitable method may be used to secure the end of the light source to the plug 1920, if desired. In some cases, the end of the light source may also include one or more wires. In these embodiments, the plug may also serve to insulate the ends of the one or more wires.

Figure 87:
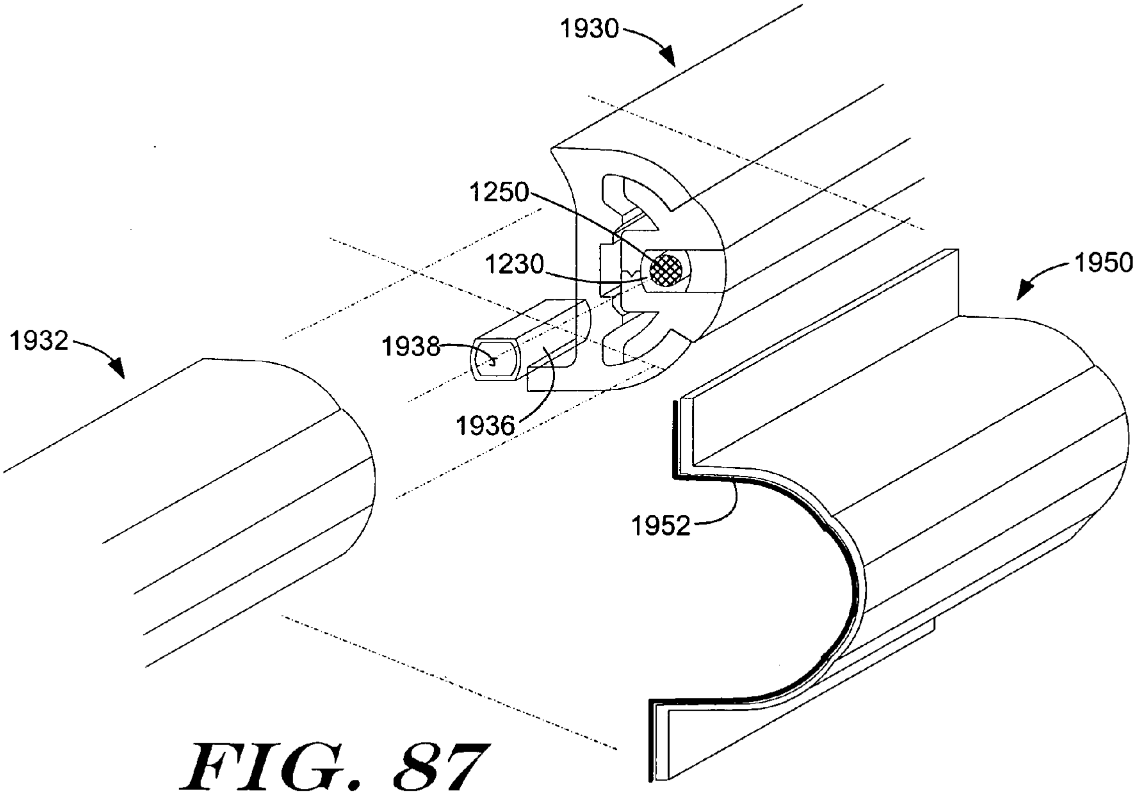
FIG. 87 is a partial perspective view of a tube and cap for use in joining two of the illustrative lighting apparatuses of FIG. 86.

FIG. 87 is a partial perspective view of a tube and cap for use in joining two of the illustrative lighting apparatuses of FIG. 55 end to end. A first lighting apparatus is shown generally at 1930 and a second lighting apparatus is shown at 1932. To help seal the lumen 1230 across the joint, a tube 1936 may be provided. The tube 1936 may extend into the lumen 1230 of the first lighting apparatus 1930, with the light source 1250 extending into and/or through the lumen 1938 of the tube 1936. The tube 1936 may be sized to provide an interference fit with the lumen 1230 of the first light apparatus 1930, and or an adhesive or the like may be used to secure the tube 1936 to the inner wall of the lumen 1230, as desired. A similar connection may be made with the lumen (not shown) of the second lighting apparatus 1932. The light source 1250 may extend out of the lumen 1230 of the first lighting apparatus 1930, through the tube 1936 and into the corresponding lumen (not shown) of the second lighting apparatus 1932. In some embodiments, the tube 1936 may provide a water tight connection between the lumen 1230 of the first lighting apparatus 1930 and corresponding lumen (not shown) of the second lighting apparatus 1932. The may help keep the light source 1250 from being exposed to the outside environmental conditions. It is contemplated that the tube 1936 may be formed from a transparent, semi-transparent or non-transparent material, as desired.

In the illustrative embodiment, a cap 1950 may be provided. An inner surface of the cap 1950 may be shaped similar to the outer surface of the first lighting apparatus 1930 and the second lighting apparatus 1932. The cap 1950 may be provided over the joint between the first lighting apparatus 1930 and the second lighting apparatus 1932, as shown. In some embodiments, the cap 1950 may include a flexible gasket 1952 in an initial liquid or sold state (shown as a dark line) to help provide a seal between the cap 1950, the first lighting apparatus 1930, and the second lighting apparatus 1932. The flexible gasket 1952 may extend over the entire inside surface of the cap 1950, around the perimeter of the inside surface of the cap 1950, or only at selected locations. In some cases, the cap 1950 may help keep the joint between the first lighting apparatus 1930 and the second lighting apparatus 1932 from being exposed to outside environmental conditions.

Figure 88:
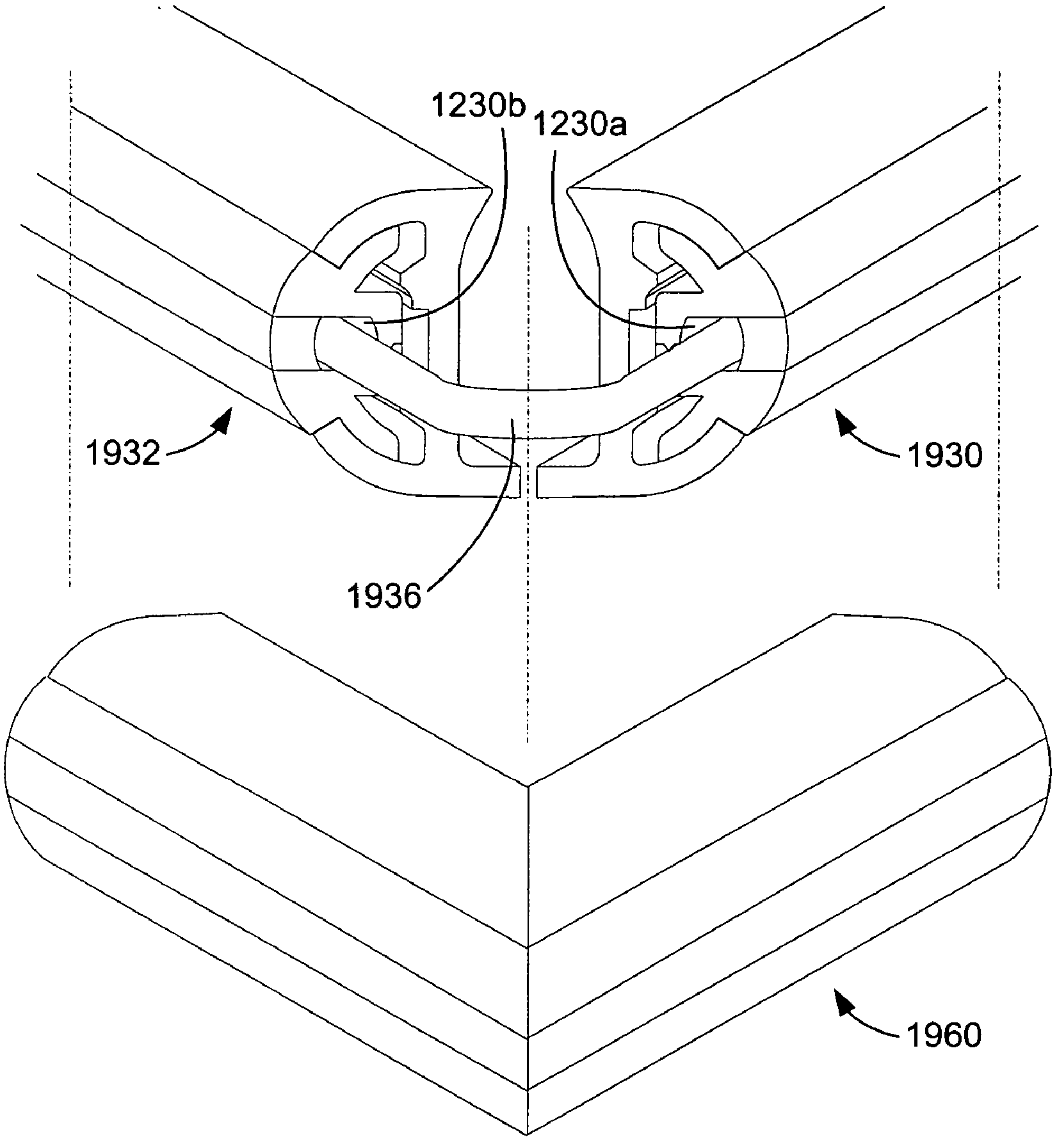
FIG. 88 is a partial perspective view of a tube and cap for use in joining two of the illustrative lighting apparatuses of FIG. 86 at a corner.

FIG. 88 is a partial perspective view of a tube and cap for use in joining two of the illustrative lighting apparatuses of FIG. 55 at a corner. This illustrative embodiment is similar to that shown in FIG. 87, but the first lighting apparatus 1930 and the second lighting apparatus 1932 are joined at an angle, such as at a corner of a boat, dock or other mounting surface. In FIG. 88, the tube 1936 extends into and is secured to the inner wall of the lumen 1230*a* of the first light apparatus 1930. The tube 1936 then extends around the corner, and is secured to the inner wall of the lumen 1230*b* of the second light apparatus 1932, as shown. The light source 1250 (see FIG. 87) may extend out of the lumen 1230*a* of the first lighting apparatus 1930, through the tube 1936 and into the corresponding lumen 1230*b* of the second lighting apparatus 1932. In some embodiments, the tube 1936 may provide a water tight connection between the lumen 1230*a* of the first lighting apparatus 1930 and lumen 1230*b* of the second lighting apparatus 1932. The may help keep the light source 1250 from being exposed to outside environmental conditions.

In the illustrative embodiment, a corner cap 1960 may be provided. An inner surface (not shown) of the cap 1960 may be shaped similar to the outer surface of the first lighting apparatus 1930 and the second lighting apparatus 1932. The cap 1960 may be provided over the joint between the first lighting apparatus 1930 and the second lighting apparatus 1932, as shown. In some embodiments, the cap 1960 may include a flexible gasket (not shown) in an initial liquid or sold state to help provide a seal between the cap 1960, the first lighting apparatus 1930, and the second lighting apparatus 1932. The flexible gasket 1952 may extend over the entire inside surface of the cap 1960, around the perimeter of the inside surface of the cap 1960, or only at selected locations. In some cases, the cap 1960 may help keep the joint between the first lighting apparatus 1930 and the second lighting apparatus 1932 from being exposed to outside environmental conditions.

Figure 89:
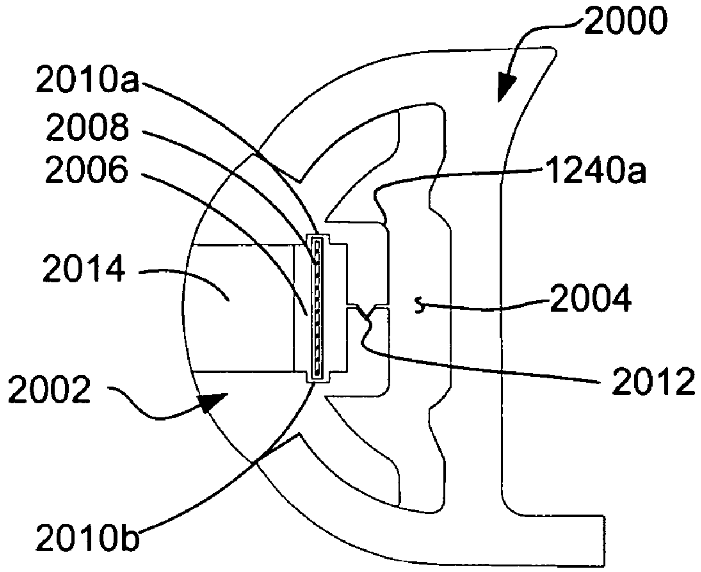
FIG. 89 is a cross-sectional side view of another illustrative lighting apparatus the present invention.

FIG. 89 is a cross-sectional side view of another illustrative lighting apparatus the present invention. This illustrative embodiment is similar that shown in FIG. 59, but explicitly shows the use of a light strip as a light source. The illustrative lighting apparatus includes a carrier 2000 and an insert 2002. The carrier 1370 includes a cavity 2004 for receiving the insert 2002, as further described above with respect to FIG. 59.

In the illustrative embodiment, the insert 2002 includes a lumen 2006 for receiving a light strip 2008. In one illustrative embodiment, the light strip 2008 is an electro-luminescent light strip, such as that which is commercially available from E-Light Technologies Inc. of Stafford, Conn. It should be recognized, however, that any suitable light strip may be used, as desired. In some embodiments, the light strip 2008 may include a transparent coating or layer to help protect the light strip from outside environmental conditions.

The lumen 2006 may be sized to accommodate the light strip, and may include notches 2010*a* and 2010*b* for accepting the edges of the light strip. In some embodiments, the lumen 2006 may be oversized in at least one dimension by 5%, 10%, 20%, 30%, 40%, 50%, 100%, 200%, 300%, 500%, 1000% or more relative to the dimensions of the light strip, or between any of these ranges. For example, the notches 2010*a* and 2010*b* may be oversized relative to the width of the light strip by 5%, 10%, 20%, 30%, 40%, 50%, 100%, 200%, 300%, 500%, 1000% or more, or between any of these ranges.

In some embodiments, a slit 2012 may be provided through the back side (or other side) of the insert 2002 to facilitate insertion and extraction of the light strip to/from the lumen 2006. A transparent or semi-transparent material, shown at 2014, may allow at least some of the light emitted by the light strip 2008 to escape from the lumen 2006.

Figure 90:
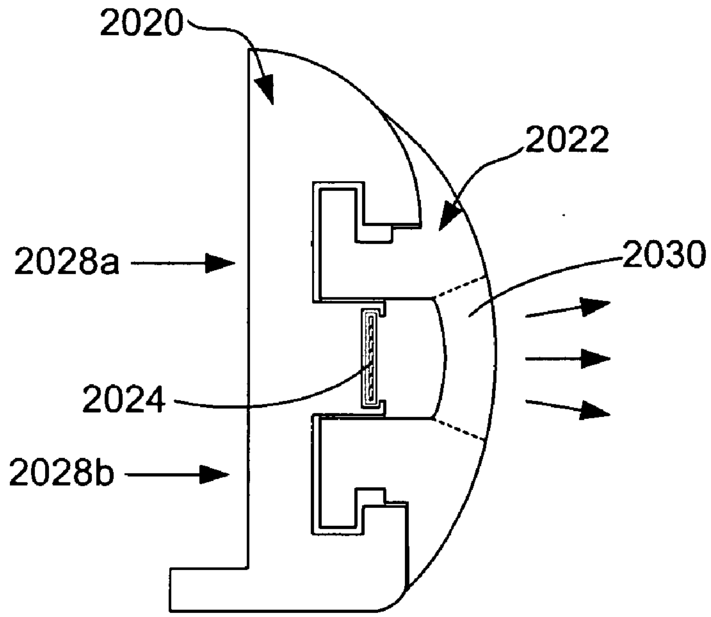
FIG. 90 is a cross-sectional side view of another illustrative lighting apparatus the present invention.

FIG. 90 is a cross-sectional side view of another illustrative lighting apparatus the present invention. This illustrative embodiment is similar that shown in FIG. 68, but explicitly shows the use of a light strip as a light source. The illustrative lighting apparatus includes a carrier 2020 and an insert 2022. The carrier 2020 includes a cavity for receiving the light strip 2024. In the illustrative embodiment, the cavity is defined by a back wall that is positioned adjacent to the back of the light strip. An upper and a lower inward extending leg of the carrier 2020 then wrap around and engage the front of the light strip, as shown. The upper and lower legs may help secure the light strip to the carrier 2020 during use. The light strip is protected by insert 2022, which is inserted into the cavity of the carrier 2020 as further described above with respect to FIGS. 67–68. To allow at least some of the light to escape, the insert may have a transparent or semi-transparent region 2030.

The carrier 2020 may be secured to a mounting surface via screws or the like at locations 2028*a* and 2028*b*, if desired. As can be seen, FIG. 89 shows an illustrative light apparatus that houses a light strip in an insert that is carried by a carrier, and FIG. 90 shows an illustrative light apparatus that houses the light strip in a carrier that accepts an insert.

Figure 91:
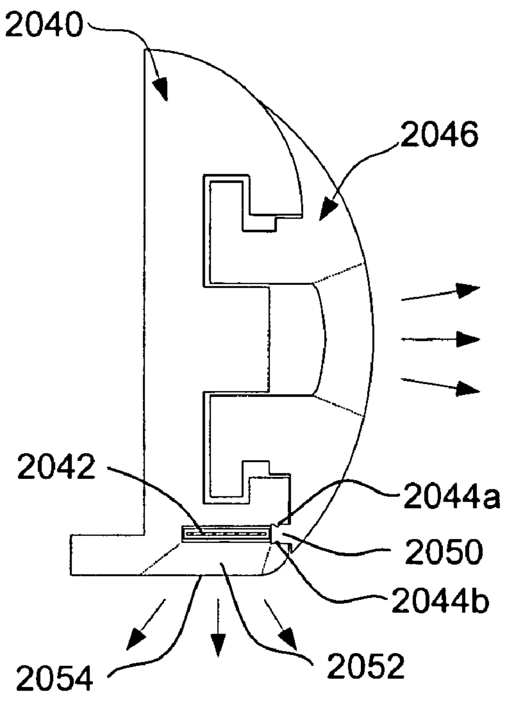
FIG. 91 is a cross-sectional side view of yet another illustrative lighting apparatus the present invention.

FIG. 91 is a cross-sectional side view of another illustrative lighting apparatus the present invention. This illustrative embodiment is similar to that shown in FIG. 90, except the carrier 2040 includes a different cavity position for receiving a light strip 2042. In some embodiments, the cavity may include one or more inward extending teeth 2044*a* and 2044*b*. In the illustrative embodiment, before the insert 2046 is installed on the carrier 2040, a light strip 2042 is inserted into the cavity from the front side of the carrier 2040. Then, the insert 2046 is installed in the carrier 2040. In the illustrative embodiment, the insert 2046 may include a plug 2050 that fits into the cavity, and engages the inward extending teeth 2044*a* and 2044*b*. The plug 2050 may help seal the cavity to help protect the light strip 2042 from undesirable environment conditions, such as water.

A region 2052 of the carrier 2040 that extends from the cavity to a lower outside surface 2054 of the carrier 2040 may be transparent or semi-transparent. The transparent or semi-transparent region 2052 may allow at least some of the light emitted by the light strip 2042 to escape. In the illustrative embodiment, the light escapes in a downward direction, but it is contemplated that the cavity and light strip 2042 may be configured to emit light in any direction, as desired.

Figure 92:
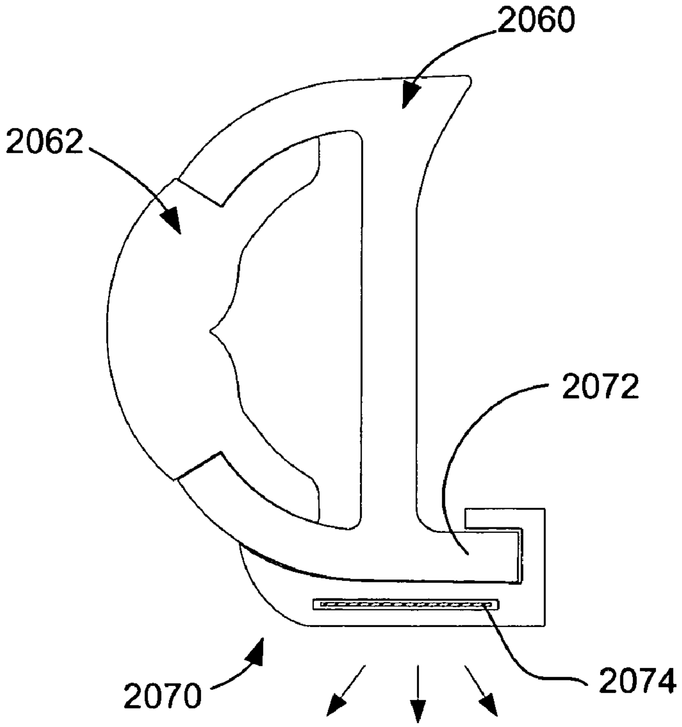
FIG. 92 is a cross-sectional side view of another illustrative lighting apparatus the present invention.

FIG. 92 is a cross-sectional side view of another illustrative lighting apparatus the present invention. In this embodiment, the illumination apparatus 2070 may be separately provided. In the illustrative embodiment, the illumination apparatus 2070 is secured to a bumper assembly. In the illustrative embodiment, the bumper assembly includes a carrier 2060 and an insert 2062. However, this is only illustrative.

The illustrative lighting apparatus 2070 is adapted to be secured to the bumper assembly. For example, and in one illustrative embodiment, the lighting apparatus 2070 may be secured to the lower surface of the bumper assembly using, for example, an adhesive, screws, clips or any other suitable method for securing the lighting apparatus 2070 to the bumper assembly. In some embodiments, the lighting apparatus 2070 may include an integral clip that extends around a back leg 2072 of a bumper assembly. This may help secure the lighting apparatus 2070 to the bumper assembly (and a mounting surface). In the illustrative embodiment, the lighting apparatus 2070 may include a light strip 2074, but it is contemplated that any suitable light source may be used. At least part of the lighting apparatus 2070 may include a transparent or semi-transparent material for allowing at least some of the light that is emitted from the light source to escape, as desired.

Having thus described illustrative embodiments of the present invention, those of skill in the art will readily appreciate that the teachings found herein may be applied to yet other embodiments within the scope of the claims hereto attached.

What is claimed is:

1. An elongated bumper, comprising:

an elongated bumper member having a lumen, cavity or opening extending lengthwise along the elongated bumper member for receiving an elongated light source; and the elongated bumper member further including at least two tabs for securing the elongated bumper member to a mounting surface, wherein one of the tabs has a major surface that extends substantially perpendicular to a major surface of another one of the tabs.

2. The elongated bumper of claim 1 wherein at least one tab has a major surface that extends substantially parallel to an expected mounting surface.

3. The elongated bumper of claim 1 further comprising an elongated light source received by the lumen, cavity or opening of the elongated bumper.

4. The elongated bumper of claim 3 wherein the elongated light source includes an active light source.

5. The elongated bumper of claim 4 wherein the active light source is an electroluminescent light source powered by electrical current.

6. The elongated bumper of claim 5 wherein the electric current is provided by a battery.

7. The elongated bumper of claim 6 wherein the battery is recharged, at least in part, by solar power.

8. The elongated bumper of claim 3 wherein the elongated light source includes a passive light source.

9. The elongated bumper of claim 8 wherein the passive light source is a glow-in-the-dark light source.

10. The elongated bumper of claim 8 wherein the passive light source is a linear emitting fiber.

11. The elongated bumper of 1 wherein the elongated bumper is mounted to a dock or a pier.

12. The elongated bumper of 1 wherein the elongated bumper is mounted to a vehicle.

13. The elongated bumper of claim 1 wherein the elongated bumper member includes an arched bumper member extending from a back support, wherein the at least two tabs are extensions of the back support.

14. The elongated bumper of claim 13 wherein the arched bumper member includes the lumen, cavity or opening.

15. The elongated bumper of claim 13 wherein the back support includes the lumen, cavity or opening.

16. The elongated bumper of claim 1 wherein the elongated bumper member includes an arched bumper member, wherein the at least two tabs extend from the arched bumper member, and wherein the arched bumper member includes the lumen, cavity or opening.

17. The elongated bumper of claim 1 wherein the elongated bumper member includes a back support, a front bumper member, an arched top member and a bottom support.

18. The elongated bumper of claim 17 wherein the arched top member defines at least part of the lumen, cavity or opening, and includes a transparent or semi-transparent material.

19. An elongated bumper, comprising:

an elongated bumper member having a light source extending along at least part of the length of the elongated bumper member; and the elongated bumper member further including at least two tabs for securing the elongated bumper member to a mounting surface.

20. The elongated bumper of claim 19 wherein the light source includes an active light source.

21. The elongated bumper of claim 19 wherein the light source includes a passive light source.

22. The elongated bumper of claim 21 wherein the passive light source is a glow-in-the-dark light source.

23. The elongated bumper member of claim 19 wherein the elongated bumper member includes two or more visually distinguishable light sources.

24. A bumper member, comprising:

an elongated bumper having an elongated cavity extending lengthwise along the elongated bumper with an elongated opening extending along at least part of the length of the elongated cavity and from the elongated cavity to an outer surface of the elongated bumper member for receiving an elongated light source; and an elongated plug for plugging at least part of the elongated opening once an elongated light source is installed in the cavity, the elongated plug and elongated bumper forming an interference fit to help retain the elongated plug in the installed position.

25. The bumper member of claim 24 wherein the elongated bumper member includes a transparent or semi-transparent material that extends from at least part of the cavity to an outer surface of the elongated bumper member.

26. The bumper member of claim 25 wherein the elongated plug is non-transparent.

27. The bumper member of claim 25 wherein the elongated plug is transparent or semi-transparent.

28. The bumper member of claim 24 wherein the elongated plug is transparent or semi-transparent.

29. The bumper member of claim 24 wherein the elongated bumper member is adapted to receive an elongated insert, and wherein part of the elongated insert forms at least part of the elongated plug.

30. A kit for joining a first bumper member to a second bumper member, wherein the first bumper member and the second bumper member each include a lumen for receiving an elongated light source, the kit comprising:

a tube having a lumen, the tube adapted to be inserted into the lumen of the first bumper member and into the lumen of the second bumper member, and further adapted to allow the elongated light source to pass through the lumen of the tube from the first bumper member to the second bumper member.

31. The kit of claim 30 further comprising:

an adhesive suitable for providing a water tight seal between the tube and the lumen of the first bumper member, and the between the tube and the lumen of the second bumper member.

32. The kit of claim 30 further comprising:

a cap adapted to fit over the joint between the first bumper member and the second bumper member.

33. The kit of claim 32 wherein the cap includes a gasket for providing a seal between the cap and the first bumper member and the cap and the second bumper member.

34. The kit of claim 30 further comprising one or more plugs for plugging the lumen of the first bumper member, the lumen of the second bumper member, or both.

35. An elongated bumper, comprising:

an elongated bumper member having a length and two ends, the elongated bumper member further having a lumen extending lengthwise therethrough and out at least one of the two ends of the elongated bumper, the lumen for receiving an elongated light source; and a plug, wherein the plug is adapted to fit into an end of the lumen.

36. The elongated bumper of claim 35 wherein the plug includes a hole extending at least partially therethrough, wherein the hole is adapted to receive an elongated light source and hold the elongated light source at a position in the lumen relative to the elongated bumper.

37. An elongated bumper, comprising:

an elongated bumper member having a lumen, cavity or opening extending lengthwise along the elongated bumper member for receiving an elongated light source; and the elongated bumper member further including at least two tabs for securing the elongated bumper member to a mounting surface, wherein one of the tabs has a major surface that extends substantially parallel to a major surface of another one of the tabs.

38. The elongated bumper of claim 37 further comprising an elongated light source received by the lumen, cavity or opening of the elongated bumper.

39. The elongated bumper of claim 38 wherein the elongated light source includes an active light source.

40. The elongated bumper of claim 39 wherein the active light source is an electroluminescent light source powered by electrical current.

41. The elongated bumper of claim 40 wherein the electric current is provided by a battery.

42. The elongated bumper of claim 41 wherein the battery is recharged, at least in part, by solar power.

43. The elongated bumper of claim 38 wherein the elongated light source includes a passive light source.

44. The elongated bumper of claim 43 wherein the passive light source is a glow-in-the-dark light source.

45. The elongated bumper of claim 43 wherein the passive light source is a linear emitting fiber.

46. The elongated bumper of 37 wherein the elongated bumper is mounted to a dock or a pier.

47. The elongated bumper of 37 wherein the elongated bumper is mounted to a vehicle.

48. The elongated bumper of claim 37 wherein the elongated bumper member includes an arched bumper member extending from a back support, wherein the at least two tabs are extensions of the back support.

49. The elongated bumper of claim 48 wherein the arched bumper member includes the lumen, cavity or opening.

50. The elongated bumper of claim 48 wherein the back support includes the lumen, cavity or opening.

51. The elongated bumper of claim 37 wherein the elongated bumper member includes an arched bumper member, wherein the at least two tabs extend from the arched bumper member, and wherein the arched bumper member includes the lumen, cavity or opening.

* * * * *